US006463830B1

(12) United States Patent
Ito et al.

(10) Patent No.: US 6,463,830 B1
(45) Date of Patent: Oct. 15, 2002

(54) DIFFERENTIAL DEVICE AND METHOD OF MANUFACTURING THE DEVICE

(75) Inventors: Yoshitaka Ito, Tochigi-ken; Makoto Ohuchi, Fukuoka-ken; Masanori Hara, Tochigi-ken; Akitoshi Nakamura, Tochigi-ken; Naoki Maruyama, Tochigi-ken; Naoto Watanabe, Togichi-ken; Akira Mikami, Saitama-ken; Shuuji Yamada, Fukuoka-ken; Kazuyuki Kurakake, Tochigi-ken, all of (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 09/486,891

(22) PCT Filed: Jul. 7, 1999

(86) PCT No.: PCT/JP99/03678

§ 371 (c)(1),
(2), (4) Date: Jun. 9, 2000

(87) PCT Pub. No.: WO00/01963

PCT Pub. Date: Jan. 13, 2000

(30) Foreign Application Priority Data

| Jul. 7, 1998 | (JP) | 10-191976 |
| Jul. 16, 1998 | (JP) | 10-202324 |
| Oct. 8, 1998 | (JP) | 10-286473 |
| Oct. 16, 1998 | (JP) | 10-295394 |
| Oct. 16, 1998 | (JP) | 10-295395 |
| Oct. 16, 1998 | (JP) | 10-295396 |
| Oct. 20, 1998 | (JP) | 10-298172 |
| Jan. 7, 1999 | (JP) | 11-002262 |
| Jan. 25, 1999 | (JP) | 11-015645 |
| Mar. 23, 1999 | (JP) | 11-077864 |
| Jun. 3, 1999 | (JP) | 11-155844 |
| Jun. 3, 1999 | (JP) | 11-155845 |
| Jun. 4, 1999 | (JP) | 11-157257 |

(51) Int. Cl.[7] .............................................. F16H 57/02
(52) U.S. Cl. ........................................................ 74/650
(58) Field of Search ............................................ 74/650

(56) References Cited

U.S. PATENT DOCUMENTS 5,577,423 A * 11/1996 Mimura ........................ 74/650
5,865,071 A * 2/1999 Mimura ........................ 74/650

FOREIGN PATENT DOCUMENTS

| JP | A-6-328957 | 11/1994 |
| JP | A-8-121492 | 5/1996 |
| JP | A-8-170705 | 7/1996 |
| JP | A-9-280340 | 10/1997 |
| JP | 11-22808 A | * 1/1999 |
| JP | 11-37252 A | * 2/1999 |
| JP | 11-51151 A | * 2/1999 |
| JP | P2000-120835 A | * 4/2000 |
| JP | P2000-170875 A | * 6/2000 |

OTHER PUBLICATIONS

Catalogue of SOLVEST (special lubricants) from STT. Inc.

* cited by examiner

*Primary Examiner*—Dirk Wright
(74) *Attorney, Agent, or Firm*—Sughrue Mion, PLLC

(57) ABSTRACT

The differential apparatus comprises (a) a casing rotated by a driving force from outside; (b) a pair of opposing disc plates coaxially disposed in the casing, an opposing surface of each disc plate being formed with a circumferentially continuous groove winding such that a radial position changes at a constant period; (c) a plurality of balls rolling in opposing winding continuous grooves of both disc plates; and (d) a ball holder rotating integrally with the casing and having a plurality of radially extending guide holes, each guide hole movably receiving each ball, wherein the winding continuous groove of each disc plate circumferentially continuously has first guide regions each extending from a radially outer position to a radially inner position of each disc plate and second guide regions each extending from a radially inner position to a radially outer position, inflected regions each connecting each first guide region and each second guide region being larger in width and/or depth than the first guide regions and the second guide regions, whereby a contact stress between the balls and the winding continuous groove is decreased in the inflected regions.

66 Claims, 56 Drawing Sheets

(a)

(b)

(c)

Radially Outward Portion A

Radially Inward Portion B

31

Radially Outward Portion A

Unexpanded Region

Widened Region (a)

(b)

(c)

(d)

(a)

(b)

(a)

(b)

(a)

(b)

(a)

(b)

US 6,463,830 B1

DIFFERENTIAL DEVICE AND METHOD OF MANUFACTURING THE DEVICE

FIELD OF THE INVENTION

The present invention relates to a differential apparatus capable of achieving difference in rotation between right and left driving wheels or between front and rear drive shafts of automobiles, and capable of increasing a driving force by generating a differential-limiting torque when one of driving wheels or drive shafts is rotating idle, and a method for producing such a differential apparatus, particularly to a differential apparatus having good durability and a stable differential-limiting torque and a method for producing such a differential apparatus.

PRIOR ART

A differential apparatus of an automobile is an apparatus enabling difference in rotation between right and left driving wheels or between front and rear driving wheels when the automobile turns a curve (in the case of a four-wheel driving vehicle). Widely used as a differential apparatus having such a function for automobiles is conventionally a differential apparatus comprising a pinion gear between a pair of bevel gears connected to output shafts, thereby enabling difference in rotation between output shafts by rotating the pinion gear at the time of differential rotation, in a case where a rotation force is applied to a shaft of the pinion gear from outside.

However, when one of the driving wheels is trapped in snow, sand, etc. or falls in a ditch, one wheel runs idle by differential rotation, resulting in total loss of a driving force, etc., which leads to failure to escape from the trapping. In the case of turning a curve, a wheel runs idle when a load applied to wheels on the radial inside at turn extremely decreases, thereby losing a driving force for running on a curve at a high speed.

Proposed as a differential apparatus for overcoming such a problem is, for instance, a differential apparatus having a differential limitation mechanism of a clutch disc pressure fit-type. Because a clutch disc is given biasing pressure in advance to obtain a driving force even when one of the driving wheels is not in contact with a road in this type of the differential apparatus, each of the driving wheels is constrained even when no driving force is given from the engine. Accordingly, it is disadvantageous in combination with an apparatus required to have independence from the rotation of each wheel, such as an anti-lock brake system.

A differential apparatus equipped with a viscous coupling-type, torque-sensing, differential limitation mechanism has also been proposed and put into practical use. Because a viscous coupling transmits a torque by utilizing a shear resistance of a viscous liquid such as a silicone oil, etc., it can provide smooth differential limitation effects responsive to difference in rotation between driving wheels. However, because an initial resistance is given by a viscous liquid, it still suffers from the disadvantage that the driving wheels are constraining each other.

In view of such circumstances, a differential apparatus smaller than the above differential apparatuses and having a differential limitation function without containing a particular mechanism was proposed (Japanese Patent Laid-Open No. 8-170705). This differential apparatus comprises (a) a pair of disc plates fixed to driving wheels and coaxially disposed opposite to each other in an axial direction, each of which has on an opposing surface a circumferential, continuous groove winding such that a radial position varies at a constant period; (b) a ball holder disposed between a pair of disc plates and having a plurality of radially extending guide grooves circumferentially at an equal interval; (c) balls rolling along the circumferential, continuous grooves of a pair of the opposing disc plates, one ball radially reciprocally movable in each guide groove; (d) a casing containing rotatable disc plates and a stationary ball holder; and (e) thrust washers disposed in contact with the outer surfaces of the disc plates. Because balls move back and forth in a radial direction in the guide grooves while they move circumferentially in the continuous groove, a driving force from the engine is transmitted to each of the driving wheels via each disc plate, thereby enabling differential rotation when difference in rotation occurs in the driving wheels. When one of the driving wheels runs idle, a sliding friction force is generated between the outer surfaces of the disc plates and thrust washers by a thrust force generated in the disc plates connected to the driving wheels, thereby obtaining differential limitation effects.

FIG. 18 shows one example of the differential apparatus disclosed by Japanese Patent Laid-Open No. 8-170705, and FIG. 19 shows an assembly of one disc plate, a ball holder and balls. As shown in FIG. 18, the differential apparatus of Japanese Patent Laid-Open No. 8-170705 comprises a case 1 having an open end and a coaxial annual projection 11 at the other end, a case cover 2 having an open end of the same size as that of the open end of the case 1 and a coaxial annual projection 21 at the other end, a pair of disc plates 3, 4 disposed coaxially opposite to each other, a ball holder 5 disposed between a pair of disc plates 3, 4, a plurality of balls 6 rotatably held by the ball holder 5, and a pair of thrust washers 7, 7 positioned outside the disc plates 3, 4.

The annual projection 11 coaxial with the case 1 functions as a bearing supporting one disc plate 3. The ball holder 5 engages the case 1 via a plurality of engaging members 10 positioning between an outer surface of the ball holder 5 and an inner wall of the case 1. The case 1 is provided with a plurality of apertures 14 in a side wall, such that a lubricating oil can flow into the case 1. A flange 15 formed around the open end of the case 1 is provided with a large number of apertures 15a for bolts.

The case cover 1 is in the shape of a shallow dish, whose coaxial annual projection 21 functions as a bearing rotatably supporting the other disc plate 4. The side wall of the case cover 2 is provided with a plurality of apertures 24 for permitting a lubricating oil to flow thereinto. A flange formed around the open end of the case cover 2 is provided with a large number of apertures 25a at positions corresponding to those of the apertures 15a of the case 1. The case 1 is fixed to the case cover 2 by bolts (not shown) penetrating both apertures 15a, 25a.

The other end of each disc plate 3, 4 is provided with annual projections 32, 42 for connecting the drive shaft (not shown) of the wheel. Also, an inner surface of each annual projection 32, 42 is provided with an axially extending groove 32a, 42a for fixing the drive shaft.

Thrust washers 7, 7 are disposed between the case 1 and the disc plate 3, and between the case cover 2 and the disc plate 4, in contact with outer surfaces of the disc plates 3, 4. When there is no difference in rotation between both driving wheels (not shown), or when one of the driving wheels does not run idle, a thrust force is not applied to the disc plate 3 or 4, resulting in substantially no friction force between the disc plates 3, 4 and the thrust washers 7, 7.

Because the winding continuous grooves of the disc plates 3 and 4 extend in opposite rotational directions with the same variations, only one of the disc plates 3 will be explained below. It should be noted that the same explanation is applicable to the other disc plate 4.

As shown in FIG. 19, an opposing surface of the disc plate 3 is provided with a circumferential, continuous groove winding such that a radial position varies at a constant period, and each winding continuous groove has an arcuate cross section such that balls can roll through the groove. The ball holder 5 is provided with a large number of elongated guide holes 51 each having such a width as to receive a ball 6, in which a ball 6 can move back and forth in a radial direction. A radial length of each guide hole 51 determining a range of the radial reciprocal movement of the ball 6 is equal to the difference between the radially outermost position (position farthest from the center) and the radially innermost position (position nearest the center) of the winding continuous groove 31.

FIG. 20 is an enlarged view showing one unit region of the winding continuous groove 31 of the disc plate 3, and FIG. 21 shows a radial distance R (distance between the center of the disc plate 3 and the winding continuous groove 31) at a rotation angle θ in the winding continuous groove 31. The same is true in the relation among a winding continuous groove of the other disc plate 4, the balls 6 and the guide holes 51 of the ball holder 5.

The winding continuous groove 31 is constituted by a plurality of unit regions each consisting of a first guide region 31a extending to cause balls 6 to move from a radially outer position to a radially inner position of the disc plate 3, and a second guide region 31b extending to cause balls 6 to move from a radially inner position to a radially outer position of the disc plate 3. In the case of the embodiment shown in FIGS. 19–21, each unit region has a rotation angle θ of 72°, with five unit regions existing in one cycle.

When one disc plate 3 is rotated with a ball holder 5 stationary, the other disc plate 4 rotates at the same speed in the opposite direction. Accordingly, when both disc plates 3, 4 are rotated relatively by 72°, namely when each disc plate 3, 4 rotates by 36° in the opposite direction, a ball 6 passes the unit region of the winding continuous groove 31, whereby the ball 6 moves back and forth radially by one cycle in the guide hole 51 of the ball holder 5.

To investigate the movement of balls 6 in both of the winding continuous groove 31 and the guide holes 51 in further detail, reference will be made to FIG. 22 showing mainly a second guide region 31b in the unit region of the winding continuous groove 31 of the disc plate 3. When a ball 6 is present in a radially inverting range, in which a radial distance from the center of the disc plate 3 changes from "increase" to "decrease" or "decrease" to "increase," and when another ball 6 is in a third guide region 31c, no force is transmitted between the balls 6 and the winding continuous groove 31, though a force is transmitted to a cylindrical inner wall of the winding continuous groove 31 in other regions.

In regions of the winding continuous groove 31 except for regions a, e, f, 31c, g and h, an angle at which the ball 6 is in contact with the winding continuous groove 31 varies such that a component of a force (thrust force) of the ball 6 to the disc plate 3 in an axial direction changes in proportion to a rotation torque applied to the case 1. Thus, a differential-limiting torque by friction with the thrust washers 7, 7 is proportional to a rotation torque applied to the case 1.

Though the differential apparatus disclosed by Japanese Patent Laid-Open No. 8-170705 is advantageous in that it needs a small number of parts, thereby facilitating their assembly, because differential rotation can be achieved between both disc plates due to engagement of the balls and the winding continuous groove, and because differential limitation effects can be obtained utilizing contact characteristics of the winding continuous groove with the balls. Nevertheless, tests under the conditions that a rotation angle of a unit region in the winding continuous groove of the disc plate 3, 4 is 60° or 72° have revealed that it is disadvantageous in durability and torque characteristics in the following points:

(1) With respect to durability, metal peeling takes place on the inner surfaces of the winding continuous grooves of the disc plates 3, 4, and the peeling always occurs in any one of the regions a, e, If, g and h shown in FIG. 21. Also, there is a tendency that the metal peeling occurs on the side above the centerline 38 in the regions a, f and h, and on the side below the centerline 38 in the regions e and g in this figure.

(2) With respect to torque characteristics, a torque on the side of the disc plates 3, 4 varies periodically, though a constant torque is applied to the ball holder 5, and its variation period is equal to a half of the period at which the ball 6 moves along the unit region (period at which a ball moves radially back and forth in one cycle in the guide hole). This variation period is constituted by some smaller variation periods.

The inventors have found the causes of the above problems by calculation of dynamics of a force between a ball and a winding continuous groove. Referring to FIG. 22, two balls 6 exist in one unit region (within the range of rotation angle of 72°), and these balls are classified into a ball 6a and a ball 6b. The ball 6a and the ball 6b move in the winding continuous groove 31 with a circumferential interval of 36°. In the embodiment shown in FIG. 22, the ball 6a is positioned slightly rightward from a center of the region e, while the ball 6b is positioned between the region g and the region h. Both of the balls 6a and 6b are in contact with the disc plate 3 in a state shown in FIG. 1.

When a rotation torque is applied to the case 1, forces Pa and Pb are applied from the ball holder 5 to the balls 6a and 6b. Because there are ten balls in total, these forces are in an unstable state that cannot be dynamically determined only from the balance of moments of forces. In the unstable state, the levels of forces and moments are determined by finding the flexure of members. This flexure occurs in a contact portion of the ball 6 and the winding continuous groove 31 and in a contact portion of the ball 6 and the ball holder 5. Accordingly, assuming that other portions are rigid, the flexure is determined by an elastic contact theory of Hertz, and the forces Pa and Pb are determined by utilizing the flexure. Once the forces Pa and Pb are determined, a force working between the ball 6 and the winding continuous groove 31 can easily be determined.

FIGS. 23 and 24 are figures for explaining how a force working between the ball 6b and the winding continuous groove 31 is determined. In FIG. 23, a force C is determined from a first contact angle α (angle between the direction of the moving ball 6a and a perpendicular line extending from a point on the inner wall of the winding continuous groove 31 with which the ball 6a is in contact). FIG. 24 is a view taken from the Z direction (from an upper position in the paper) in FIG. 23, and a force C determined from FIG. 23 and a second contact angle β (slanting angle of a force applied to the inner wall of the winding continuous groove 31) are utilized to determine forces D and E. The force D is a contact stress working between the ball 6a and the winding continuous groove 31, and the force E is a thrust force. The contact stress D is expressed by the formula: $D=A\times(1/\cos \alpha)\times(1/\cos \beta)$, and the thrust force E is expressed by the formula: $E=A\times(1/\cos \alpha)\times(\tan \beta)$. With respect to the ball 6b, each component of the force can be determined in the same way.

Utilizing the elastic contact theory of Hertz again, the contact stress D between the ball 6 and the winding continuous groove 31 can be determined. FIG. 25 shows the calculation results of contact stress generated when the ball 6 moves in the unit region (from 0° to 72°) with a constant torque applied from the case 1. Areas in which the contact stress is particularly large are in the regions a, e and g in this order from the left. When the direction of a torque from the case 1 is reversed, a contact stress in three regions e, f and h is particularly large.

The reasons therefor will be explained taking as an example a ball arrangement shown in FIG. 22. When the ball 6a is at a position $X_1$ shown in FIG. 22, the ball 6a is in contact with a convexly curved inner wall 35 of the winding continuous groove 31 (having a small radius of curvature $R_1$), as shown in FIG. 26 that is a cross-sectional view taken along the line S—S in FIG. 24. On the other hand, when the ball 6b is at a position $X_2$ shown in FIG. 21, the ball 6b is in contact with a concavely curved inner wall 36 of the winding continuous groove 31 (having a large radius of curvature $R_2$), as shown in FIG. 27 that is a cross-sectional view taken along the line S—S in FIG. 24.

According to the elastic contact theory of Hertz, the contact stress is larger in a state shown in FIG. 26 than in a state shown in FIG. 27. Because the state of FIG. 26 is achieved when the ball is in contact with the region a, e, f, g or h, the contact stress is particularly large in these regions.

That is why metal peeling takes place in the regions a, e, f, g and h of the winding continuous groove 31 in a durability test.

The calculation results of the total thrust force E generated while all balls 6 move in the unit region (from 0° to 72°) of the winding continuous groove 31 are shown in FIG. 28. The total thrust force E varies with a period corresponding to a half of the unit region (rotation angle: 36°), and this variation period is constituted by six small variation regions. The reason therefor is as follows: Though the first contact angle α is set such that the thrust force E is constant when all balls 6 exist in regions of the winding continuous groove 31 except for the regions a, e, f, g and h, the thrust force E is larger than that at the first contact angle α, when balls 6 exist in any of the regions a, e, f, g and h of the winding continuous groove 31. Accordingly, when balls 6 exist in any of the regions a, e, f, g and h of the winding continuous groove 31, the thrust force E is large. Also, the reason why a torque varied in the experiment of torque characteristics is that a friction force exerted by the thrust washers 7, 7 varied due to the change of the thrust force.

With respect to the disc plates 3, 4, they are conventionally produced by cutting a steel material such as structural carbon steel or chromium-molybdenum steel by an NC lathe with a finish-working margin left, carrying out rough working and finish working of a winding continuous groove 31 by a ball end mill, and finally carburizing the winding continuous groove to form a hardened surface layer. However, when a carburizing treatment is conducted to the winding continuous groove, edge portions of the winding continuous groove have a high-carbon content, resulting in embrittlement despite of increase in hardness. As a result, when a ball is brought into contact with an edge of the winding continuous groove, cracking may take place, resulting in the deterioration of durability of the differential apparatus and unstable torque transmission. In addition, the above production method has too many steps, suffering from a problem of high production cost.

With respect to rough working and finish working of the winding continuous groove 31 by the ball end mill 16, a large cutting resistance is applied to a tip end 16a of the ball end mill 16, because a cutting speed is zero at the tip end 16a of the ball end mill 16, thereby posing a problem that it is difficult to form the shape and locus of the winding continuous groove at a high precision.

The winding continuous groove 31 may be worked by a special end mill 261 having a round tip blade 262 having a radius R as shown in FIG. 45. However, a precisely arcuate curved surface of the winding continuous groove 31 cannot be formed by a single step of cutting, thereby necessitating, after a rough working (primary working) for roughly forming an overall shape of the winding continuous groove, a finish working (secondary working) comprising several steps of cutting to gradually improve precision and surface roughness. This leads to a long working time period. Also, because the special end mill is expensive and needs regrinding, it is more expensive than usual tools. Accordingly, there is a problem of high production cost of the differential apparatus.

As is clear from FIG. 54 exaggeratingly showing a cross-sectional shape of the guide hole 51 of the ball holder 5 in its middle portion, the inner walls of the guide hole 51 are formed with curved surface portions 51d, 51d' having a radius corresponding to the radius of the ball 6 plus 0.00–2.00 mm, with slight flat portions 51e, 51e' on both sides of the curved surface portions 51d, 51d'. Because there is a small clearance between the ball 6 and both curved surface portions 51d, 51d' of the guide hole 51, the ball 6 is freely movable in the guide hole 51. With such a shape, the ball 6 held in each guide hole 51 of the ball holder 5 can transmit a torque between the case 1 and both disc plates 3, 4 without much deviating from a center of the guide hole even at a high-speed rotation.

Because the curved surface portions 51d, 51d' in the inner walls of the guide holes 51 cannot be formed at the same time as the formation of the guide holes 51, they are conventionally formed by cutting after the formation of the guide hole walls. After forming a guide hole having a right wall by a tool such as a punch, an end mill, etc. as a primary working, a secondary working is usually carried out by cutting the right wall by a special end mill 261' having an arcuate blade 262' having a radius R on a side wall as shown in FIG. 55.

However, the special end mill is not only expensive but also more costly in regrinding than usual tools, fewer in the maximum number of regrinding than usual tools, suffering from a short service life. Further, because it is difficult to work 10 or so guide holes simultaneously on the ball holder 5, it suffers from a long working time, thereby needing a method of easily working the guide holes.

With respect to the guide holes 51 of the ball holder, a contact stress is generated between the balls 6 and the inner walls of the guide holes 51, because the balls 6 move radially back and forth in the guide holes 51 while the differential apparatus is operating. The contact stress is proportional to the difference in rotation speed between both disc plates 3, 4 and their driving torque, and thus the larger the difference in rotation speed and the driving torque, the larger the contact stress. The contact stress is usually 400 kg/mm$^2$ or more, when the torque is 100 kg-m or more, and when the difference in rotation speed is 500 rpm or more. In addition, the balls 6 slidably move back and forth in the guide holes 51 at a high speed, and their sliding speed is 2000 cycles/minute or more when the difference in rotation speed between both disc plates 3, 4 is 500 rpm or more. If the balls 6 slidably move without rotation under such a high load (causing slipping), the inner walls of the guide holes 51 are likely to be damaged.

To prevent slipping, a lubricating oil is used in the differential apparatus. Thus, slipping is usually avoided even though a high contact stress is generated. However, when a high contact stress is generated in an initial fitting period in which a new differential apparatus is subjected to a fitting operation, the slipping could not be able to be completely prevented if only a lubricating oil were used, thereby being highly likely to damage the inner walls of the guide holes 51. If the inner walls of the guide holes 51 were damaged, dust generated thereby would function like grinding powder, successively damaging other parts of the guide holes 51, thereby reducing a service life of the differential apparatus.

Driving mechanisms of automobiles are standardized by each automobile manufacturer, and substantially all parts are designed under this standard. Thus, distances between driving gears connected to an engine and follower gears of the differential apparatus rotatable by the driving gears are set constant to keep compatibility within each type of automobiles in most cases. Accordingly, to increase a transmission force in the same type of automobiles, the shapes and sizes of parts of the differential apparatuses should be increased without changing the distances between the driving gears and the follower gears. Because a distance L is set in advance between the driving gears (not shown) connected to an engine and the follower gears fixed to the differential apparatus and rotated by the driving gears, it is impossible to increase the peripheral size of the differential case 1 to which the follower gears are attached, thereby making it difficult to increase an outer diameter of a ball holder 5 contained in the differential case 1. Further, when the ball holder 5 is fixed to the casing 1 by pins, enough strength would not be ensured if a larger torque transmission were sought. Also, positioning errors of the differential case 1, into which pins are inserted, and the ball holder 5 should be within about ±30 μm, resulting in difficulty in achieving a low production cost.

In the conventional differential apparatus as shown in FIG. 18, because peripheral projections of the ball holder 5 engage an inner-peripheral groove of the differential case 1 to transmit a torque, a large load is always applied to the groove of the differential case 1 and the projections of the ball holder 5. Accordingly, the case 1 has a complicated shape for receiving the disc plates 3, 4, the ball holder 5 and the balls 6, thereby making it necessary to provide the case 1 with enough strength and wear resistance by making it of spheroidal graphite cast iron, cast steel, etc., and by heat-treating portions, to which a large load is applied, such as the above grooves, etc.

The ball holder 5 should be provided with improved strength and hardness by conducting heat treatments such as hardening, tempering, etc. after forming it integrally with peripheral projections and guide holes 51 from a sheet made of bearing steel, etc. However, the ball holder 5 not only is thin because it is inserted between the disc plates 3, 4, but also has a complicated shape having radially extending guide holes 51, thereby being susceptible to deformation by a heat treatment. Though it may be considered that a ball holder 5 formed with a cutting margin in peripheral projections, etc. is heat-treated and then subjected to cutting, its cutting is difficult because of the peripheral projections. Therefore, the ball holder should inevitably be engaged with the differential case 1 without cutting its outer periphery and peripheral projections, with such gaps with the inner surface and groove of the differential case 1 as to absorb deformation due to a heat treatment. However, this is likely to deteriorate the calmness of the differential apparatus by pulsation, thus causing decrease in the durability thereof.

With respect to spring washers, if they were dish spring-shaped washers, wearing would occur during their use in their end surfaces, the inner surfaces of the differential case 1 and the case cover 2 and the end surfaces of the disc plates 3, 4 with which the spring washer are in contact. Accordingly, their axially inward biasing pressure gradually decreases, resulting in decrease in a thrust force, and thus being likely to reduce an initial differential-limiting force. Particularly when the biasing pressure is high (for instance, at an initial torque of 5 kg-m or more), this tendency is remarkable.

With respect to the differential-limiting means, it is required that when disc plates are different in a rotation speed, a friction force is generated in contact surfaces of the casing and the disc plates, and that each constituent part undergoes little wear. In the conventional differential-limiting means using rollers, the rollers roll in a slanted state relative to the rotation axis of the casing and the disc plates, thereby generating a sliding friction force for the differential limitation. Because a friction force is determined by the inclination of rolls in this differential-limiting means, a friction coefficient does not change largely depending on the level of the rotation force and the biasing pressure. Also, because a high Hertz stress is generated on a flat opposing surface in contact with rollers, pitting occurs in the opposing surfaces of the rollers, the casing and the disc plates, resulting in the deterioration of durability.

The differential-limiting means is classified into a torque-responsive type, a speed-responsive type, and a torque/speed-responsive type that is a combination of the former two types. In the torque-responsive-type differential-limiting means, a differential limitation mechanism is determined by a torque ratio and an initial differential-limiting torque. Here, the torque ratio is a ratio of the torques transmitted to right and left wheels or front and rear wheels, and the initial differential-limiting torque is a torque given for differential rotation under no load. For instance, the distribution of a driving torque desired for four-wheel drive vehicles having differential-limiting means between front and rear wheels may be as follows:

(1) At the time of rapid, straight acceleration, the maximum acceleration performance is sought by making the slipping of the vehicle unlikely, for instance, with the distribution of a driving torque of 60–50% for front wheels and 40–50% for rear wheels.

(2) At the time of high-speed cruising, straight stability is sought, for instance, with the distribution of a driving torque of about 50% for front wheels and about 50% for rear wheels.

(3) Driving along a predetermined course without drifting is sought, for instance, with the distribution of a driving torque of 30% for front wheels and 70% for rear wheels at the time of rapid turn or rapid acceleration on a dry road, and 40% for front wheels and 60% for rear wheels at the time of rapid turn or rapid acceleration on a snow-covered road.

(4) At the time of low-speed driving with a large radius of turn on a dry road, decrease in tight braking is prevented, for instance, with the distribution of a driving torque of 0% for front wheels and 100% for rear wheels.

(5) At the time of declutching for braking, matching with an anti-lock braking system (ABS) is sought.

To meet the above demands, a mechanism for controlling an initial differential-limiting torque is necessary. Controlling an initial differential-limiting torque makes it possible to keep the difference in the number of rotation between right and left wheels or between front and rear wheels at a certain level or less, thereby achieving good speed-responsive characteristics.

Known as a differential-limiting means having a differential limitation mechanism for preventing one of the driving wheels from running idle at the time of turning at a relatively high speed or at the time of driving on a low-friction coefficient road is a differential-limiting means having a multi-plate clutch on the rear side of bevel gears such that a thrust force of the bevel gears pushes the multi-plate clutch to generate a friction force, thereby transmitting a driving force. For instance, Japanese Patent Laid-Open No. 6-328957 discloses a differential-limiting means comprising a hydraulic cylinder for pressing a friction clutch disposed between a differential case and a side gear in an abutment direction, an air-intake valve disposed in an air pipe for connecting the hydraulic cylinder and an air tank, an exhaust valve connected to the air pipe downstream of the air-intake valve and communicating with the air, and a controller into which detection signals of the numbers of rotation of four wheels, a vehicle speed and a steering angle are supplied to calculate a differential value indicating the variation of a slipping ratio, thereby controlling the air-intake valve and the exhaust valve to reduce pressure when both wheels are slipping, and to gradually increase pressure when the differential value of the slipping ratio variation is decreasing at the time of one-wheel slipping.

Japanese Patent Laid-Open No. 8-334162 discloses a differential-limiting means comprising a differential case driven to rotate, a differential gear contained in the differential case, a friction clutch for differential limitation mounted between a side gear that is an output member of the driving gear and the differential case, a ring-shaped pressure piston disposed around a rotation axis L of the side gear for giving an engaging force to the friction clutch, a fluid pump for supplying an operating fluid for operating the piston in response to the difference in a rotation speed between the side gear and the differential case, an orifice penetrating the piston for permitting the operating fluid to flow out of an operating fluid chamber of the piston, and a differential ring disposed between the piston and the friction clutch for changing a cross section area of the orifice in response to the difference in a rotation speed between the side gear and the differential case.

In the differential-limiting means disclosed by Japanese Patent Laid-Open Nos. 6-328957 and 8-334162, a differential-limiting force can be changed by changing an engaging force given to the friction clutch in response to the difference in a rotation speed between the side gear and the differential case, thereby enabling driving even at a low friction with a road and thus improving start characteristics on a low-friction road. However, it is extremely difficult to keep the friction force constant in a half-connecting state, in a power-transmitting mechanism utilizing a slide friction like a multi-plate friction clutch as in these differential-limiting means. Particularly at a low-speed rotation, there is a problem that so-called stick slip with which clutch plates generate a static friction and a dynamic friction intermittently may occur, thereby making the differential-limiting force unstable. Also, when the friction force is made unstable by the stick slip, noises and vibration are generated, adversely affecting driving performance.

On the other hand, the differential-limiting means disclosed by Japanese Patent Laid-Open No. 8-170705 can provide stable differential limitation effects responsive to the sensed torque, without necessitating a special mechanism for obtaining differential limitation effects. In addition, it is extremely small and can be produced at a low cost, and its differential limitation effects can freely be set depending on its applications. Accordingly, this differential-limiting means is advantageously usable for every application. This differential-limiting means is further characterized in that a torque ratio and an initial differential-limiting torque can be selected under wider conditions than those of the other differential-limiting means, whereby optimum conditions adapted for a particular vehicle can be set. However, the optimum conditions are not necessarily reached for all driving conditions of vehicles. For instance, the capability of generating enough differential-limiting torque is desired in the case of rapid turn, in a case where wheels on the radial inside at turn are floated, and in a case where wheels on one side are slipping on low-friction coefficient roads such as frozen roads, etc.

To improve escapability from and drivability in mud or snow-covered roads, etc., a reaction force (so-called initial differential-limiting torque) is given in advance in the axial direction of the differential apparatus in many cases. The setting of the initial differential-limiting torque is conventionally carried out, as shown in FIG. 72, by the steps of (a) measuring the inner diameter depth (X) of the differential case 1, the height (Y) of the case cover and the height (Z) of inner parts, (b) selecting the thickness ($W_1$, $W_2$) of the thrust washer 7 such that [X−(Y+Z)] becomes equal to a predetermined value, (c) carrying out preliminary assembly, (d) checking the initial differential-limiting torque, (e) disassembling the differential apparatus to repeat the steps (b)–(d) when the initial differential-limiting torque is NG, and (f) completing the assembly of the differential apparatus when the initial differential-limiting torque is OK.

A rotation force due to a driving force from outside is transmitted from the ball holder 5 to the balls 6 and to the disc plates 3, 4. Reaction force-supporting surfaces of the differential case 1 and the case cover 2 are subjected to a force functioning to expand them outwardly in an axial direction. Flanges of the differential case 1 and the case cover 2 screwed to each other together with gears (not shown) are relatively thin in portions to which follower gears are fixed. As a result, the differential case 1 and the case cover 2 are likely to suffer from large deformation in an axial direction. If the differential case 1 or the case cover 2 were not enough rigid to bear a force in an axial direction, the effects of differential rotation and differential limitation would be reduced. Also, the balls 6 would largely deviate from a center of the winding continuous groove 31 of the disc plate 3, resulting in decrease in the durability of the winding continuous groove 31 and balls 6.

If the differential case or the case cover did not have improved rigidity, no assurance would be achieved in the setting of an initial differential-limiting torque, the setting and change of a differential-limiting torque at the time of reassembling or after use. Further, the method of FIG. 72 is disadvantageous in that a large number of steps are needed to set an initial differential-limiting torque.

OBJECT OF THE INVENTION

Accordingly, an object of the present invention is to provide a differential apparatus of the same type as disclosed by Japanese Patent Laid-Open No. 8-170705, having improved durability by reducing the wear of winding continuous grooves, together with less variable torque transmission and stable differential-limiting torque.

Another object of the present invention is to provide a differential apparatus free from tipping, etc. on edges of winding continuous grooves due to contact with balls, and a method for producing such a differential apparatus.

A further object of the present invention is to provide a differential apparatus having winding continuous grooves of disc plates with high-precision shape and locus, thereby exhibiting stable differential limitation effects for a long period of time.

A still further object of the present invention is to provide a method for producing the inner walls of winding continuous grooves on opposing surfaces of disc plates and the inner walls of guide holes of a ball holder at high precision and at a low cost.

A still further object of the present invention is to provide a differential apparatus having improved lubrication, wear resistance and galling resistance of winding continuous grooves and guide holes of a ball holder, thereby having improved initial fitting, and a method for producing such a differential apparatus.

A still further object of the present invention is to provide a differential apparatus capable of having large torque transmission and being produced at a low cost even though there are limitations in the size of a casing.

A still further object of the present invention is to provide a differential apparatus having improved calmness and durability by ensuring that the inner walls of a differential case strongly engages the outer periphery of a ball holder.

A still further object of the present invention is to provide a differential apparatus having a structure capable of limiting differential rotation in response to torque, whereby an initial differential-limiting force can surely be set with restricted wear of constituent parts.

A still further object of the present invention is to provide a differential apparatus equipped with a differential-limiting means having not only a wide-range friction coefficient, but also differential limitation and durability that are always stable even in use for a long period of time or under severe conditions.

A still further object of the present invention is to provide a differential apparatus equipped with an extremely small differential-limiting means that can set a stable differential limitation under any driving conditions of vehicles, such as rapid, straight acceleration, high-speed cruising, rapid turn or rapid acceleration on a dry road, rapid turn or rapid acceleration on a snow-covered road, low-speed driving with a large radius of turn on a dry road, declutching for braking, etc.

A still further object of the present invention is to provide an easy-to-assemble differential apparatus in which differential limitation can be set stably, and an initial differential-limiting torque can be obtained surely and easily.

SUMMARY OF THE INVENTION

As a result of intense research in view of the above objects, the inventors have made the following discoveries:
(1) To provide the differential apparatus with further improved durability and stable differential-limiting torque characteristics while reducing the variation of torque transmission, a contact stress should be reduced in inflected regions of the winding continuous groove.
(2) When the inner wall of the winding continuous groove is subjected to plastic working, it has a flowed structure, thereby enabling stable torque transmission while preventing cracking on its edges.
(3) By chamfering the edges of the winding continuous groove, cracking and pitting can be prevented on the edges, thereby enabling stable torque transmission.
(4) When a small groove is formed at a bottom of the winding continuous groove of the disc plate, a tip blade of a ball end mill at a zero cutting speed is not brought into contact with the bottom of the winding continuous groove during the rough- or finish-working with the ball end mill, thereby achieving good cutting of the winding continuous groove.
(5) By using a disc plate die formed with a winding continuous groove, a ball holder and rolling-forming balls, disposing each ball in one end of each guide hole of the ball holder, sandwiching the ball holder with the disc plate die and a disc plate precursor preliminarily formed with a winding continuous groove, and rotating the ball holder while keeping the disc plate die stationary and the disc plate precursor freely rotatable, thereby forcing the rolling-forming balls to move along the winding continuous groove, a concavely curved surface can be rolling-formed at a high precision on the winding continuous groove at a low cost by the pressure of the balls.
(6) By using a pair of rolling-forming discs each having guide grooves engageable with balls on a grooved surface, sandwiching a ball holder having guide holes formed by a primary working by a punch, an end mill, etc. with a pair of the rolling-forming discs from both sides with the rolling-forming balls disposed in the guide holes of the ball holder, relatively rotating both rolling-forming discs to force the rolling-forming balls to move in the guide holes, curved surface portions can be rolling-formed on the inner walls of the guide holes by the pressure of the balls.
(7) By forming a chemical treatment coating layer or further a solid lubricating layer based on molybdenum disulfide at least on the inner surfaces of the guide holes of the ball holder, the ball holder is provided with excellent wear resistance and galling resistance, and thus resistant to mar with only the chemical treatment coating layer and/or the solid lubricating layer peeling even though slipping occurs particularly in an initial fitting period.
(8) By integrally forming a ball holder such that it has large-radius portions outside the guide holes and small-radius portions at least partially between the adjacent guide holes, and causing the large-radius portions of the ball holder to engage recesses formed on the inner wall of the casing, sufficient torque transmission can be achieved even though there are limitations in the size of the casing. Also, with respect to the casing, it can surely conduct large torque transmission when a ball holder-engaging portions thereof are provided with hardness Hv of 400 or more from a surface to a depth of up to 1 mm.
(9) By implanting pins in a large number of radial through-holes of the differential case, forming recesses corresponding to the pins on the outer periphery of the ball holder, and causing the pins to engage the recesses to fix the ball holder to the differential case, the differential apparatus is provided with improved calmness and durability. The outer periphery of the ball holder can be subjected to cutting after a heat treatment.
(10) When the casing and the disc plates are assembled while being pressed to each other in an axial direction, biasing pressure is given to the disc plates, so that the entire differential apparatus including the differential case and the case cover functions as an elastic body like a spring washer, resulting in the generation of an initial differential-limiting force. Also, by disposing plain washers and bearings (particularly roller bearings) outside the disc plates, parts including the differential case, the case cover and the disc plates are prevented from being worn.

(11) By disposing roller bearings between the axially opposing surfaces of the casing and the disc plates, disposing sliding members or a roller-holding member for rotatably holding rollers in the roller bearings, and changing the sizes of the sliding members or the roller-holding member in an axial direction relative to the diameter of rollers, the sliding members or the roller-holding member is brought into contact with the casing or the disc plates to provide a variable friction coefficient. By selecting the sizes of the sliding members or the roller-holding member in an axial direction relative to the roller diameter, a wide range of friction coefficient is generated, resulting in stable differential limitation and thus improved durability of the differential-limiting means because of no slipping in the rollers.

(12) By providing the casing of the differential-limiting means with a pressure chamber connected to an operating fluid control system, supplying an operating fluid at a pressure corresponding to the driving conditions of the vehicle to the pressure chamber, and pressing the disc plates, the balls and inner parts such as thrust washers, etc. to the casing, stable differential limitation can be obtained under any driving conditions of vehicles. In addition, the differential-limiting means can be extremely miniaturized.

(13) By forming a female screw portion having a larger inner diameter than the outer diameter of the disc plate in the differential case in a flange root portion, forming a male screw portion corresponding to the female screw portion of the differential case in the case cover, and screwing the case cover to the differential case, both of the differential case and the case cover are provided with improved rigidity, ensuring the setting of an initial differential-limiting torque, and further making it easy to assemble the differential apparatus.

The present invention has been completed based on these findings.

Thus, the differential apparatus according to one embodiment of the present invention comprises (a) a casing rotated by a driving force from outside; (b) a pair of opposing disc plates coaxially disposed in the casing, an opposing surface of each disc plate being formed with a circumferentially continuous groove winding such that a radial position changes at a constant period; (c) a plurality of balls rolling in the opposing winding continuous grooves of both disc plates; and (d) a ball holder rotating integrally with the casing and having a plurality of radially extending guide holes, each guide hole movably receiving each ball, wherein the winding continuous groove of each disc plate circumferentially continuously has first guide regions each extending from a radially outer position to a radially inner position of each disc plate and second guide regions each extending from a radially inner position to a radially outer position, inflected regions each connecting each first guide region and each second guide region being larger in width and/or depth than the first guide regions and the second guide regions, whereby a contact stress between the balls and the winding continuous groove is decreased in the inflected regions.

It is preferable that the winding continuous groove is constituted by a plurality of circumferentially continuous unit regions, that each unit region is constituted by a first guide region extending to cause the balls to move from a radially outer position to a radially inner position of the disc plate, a second guide region extending to cause the balls to move from a radially inner position to a radially outer position of the disc plate, and a third guide region keeping the balls at a constant radial position of the disc plate, and that inflected regions are curved boundary regions existing between the first guide region and the second guide region, between the second guide region and the third guide region, between the third guide region and the second guide region, and between the second guide region and the first guide region. Any of the first guide region, the second guide region and the third guide region is preferably linear except for the boundary regions. Further, the inflected regions are preferably larger in width and/or depth than the other regions by 0.1–1%.

In a preferred embodiment of the present invention, the ball holder disposed between a pair of disc plates, which is engaged to the casing, has radially elongated guide holes for holding balls circumferentially at an equal interval, the radial length of each guide hole corresponding to the radial movement range of a ball.

In another preferred embodiment of the present invention, a differential-limiting means such as a thrust washer or a needle bearing is disposed between the outside surface of each disc plate and the inner wall of the casing. When a torque applied to one disc plate decreases, a sliding friction force is generated between the outside surface of the disc plate and the differential-limiting means by a thrust force generated by contact of the balls with the winding continuous groove, thereby generating a differential-limiting torque.

One example of the preferred differential apparatus of the present invention comprises (a) a casing having an opening on each side wall; (b) a pair of disc plates rotatably received in the casing and having connecting portions each connectable to a shaft rotatably supported by each opening of the casing, an opposing surface of each disc plate being formed with a circumferentially continuous groove winding such that a radial position changes at a constant period; (c) a plurality of balls rolling in the winding continuous grooves of a pair of disc plates; and (d) a ball holder disposed between a pair of disc plates and engaging the casing, the ball holder having radially elongated guide holes each holding one ball circumferentially at an equal interval, wherein the winding continuous groove has first guide regions each extending from a radially outer position to a radially inner position and second guide regions each extending from a radially inner position to a radially outer position, inflected regions each connecting each first guide region and each second guide region being larger in width and/or depth than the first guide regions and the second guide regions, whereby a contact stress between the balls and the winding continuous groove is decreased in the inflected regions.

In a further preferred embodiment of the present invention, the winding continuous groove is formed by plastic working, with its edges chamfered. The edges of the winding continuous groove are preferably provided with curved surfaces.

In a still further preferred embodiment of the present invention, the bottom of the winding continuous groove is provided with a small groove having a width of 0.1–0.5 as a ratio to the diameter of the ball.

In a still further preferred embodiment of the present invention, the winding continuous groove has a rolling-formed surface having a shape error of 100 $\mu$m or less and a surface roughness Rz of 30 $\mu$m or less. Such a winding continuous groove is preferably formed by forcing the rolling-forming balls to move while pressing them to the winding continuous groove.

Specifically, it is preferable that using a disc plate precursor having a groove with a rolling-forming margin left in advance, rolling-forming balls, a ball holder having radial guide holes for holding the rolling-forming balls, a disc plate die coaxially opposing to the disc plate precursor and having a guide groove for the rolling-forming balls, and a means for pressing the rolling-forming balls to the disc plate precursor, the disc plate die and the disc plate precursor are relatively rotated to rolling-form the winding continuous groove.

An apparatus for producing a ball holder for a differential apparatus according to a preferred embodiment of the present invention comprises (1) rolling-forming balls received in guide holes formed in advance in a ball holder with a plastic deformation margin left; (2) a pair of rolling-forming discs having on opposing surfaces thereof guide grooves for rotatably holding and guiding the rolling-forming balls; (3) a means for relatively rotating a pair of rolling-forming discs in a state that they are disposed on both sides of the ball holder for holding the rolling-forming balls in the guide holes, the rolling-forming balls being forced to move along the inner walls of the guide holes by the relative rotation of a pair of rolling-forming discs, thereby rolling-forming curved surface portions corresponding to the rolling-forming balls on the inner walls of the guide holes.

The method for producing such a ball holder for a differential apparatus comprises (a) forming guide holes in the ball holder with a plastic deformation margin left in advance; (b) sandwiching the ball holder coaxial with a pair of rolling-forming discs having guide grooves for rotatably holding and guiding the rolling-forming balls on opposing surfaces, with the rolling-forming balls held in the guide grooves of the ball holder; (c) relatively rotating a pair of rolling-forming discs to force the rolling-forming balls to move along the inner walls of the guide holes, thereby rolling-forming curved surface portions corresponding to the rolling-forming balls on the inner walls of the guide holes.

In another preferred embodiment of the present invention, at least inner surfaces of the guide holes of the ball holder are provided with (a) a chemical treatment coating layer, or (b) a chemical treatment coating layer and a solid lubricating layer based on molybdenum disulfide in this order from below. The solid lubricating layer is preferably formed by (a) forming a chemical treatment coating layer by treatment with a phosphate chemical treatment agent, and then (b) applying a coating composition based on molybdenum disulfide, followed by a drying or baking treatment under the conditions of room temperature to 300° C. for 5–60 minutes.

In a further preferred embodiment of the present invention, large-radius portions of the ball holder in the peripheral portions near the guide holes are inserted into the recesses of the casing, so that large torque transmission can be achieved even though there are limitations in the outer diameter of the casing. When the large-radius portions of the ball holder freely engage the recesses of the casing, the ball holder and the casing need not have unnecessarily high working precision, resulting in decrease in a production cost. The engaging portions of the casing preferably have hardness Hv of 400 or more from surface to a depth of up to 1 mm, and such hardness is preferably given by a heat treatment comprising high-frequency hardening and tempering.

In a still further preferred embodiment of the present invention, the ball holder is integrally fixed to the casing by causing engaging members implanted in radial through-holes of the casing to engage with recesses formed on an outer periphery of the ball holder. The engaging members are preferably implanted in the casing from inside.

In a still further preferred embodiment of the present invention, the winding continuous groove formed on an opposing surface of each disc plate has a rolling-formed surface having a shape error of 100 $\mu$m or less and a surface roughness Rz of 30 $\mu$m or less. The winding continuous groove can be formed on an opposing surface of the disc plate by preparing (a) a disc plate precursor having a roughly worked winding continuous groove with a rolling-forming margin left in advance, (b) rolling-forming balls, (c) a ball holder having guide holes for holding the rolling-forming balls, (d) a disc plate die coaxially opposing to the disc plate precursor and having guide grooves for rolling-forming balls, and (e) a means for pressing the rolling-forming balls to the disc plate precursor, and rotating at least one of the disc plate die and the disc plate precursor to rolling-form grooves of the disc plate precursor with the rolling-forming balls at a high precision. The rolling-forming margin is preferably 0.02–2 mm, and the radius of each rolling-forming ball is preferably the radius of each ball used for the differential apparatus +0 to 2 mm.

In a still further preferred embodiment of the present invention, the disc plates are assembled in the casing in a manner that their outside surfaces are pressed to the casing in an axial direction, thereby providing an initial differential-limiting force. Plain washers and/or bearings are preferably disposed on the outside surfaces of a pair of disc plates. The bearings are preferably roller bearings. When the disc plates are assembled in the casing in a manner that they are pressed to each other, biasing pressure is given to the disc plates in advance. Accordingly, the overall differential apparatus functions as an elastic body like a spring washer, giving an initial differential-limiting force. With plain washers disposed on the outside surfaces of the disc plates, there is little wear on end surfaces of inner and outer diameters, thereby stably providing axially inward biasing pressure. Also, with the roller bearings, the casing and the disc plates can be prevented from being worn, thereby improving the durability of the differential apparatus.

In a further preferred embodiment of the present invention, the differential-limiting means disposed between the casing and the ball holder comprises a plurality of rollers and sliding members disposed between the rollers, the sliding members having contact resistance changeable with the casing and the disc plates depending on a rotation force. In another embodiment, the differential-limiting means comprises a plurality of rollers rolling in contact with the casing and the disc plates when the difference in rotation is generated between a pair of disc plates, and a roller-holding member for rotatably holding each roller at a predetermined interval in a circumferential direction, the roller-holding member being brought into contact with the casing and the disc plates depending on the rotation force.

In a still further preferred embodiment of the present invention, the casing is provided with a pressure chamber connected to a controlling operating fluid system, to supply the operating fluid to the pressure chamber with pressure variable depending on the driving conditions of a vehicle.

In a still further preferred embodiment of the present invention, the differential case is formed with a female screw portion having a larger inner diameter than the outer diameter of the disc plates in a flange root portion, and a male screw portion corresponding to the female screw portion of the differential case is formed in the case cover, the female screw portion of the differential case being fixed to the male screw portion of the case cover by screwing, thereby providing an initial differential-limiting torque. The initial differential-limiting torque is in a linear relation with a clamping torque by screwing. The screwing engagement portion is preferably fixed by welding, small screws or both to increase the rigidity of the casing, resulting in decrease in the deviation of balls from a center of the winding continuous groove, thereby improving the durability of the differential apparatus. Also, gaps between the casing and the disc plates in an axial direction can be set precisely.

THE BEST MODES FOR CARRYING OUT THE INVENTION

[1] Basic Structure of Differential Apparatus

Figure 1:
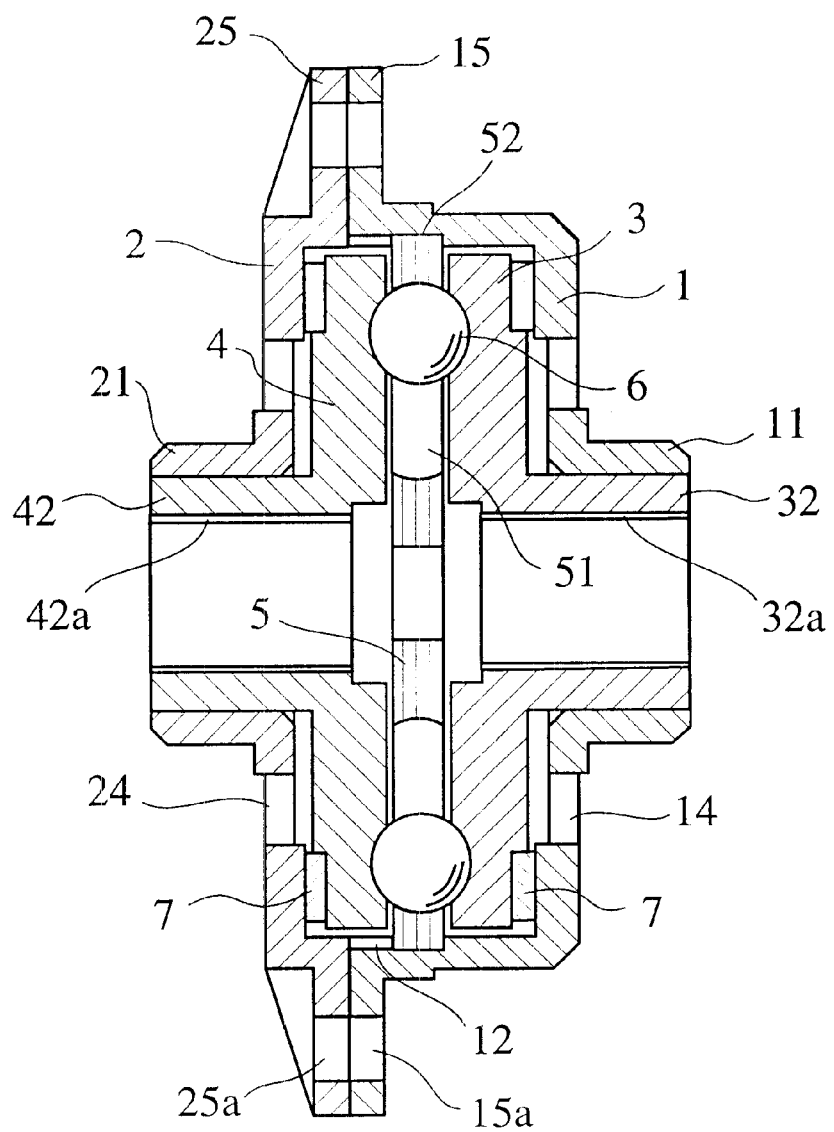
FIG. 1 is a vertical cross-sectional view showing a differential apparatus according to one preferred embodiment of the present invention.
Figure 2:
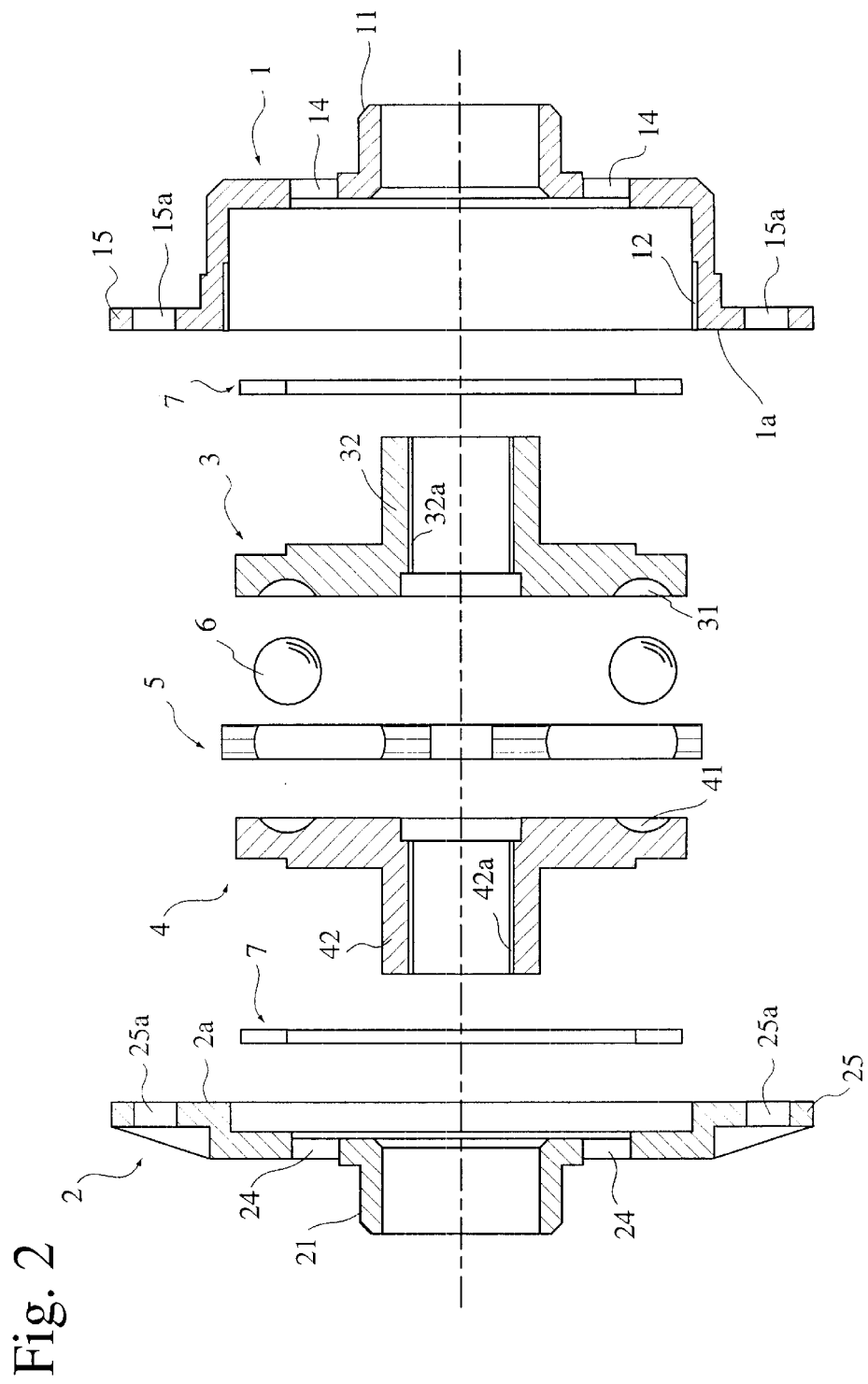
FIG. 2 is an exploded cross-sectional view showing the differential apparatus of FIG. 1.
Figure 3:
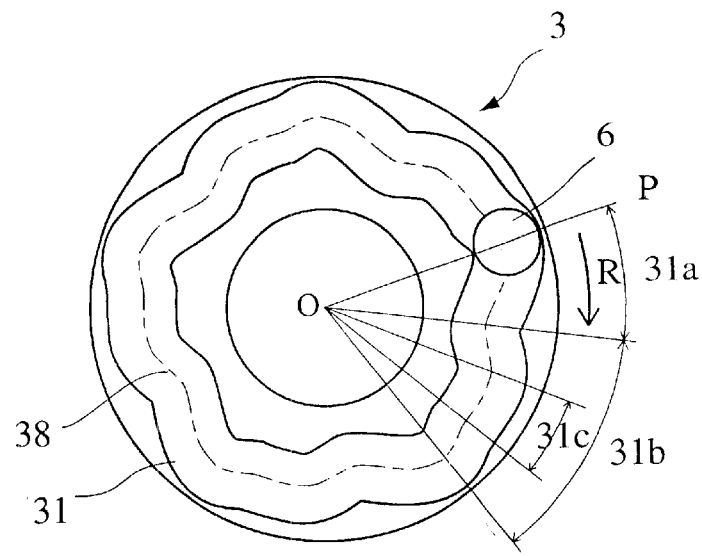
FIG. 3 is an exploded front view showing a pair of disc plates, a ball holder and balls in the differential apparatus of FIG. 1.
Figure 3:
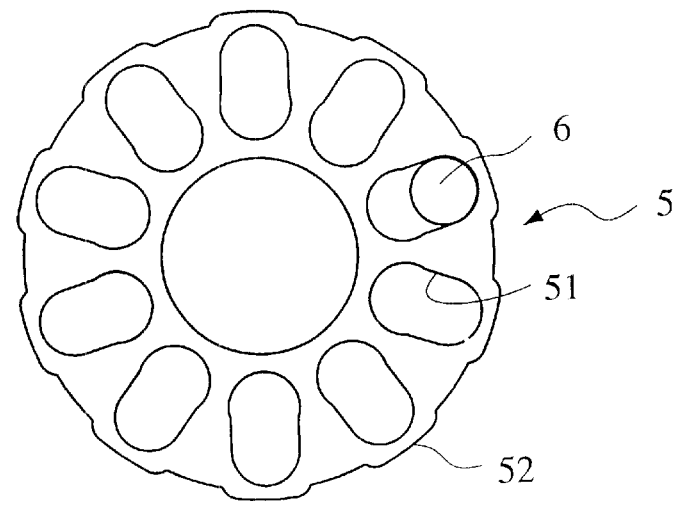
Figure 3:
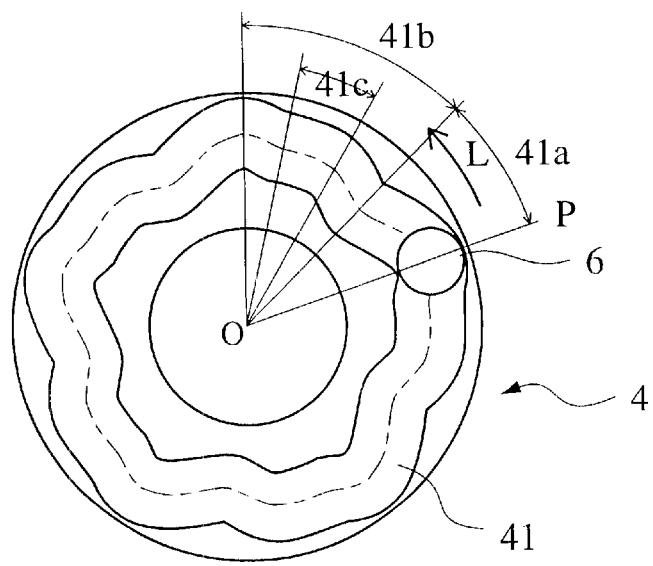
Figure 4:
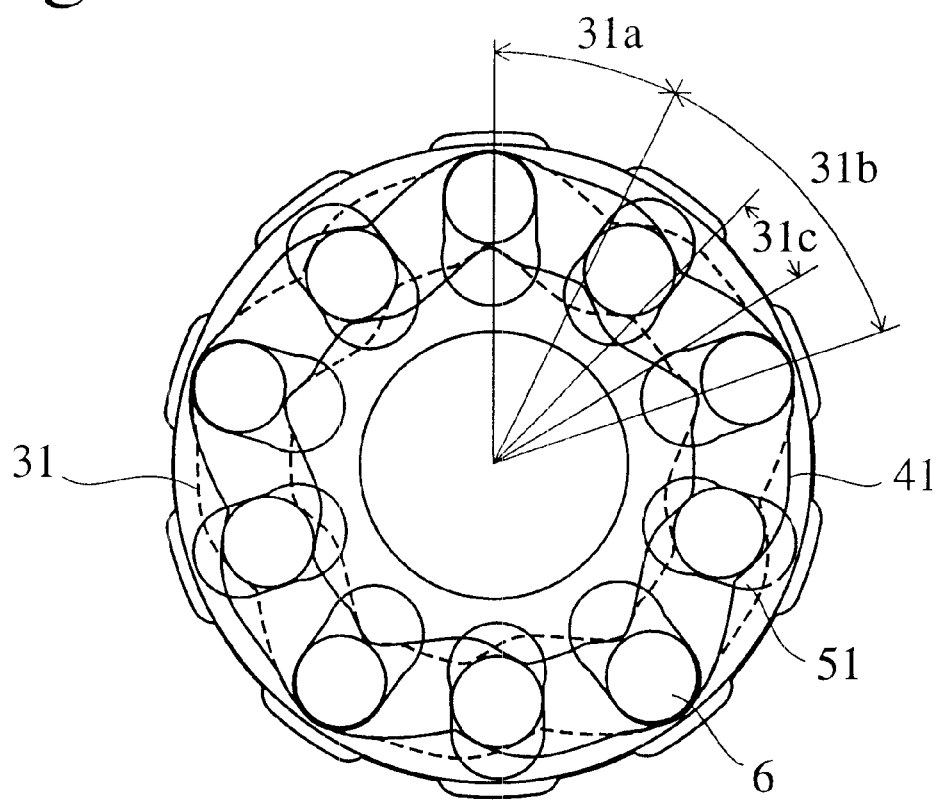
FIG. 4 is a front view showing an assembly of a pair of disc plates, a ball holder and balls in FIG. 3.

FIG. 1 is a vertical cross-sectional view showing the differential apparatus according to the preferred embodiment of the present invention, FIG. 2 is an exploded cross-sectional view showing the differential apparatus of FIG. 1, FIG. 3 is an exploded front view showing the relation between winding continuous grooves of a pair of disc plates, guide holes of a ball holder and balls, and FIG. 4 is a view showing a state in which the disc plates, the ball holder and balls shown in FIG. 3 are assembled.

The basic structure of the differential apparatus shown in FIG. 1 is the same as disclosed by Japanese Patent Laid-Open No. 8-170705. As shown in FIG. 2, the differential apparatus of this embodiment comprises a case 1 having an open end on one side and an annual projection 11 coaxial with the open end on the other side, a shallow dish-shaped case cover 2 having as large an open end 2*a* as the open end 1*a* of the case 1 on one side and an annual projection 21 coaxial with the open end 2*a* on the other side, a pair of opposing disc plates 3, 4 disposed coaxially with each other, a ball holder 5 sandwiched by a pair of disc plates 3, 4, a plurality of balls 6 rotatably held by the ball holder 5, and a pair of thrust washers 7, 7 positioned outside the disc plates 3, 4.

As shown in FIG. 3, the opposing surfaces of the disc plates 3, 4 are formed with circumferential, continuous grooves 31, 41 winding such that a radial position changes at a constant period. Each winding continuous groove 31, 41 has such an arcuate cross section that the balls 6 can roll therethrough (see FIG. 2). Each disc plate 3, 4 is provided on the other end with an annual projection 32, 42 for connecting to a drive shaft (not shown) of a vehicle. The inner wall of each annual projection 32, 42 is provided with threaded grooves 32*a*, 42*a* for fixing the drive shaft.

The ball holder 5 has a large number of guide holes 51 each having such a width as to receive a ball 6 and being so elongated that the ball 6 can radially move back and forth. The radial length of the guide hole 51 restricting the reciprocation range of the ball 6 is equal to the difference between the radially outermost position (farthest position from the center) and the radially innermost position (closest position to the center) of each winding continuous groove 31, 41.

Returning to FIG. 2, the coaxial annual projection 11 of the case 1 functions as a bearing for rotatably supporting one disc plate 3. The inner wall of the case 1 is formed with a groove 12 engageable with the peripheral projections 52 of the ball holder 5 such that the ball holder 5 is prevented from rotating. Side walls of the case 1 and the case cover 2 have a plurality of apertures 14, 24, so that a lubricating oil can flow into the case. Flanges 15, 25 extending from the open end 1a of the case 1 and the open end 2a of the case cover 2 have a large number of apertures 15a, 25a, into which bolts (not shown) are inserted to fix the case cover 2 to the case 1.

The thrust washers 7, 7 are disposed between the case 1 and the disc plate 3 and between the case cover 2 and the disc plate 4, being in slidable contact with the outside surfaces of the disc plates 3, 4. When there is no difference in rotation between both driving wheels (not shown), or when none of the driving wheels is running idle, no thrust force is applied to the disc plate 3 or 4, resulting in substantially no friction force between the disc plates 3, 4 and the thrust washers 7, 7.

Referring to FIGS. 3–6, the relation of the winding continuous grooves 31, 41 of the disc plates 3, 4 with the balls 6 and the guide holes 51 of the ball holder 5 will be explained. As is clear from FIG. 3, the winding continuous groove 31 of the disc plate 3 is circumferentially continuously constituted by a plurality of unit regions each consisting of a first guide region 31a extending such that a ball 6 moves from a radially outer position to a radially inner position, a second guide region 31b extending such that a ball 6 moves from a radially inner position to a radially outer position, and a third guide region 31c for keeping a ball 6 at a constant radial position on the disc plate 3. In the case of the embodiment shown in FIG. 3, each unit region has a rotation angle θ of 72°, whereby there are five unit regions in one circle.

The other disc plate 4 also has a plurality of unit regions extending circumferentially continuously, each unit region being constituted by a first guide region 41a, a second guide region 41b extending such that a ball 6 moves from a radially inner position to a radially outer position of the disc plate 4, and a third guide region 41c for keeping a ball 6 at a constant radial position on the disc plate 4.

Because the winding continuous groove 31 of the disc plate 3 is in a mirror image relation with the winding continuous groove 41 of the disc plate 4 with respect to a radius extending through the end of each unit region (for instance, radius OP in FIG. 3), the ball 6 passes through the same locus in opposite directions. The combination of both disc plates 3, 4 with the ball holder 5 is as shown in FIG. 4. Thus, when the ball 6 moves along the winding continuous groove 31 of the disc plate 3 in a direction shown by the arrow R (clockwise direction), it moves along the completely the same locus in the winding continuous groove 41 of the disc plate 4 in a direction shown by the arrow L (counterclockwise direction). Accordingly, when one disc plate 3 is rotated with the ball holder 5 stationary, the other disc plate 4 rotates at the same speed in the opposite direction. In this case, when the ball 6 moves along the winding continuous grooves 31, 41 by a rotation angle of 72° (thus, it moves in a unit region), it once radially reciprocates in the guide hole 51 of the ball holder 5.

Focusing on a winding continuous groove 31 of one disc plate 3, its winding shape for providing a radial displacement to a moving ball 6 will be discussed. Explanation of the winding shape of the winding continuous groove 31 will be applicable to the winding continuous groove 41 as it is.

[2] Winding Continuous Groove (A) Inflected Region

Figure 5:
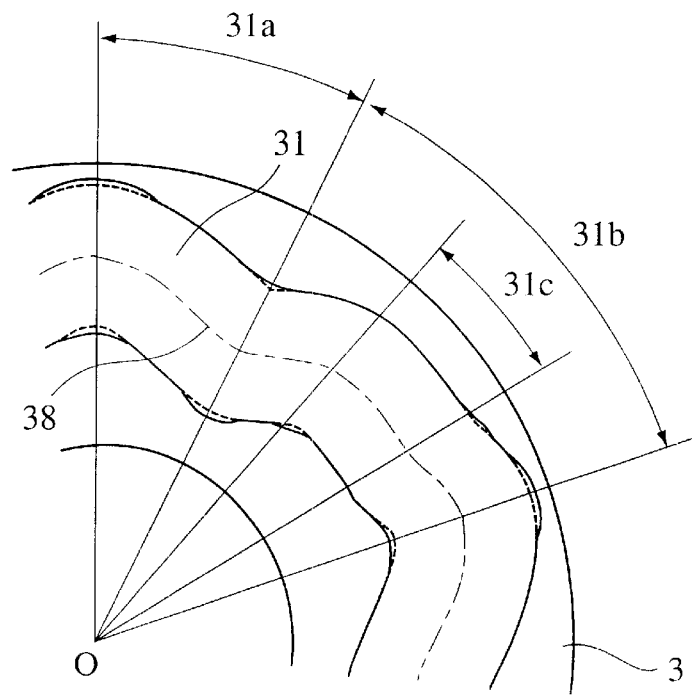
FIG. 5 is a partial, enlarged front view showing the details of a winding continuous groove of the disc plate of FIG. 3.
Figure 6:
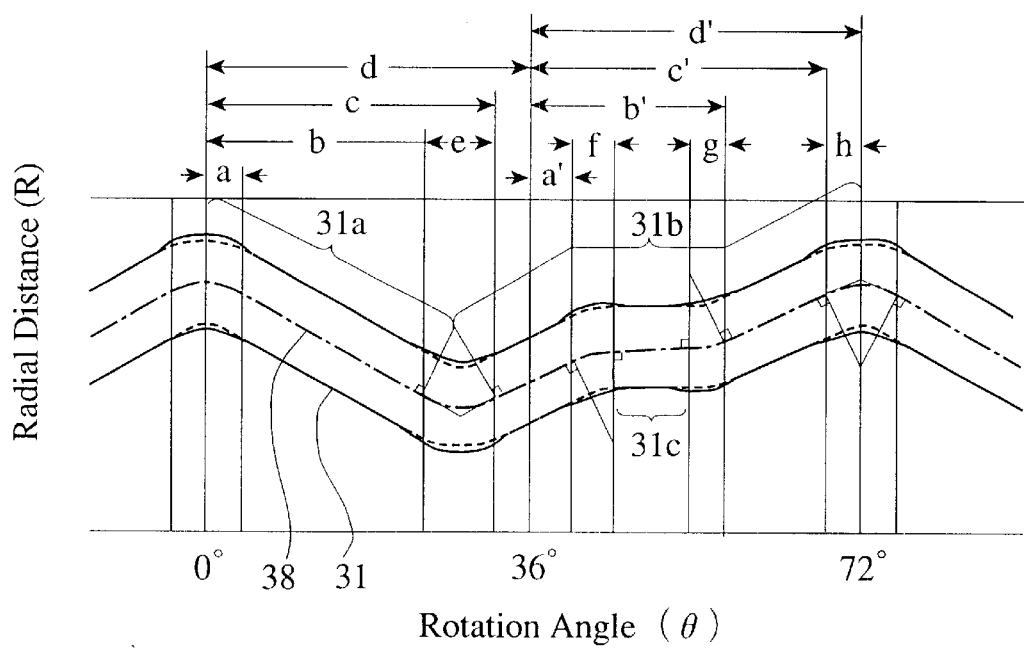
FIG. 6 is a linear development view showing one unit region in the winding continuous groove of the disc plate.
Figure 20:
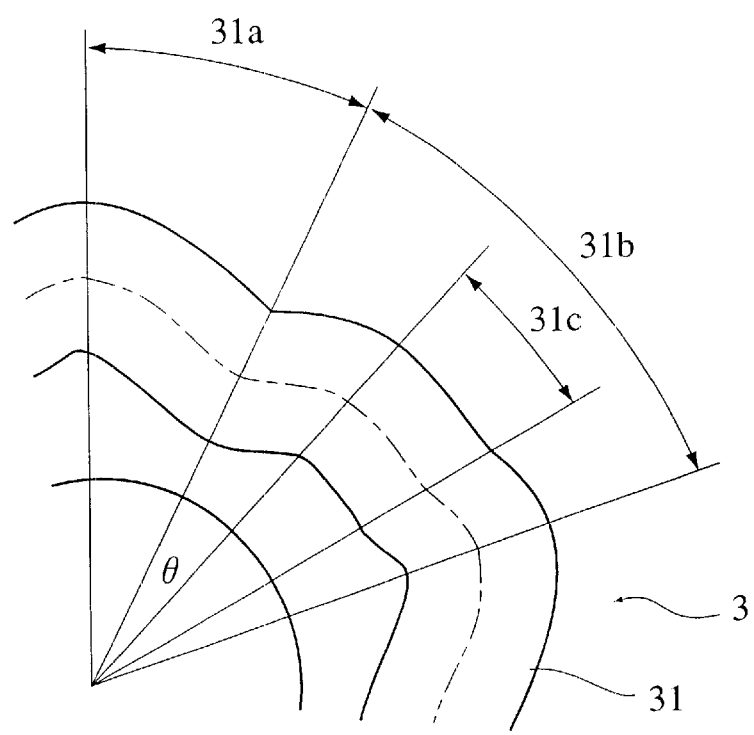
FIG. 20 is a partial, enlarged view showing the details of the winding continuous groove of the disc plate in FIG. 19.
Figure 21:
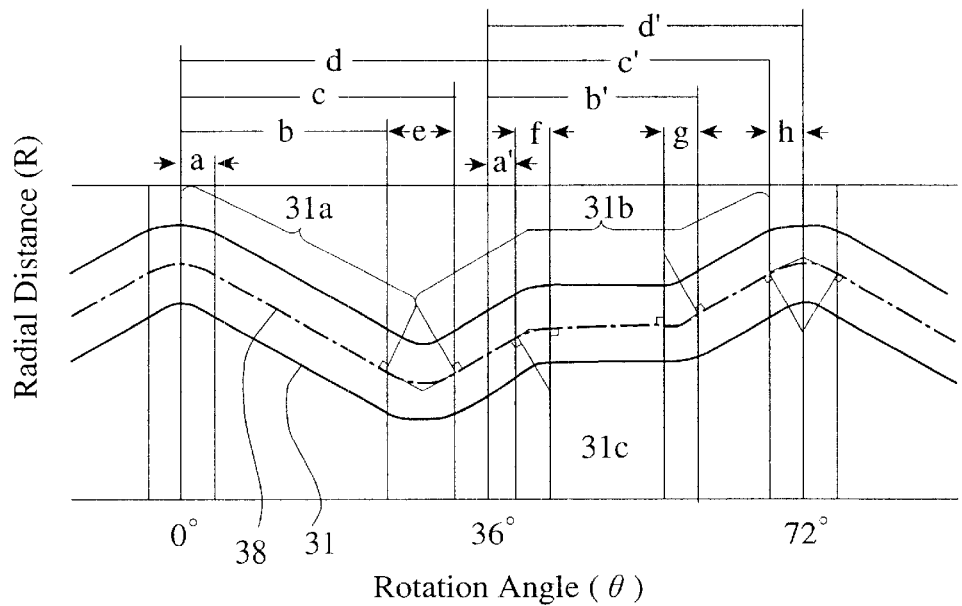
FIG. 21 is a linear development view showing one unit region of the winding continuous groove in FIG. 20.
Figure 22:
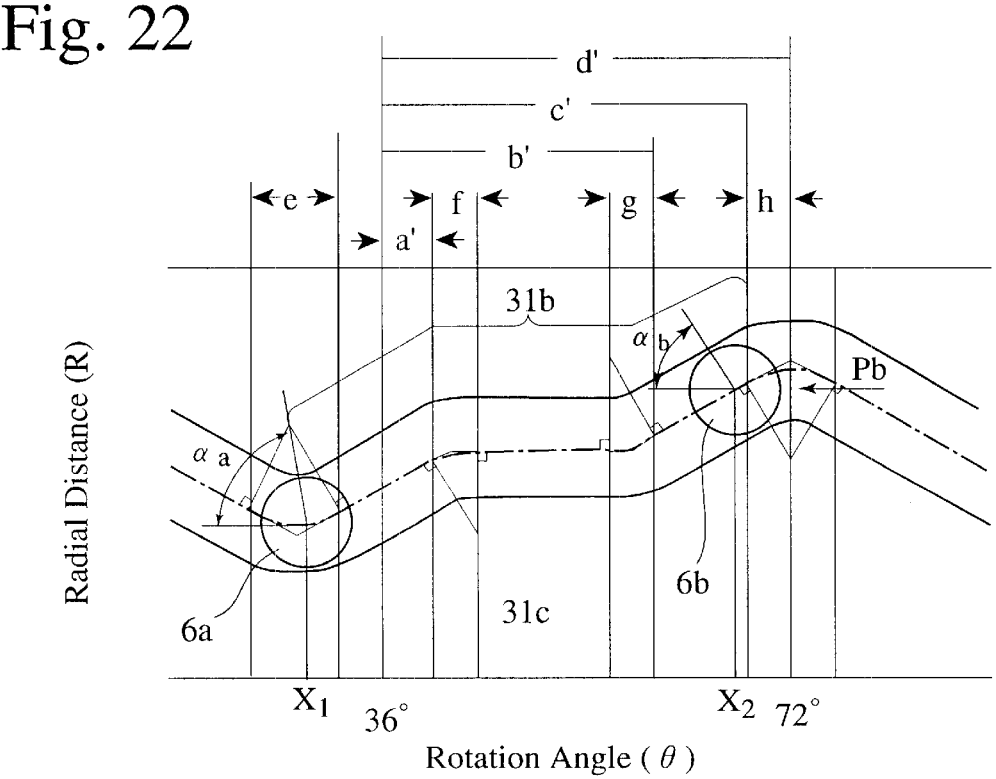
FIG. 22 is a development view showing the details of the unit region of the winding continuous groove in FIG. 21.
Figure 23:
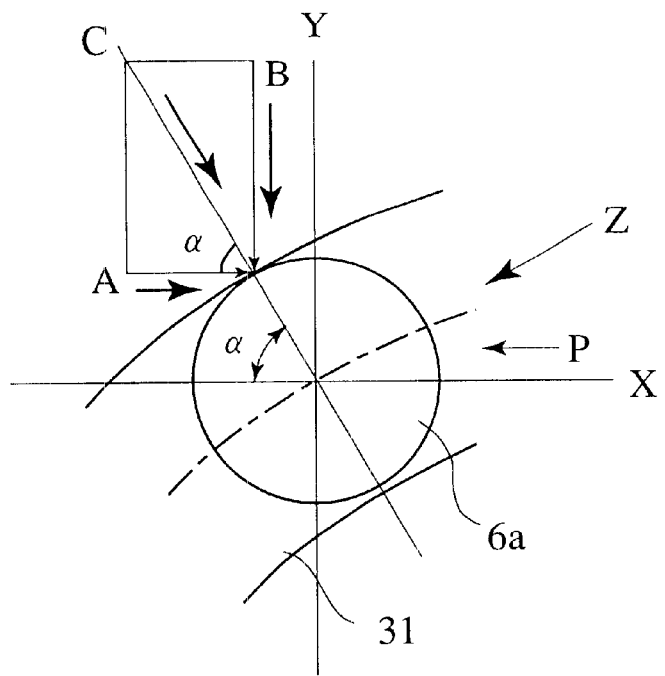
FIG. 23 is a partial, enlarged view showing a state in which a ball is in contact with the winding continuous groove.
Figure 24:
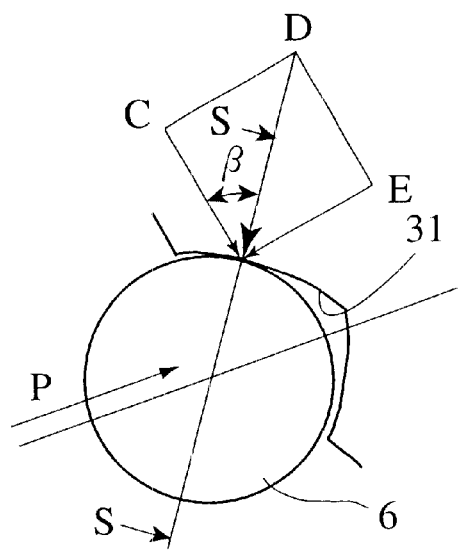
FIG. 24 is a partial, enlarged view showing a state in which a ball is in contact with the winding continuous groove.
Figure 25:
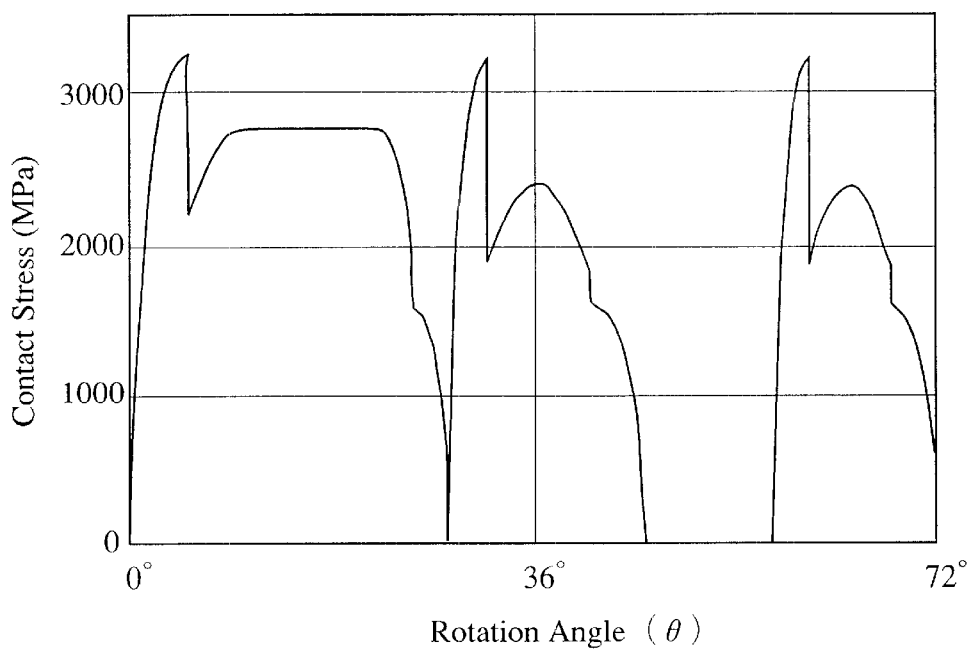
FIG. 25 is a graph showing the calculation results of contact stress generated between balls and the winding continuous groove in the differential apparatus of Japanese Patent Laid-Open No. 8-170705.
Figure 26:
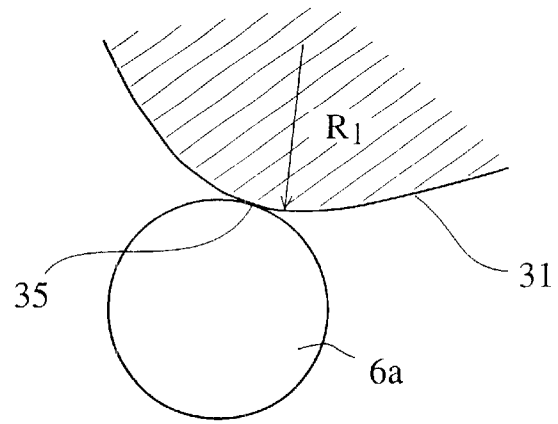
FIG. 26 is a partial, enlarged view showing a state in which a ball at a position $X_1$ in FIG. 22 is in contact with the inner wall of the winding continuous groove.
Figure 27:
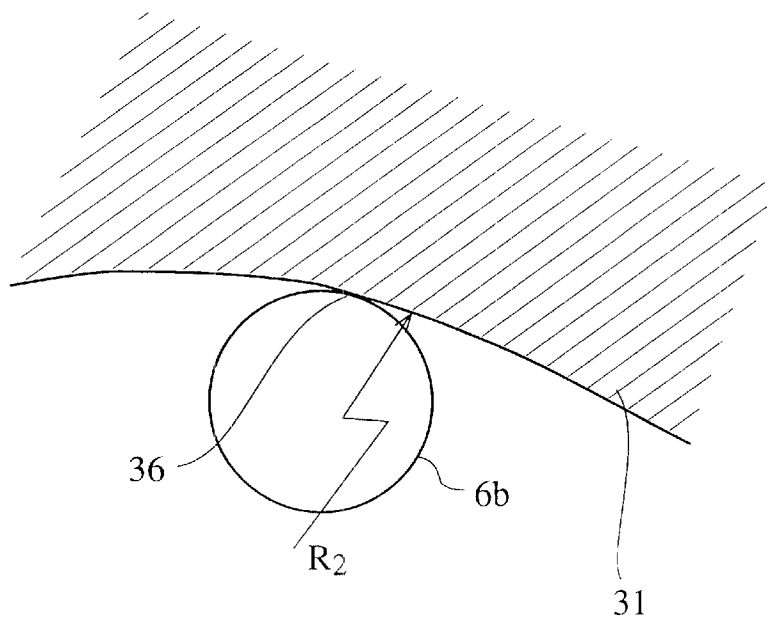
FIG. 27 is a partial, enlarged view showing a state in which a ball at a position $X_2$ in FIG. 22 is in contact with the inner wall of the winding continuous groove.

Referring to FIGS. 5 and 6, the details of the shapes of both winding continuous grooves 31, 41 and the movement of a ball 6 will be described in detail below. FIG. 6 shows the linear development of one unit region 33 in the winding continuous groove 31. As in the explanation concerning FIGS. 20 and 21, when the ball 6 is at a radially inverting position, at which the radial distance from the ball 6 to the center of the disc plate 3 changes in a manner of increase→decrease or decrease→increase, or in a third guide region 31c, no force is transmitted between the ball 6 and the winding continuous groove 31. However, while the ball 6 is in other regions, a force is transmitted to an arcuate inner wall of the winding continuous groove 31. With a winding shape of the winding continuous groove 31 satisfying the conditions of a≦a', b≦b', c≦c', and d=d', when one of the two balls 6 in the regions 31a, 31b is at a position at which no force is transmitted, the other ball 6 must be at a position at which a force is transmitted.

In regions except for the regions a, e, f, 31c, g and h in the winding continuous groove 31, a contact angle of the ball 6 to the winding continuous groove 31 changes such that an axial component force (thrust force) of the ball 6 to the disc plate 3 changes in proportion to a rotation torque applied to the case 1. Thus, a differential-limiting torque due to friction with the thrust washers 7, 7 is proportional to a rotation torque applied to the case 1. The above theory is applicable without modifications to a case where the rotation angle of the unit region of the winding continuous groove 31 is not 72°.

As shown in FIGS. 5 and 6, the winding continuous groove 31 is constituted by substantially linear regions and inflected regions curvedly connecting the substantially linear regions. In the embodiment shown in FIG. 6, the substantially linear regions are regions except for the regions a, e, f, g and h, and the inflected regions are the regions a, e, f, g and h. Here, "substantially linear" is not restricted to completely linear but includes a case where the region is slightly curved at an extremely smaller degree of curve than the inflected region. Also, the term "curvedly connecting" means that both substantially linear regions are not directly connected to each other, but that there is a region having gradually changing inclination between them. The degree of curve (radius of curvature) of the inflected region is not particularly restricted and preferably in a range of 7.1–7.5 mm when the ball has a diameter of 14 mm, from the practical point of view.

The inflected region (regions a, e, f, g and h) are widened than the other regions in the winding continuous groove 31. It is preferable that the width of the widened regions in the winding continuous groove 31 continuously changes in a manner that it gradually increases and then decreases. The overall structure of the winding continuous groove 31 is designed such that when one of the two balls 6 in the regions 31a and 31b is located in a widened region of the winding continuous groove 31, the other ball 6 is located in a narrow region of the winding continuous groove 31.

Figure 7:
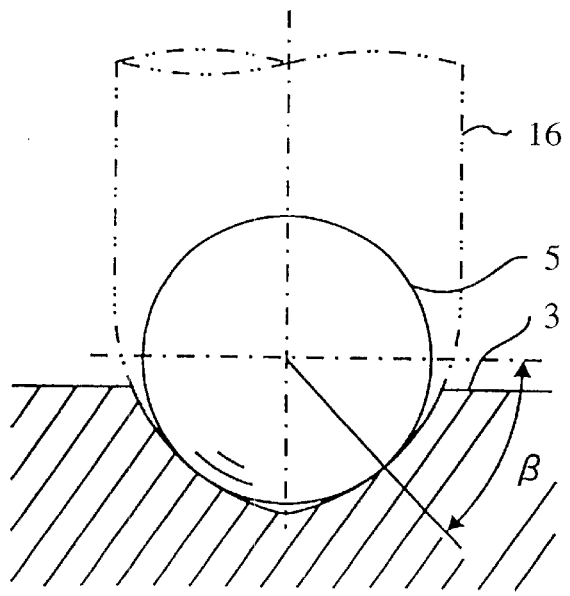
FIG. 7 is an enlarged cross-sectional view showing a method for working the winding continuous groove of the disc plate and its relation with a ball.
Figure 8:
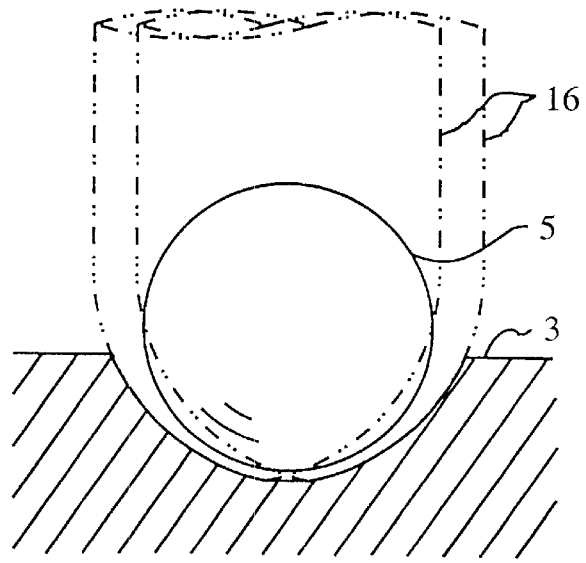
FIG. 8 is an enlarged cross-sectional view showing a method for working a widened region in the winding continuous groove of the disc plate and its relation with a ball.
Figure 9:
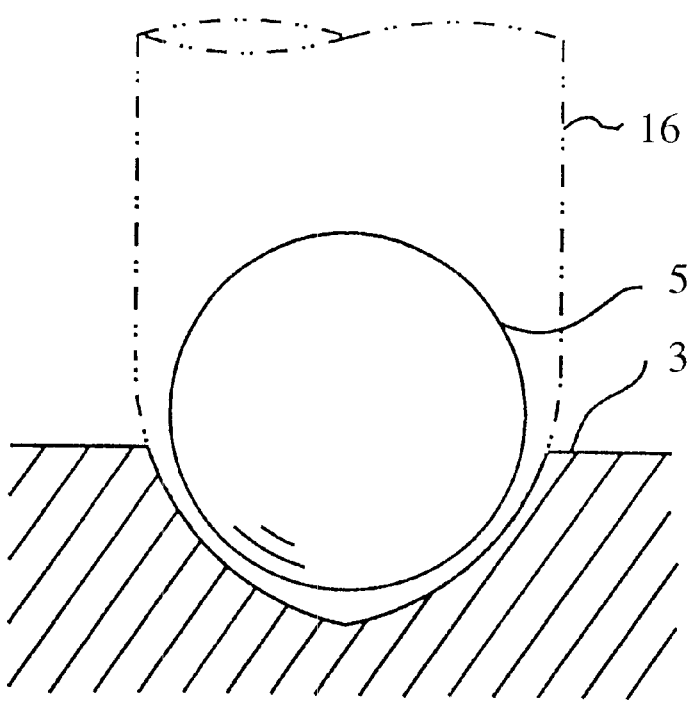
FIG. 9 is an enlarged cross-sectional view showing a method for forming a deepened region in the winding continuous groove of the disc plate and its relation with a ball.

FIG. 7 shows a method for working other regions, which are not widened or deepened than the inflected region in the winding continuous groove 31. The region shown in FIG. 7 may be formed by usual cutting with an end mill 16. FIGS. 8 and 9 show methods for working the widened regions and the deepened regions of the winding continuous groove. The widened regions in FIG. 8 can be worked by advancing an end mill 16 with a lateral shift of, for instance, 0.005 mm, and the deepened regions in FIG. 9 can be worked by advancing an end mill 16 at a deeper point, for instance, by 0.005 mm. In any case, there is a gap between balls 6 and the inner wall of the winding continuous groove 31.

Figure 10:
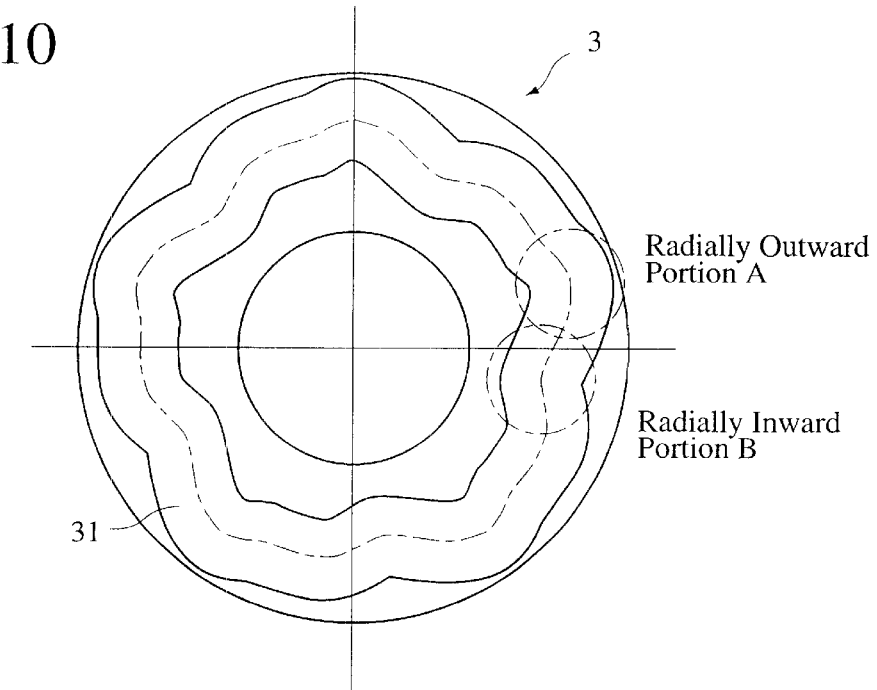
FIG. 10 is a schematic view explaining the shape of the widened regions in the winding continuous groove.

FIG. 10 is a view for explaining the shape of the widened regions of the winding continuous groove 31. In a radially outward portion A, the winding continuous groove 31 has an outer wall $31_{out}$ outwardly shifting with a larger radius of curvature (a small radius of curvature in an inner wall $31_{in}$). In a radially inward portion B, the winding continuous groove 31 has an outer wall $31_{out}$ inwardly shifting with a smaller radius of curvature (a larger radius of curvature in an inner wall $31_{in}$)

Figure 11:
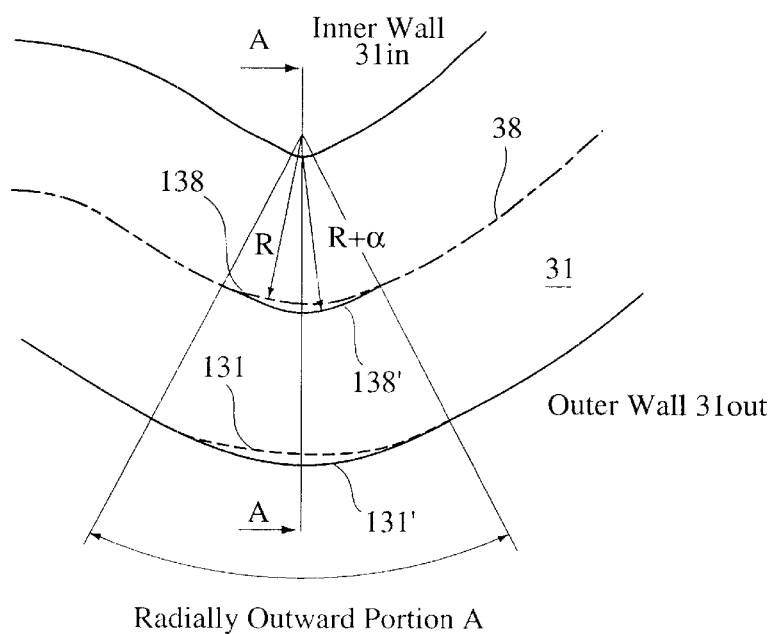
FIG. 11 is a view showing one example of the detailed shape of a widened region in a radially outward portion A in the winding continuous groove.

FIG. 11 shows the details of the widened regions of the winding continuous groove 31 in a radially outward portion A. In the radially outward portion A, a dotted line 131 indicates an unexpanded outer wall, and a solid line 131' indicates an expanded outer wall. A dotted line 138 indicates a locus of the center of an end mill (not shown) moving in the working of an inner wall $31_{in}$ in the widened regions, the locus being identical to center line 38 of the unexpanded outer wall. Further, a solid line 138' indicates a locus of the center of an end mill moving in the working of an outer wall 131' in the widened regions, the locus being deviated outwardly from the center line 38 of the unexpanded outer wall. The dotted line 138, which is a locus for cutting the inner wall $31_{in}$, has a radius of curvature R+α, while the solid line 138', which is a locus for cutting the outer wall 131', has a radius of curvature R. The outer wall 131' is outwardly shifting from the original outer wall $31_{out}$ by the difference α between both radii of curvature. Here, α is 0 at both ends of the widened regions, while it is the maximum at a center.

Figure 12:
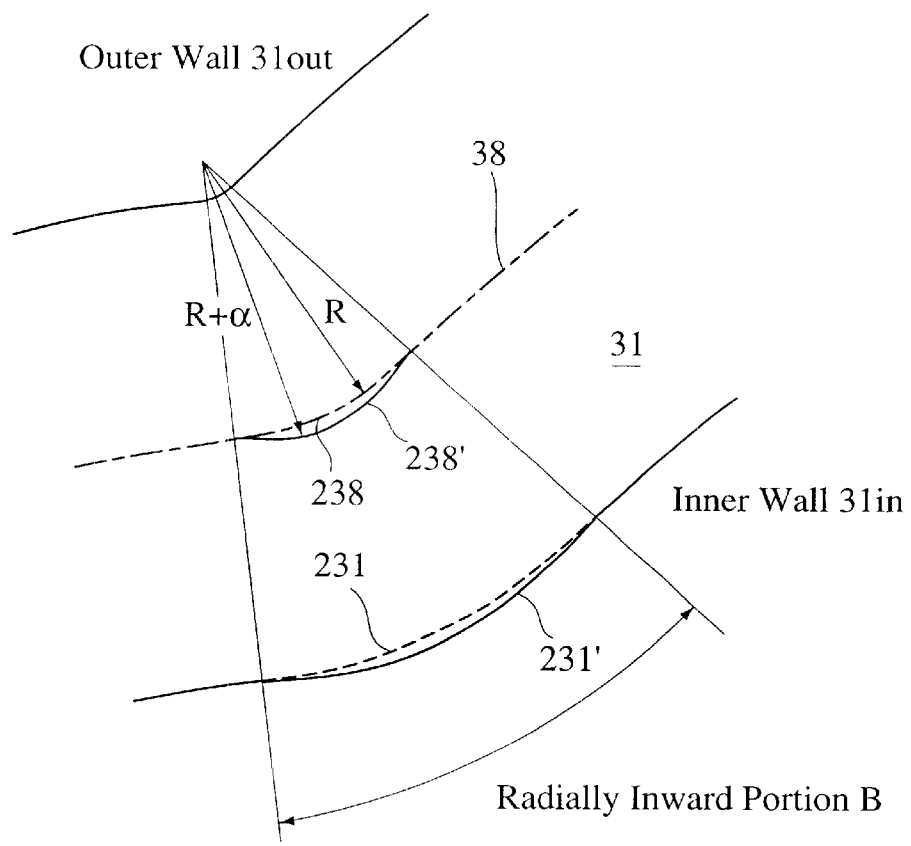
FIG. 12 is a view showing one example of the detailed shape of the widened region in a radially inward portion B in the winding continuous groove.

FIG. 12 shows in detail the shape of the widened region in a radially inward portion B of the winding continuous groove 31. In the radially inward portion B, a dotted line 231 indicates an unexpanded inner wall, while a solid line 231' indicates an expanded inner wall. A solid line 231' indicates an expanded inner wall. A dotted line 238 indicates a locus of the center of an end mill moving in the working of an outer wall $31_{out}$ in the widened region, the locus being identical to centerline 38 of the unexpanded outer wall. Further, a solid line 238' indicates a locus of the center of an end mill moving in the working of an outer wall 231' in the widened region, the locus being deviated outwardly from the center line 38 of the unexpanded outer wall. The dotted line 238, which is a locus for cutting the outer wall $31_{out}$, has a radius of curvature R+α, while the solid line 238', which is a locus for cutting the outer wall $31_{out}$, has a radius of curvature R. The inner wall 231' is inwardly shifting from the inner wall $31_{in}$ by the difference a between both radii of curvature.

Figure 13:
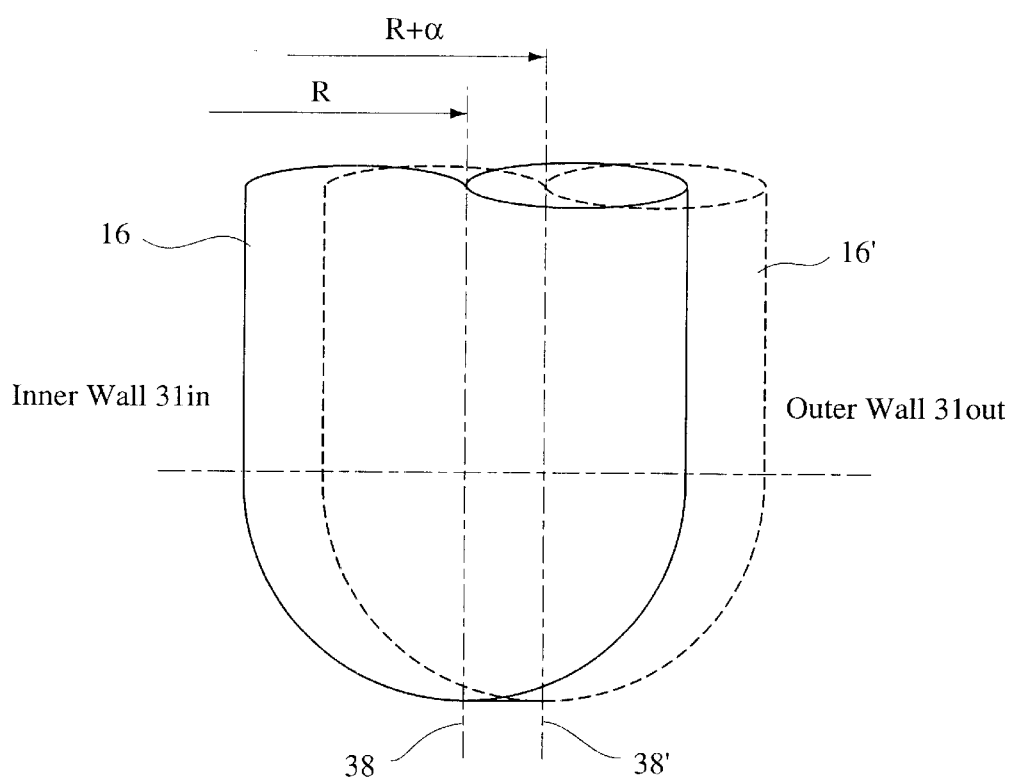
FIG. 13 is a view showing the cutting of the widened region in a radially outward portion A by an end mill.

FIG. 13 shows the cutting of the widened region in a radially outward portion A by an end mill 16. First, the inner wall $31_{in}$ is cut along the coating layer 38 having a radius of curvature R, and the outer wall $31_{out}$ is then cut along the coating layer 38 having a radius of curvature R+α. Accordingly, the outer wall $31_{out}$ is outwardly shifting in the widened region by α (0 at both ends of the widened region and the maximum at a center).

Figure 14:
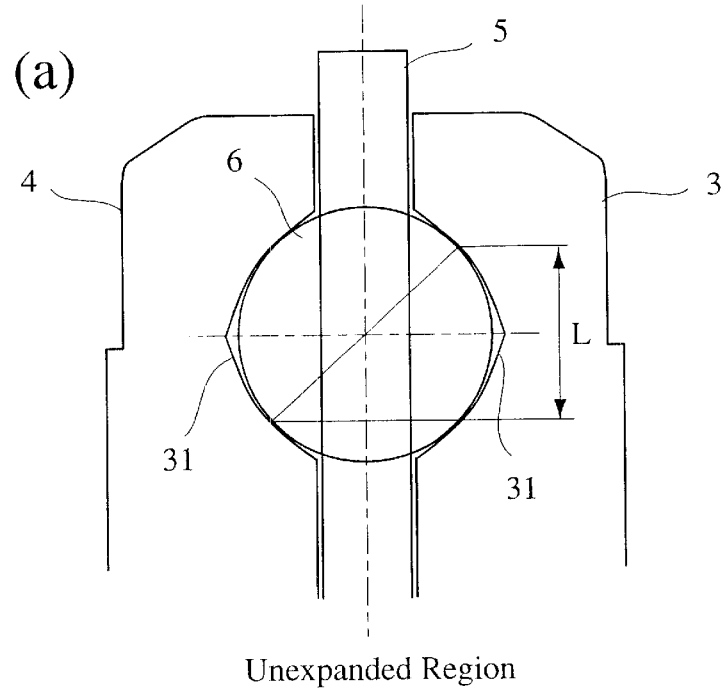
FIG. 14 shows the relation between the winding continuous groove of the disc plate and a ball received in a guide hole of the ball holder, (a) being in a non-widened region, and (b) a widened region.
Figure 14:
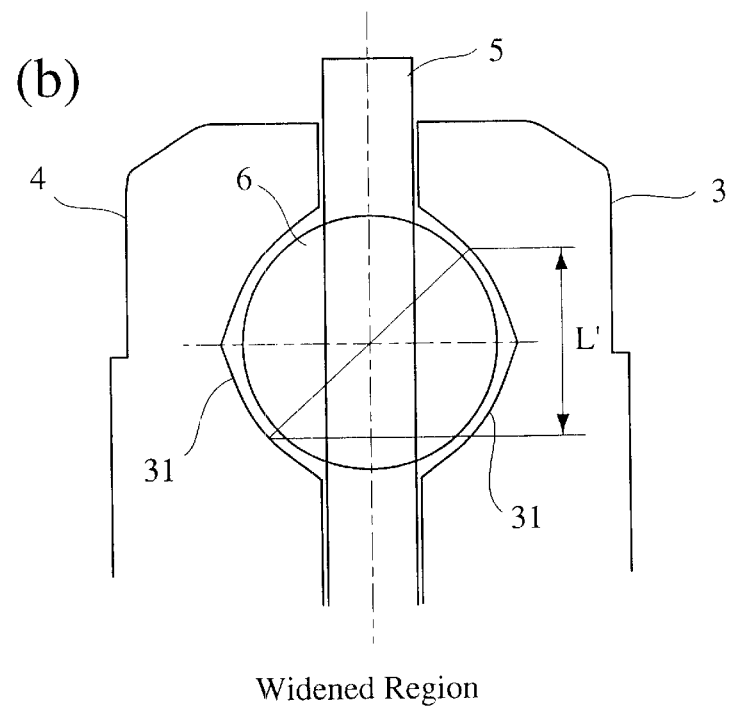

FIG. 14(a) shows the relation between the unexpanded regions of the winding continuous grooves 31, 41 of the disc plates 3, 4 and balls held in the guide holes 51 of the ball holder 5, and FIG. 14(b) shows the relation between the widened regions of the winding continuous groove 31, 31 and the balls. Because a distance (initial contact distance) L between contact surfaces of the winding continuous grooves 31, 41 is only slightly larger than the diameter of the ball 6 in the unexpanded region (a), not exceeding a range in which the ball 6 is movable in the guide holes 51, the torque of the ball holder 5 is effectively transmitted to the disc plates 3, 4. On the other hand, because a distance L' is extremely larger than the diameter of the ball 6 in the widened regions (b), exceeding a range in which the ball 6 is movable in the guide holes 51, the winding continuous grooves 31, 41 do not receive a reaction force from the ball 6.

Thus, in the winding continuous groove 31 having widened inflected regions (regions a, e, f, g and h), a contact stress between the ball 6 and the winding continuous groove 31 is zero or reduced in the inflected region. Therefore, the winding continuous groove 31 has improved durability and a stable differential-limiting torque. The degree of width increase of the inflected region of the winding continuous groove, which is expressed by a ratio of [increment of width]/[usual width of winding continuous groove 31], is preferably within a range of 0.1–1%. When the degree of width increase is less than 0.1%, sufficient effects of reducing the contact stress cannot be obtained. On the other hand, when it exceeds 1%, the ball impinges the inner wall of the winding continuous groove when it enters into or exits from the widened regions, rather decreasing the durability of the disc plates 3, 4. The preferred degree of width increase is 0.2–0.8%.

When the inflected region of the winding continuous groove 31 is deepened instead of being widened, there also arises a gap between a ball 6 and the winding continuous groove 31, resulting in the same effects of improving durability and stabilizing a differential torque as in the case of widening. The degree of depth increase of the inflected region of the winding continuous groove (increment of depth/usual depth of winding continuous groove 31) may be within a range of 0.1–1%, preferably 0.2–0.8%.

Figure 15:
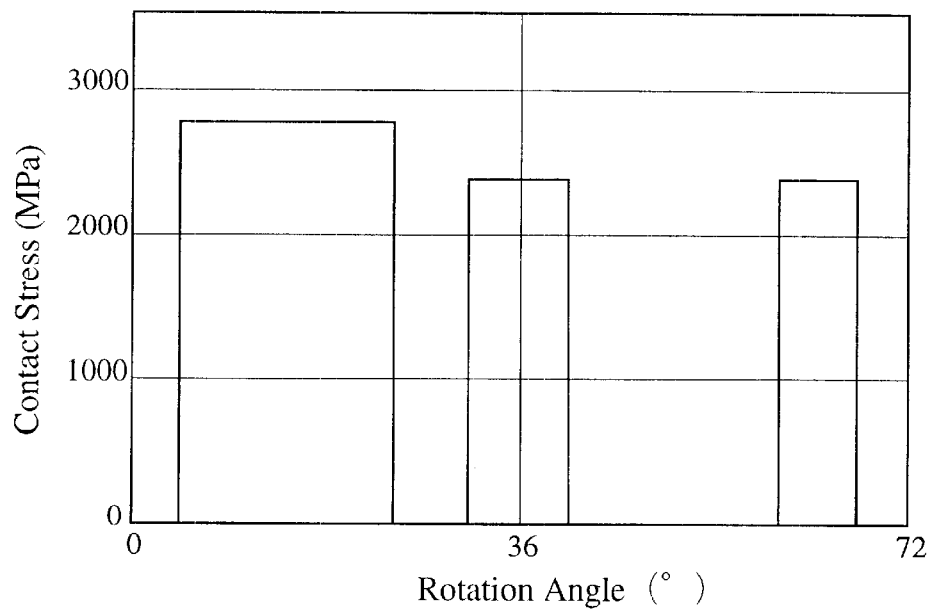
FIG. 15 is a graph showing the relation between the contact stress of a ball with the winding continuous groove of the disc plate and a rotation angle of the winding continuous groove.

FIG. 15 shows the calculation results of contact stress when the inflected region of the winding continuous groove is widened by 0.5%, to prevent a large contact stress from being generated even if the winding continuous grooves 31, 41 are elastically deformed by contact with balls 6. The formation of widened regions in the winding continuous groove 31 eliminates regions having particularly large contact stress, resulting in drastic increase in the durability of the winding continuous groove 31.

Figure 16:
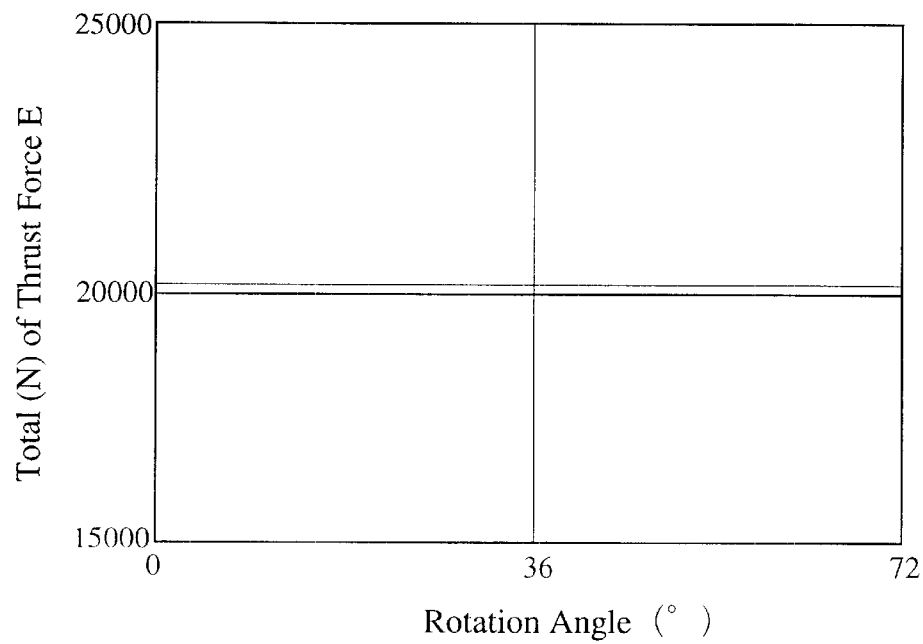
FIG. 16 is a graph showing the relation between a thrust force and the rotation angle of the winding continuous groove in which inflected regions are expanded.
Figure 28:
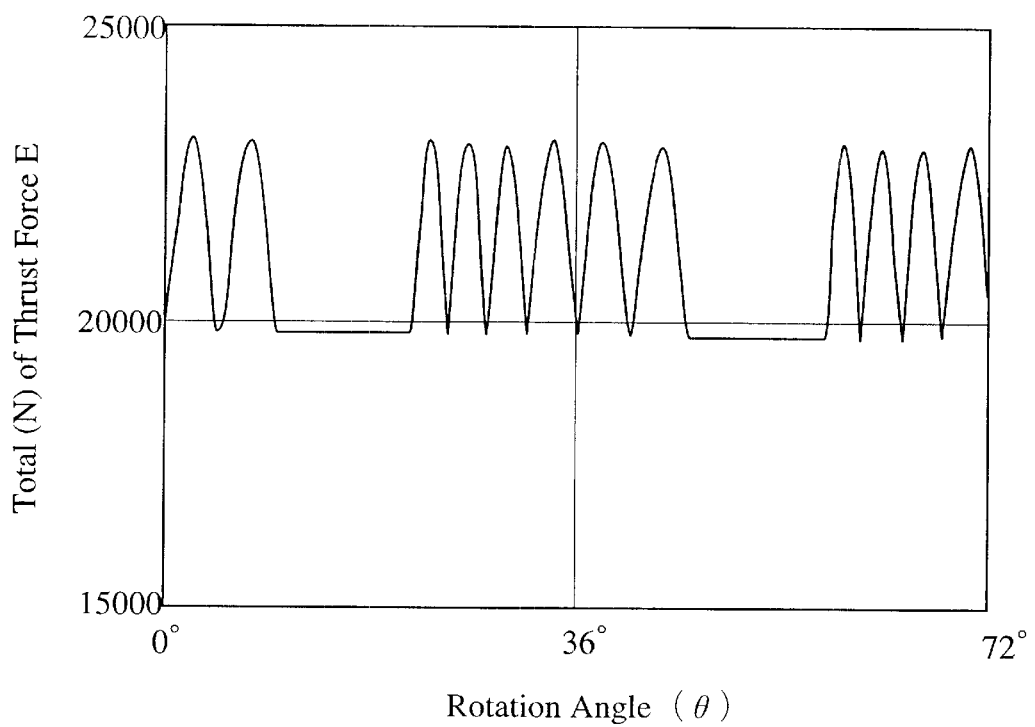
FIG. 28 is a graph showing the calculation results of the sum of all thrust forces generated by balls in the differential apparatus of Japanese Patent Laid-Open No. 8-170705.

FIG. 16 shows the calculation results of the sum of a thrust force E in a winding continuous groove having inflected regions widened by 0.5%, as shown in the case of FIG. 28. As is clear from FIG. 16, the formation of widened regions in the winding continuous groove 31 can provide a stable thrust force.

In FIG. 6, the widened regions of the winding continuous groove 31 are widened equally from the centerline 38 of the winding continuous groove 31 in a transverse direction. However, the degree of width increase from the centerline 38 needs not be equal on both sides, and widening may be performed only one side of the winding continuous groove 31. Particularly when only one side of the winding continuous groove 31 is widened with respect to the center line 38, the entire winding continuous groove 31 may be formed with the same width, followed by working of only widened regions by an end mill again, and thus resulting in economic advantages. Also, in the case of deepening, what is necessary is only to change the working depth by an end mill, making it possible to complete the finish-working of the entire winding continuous groove 31 only by one operation, resulting in economic advantages.

Figure 17:
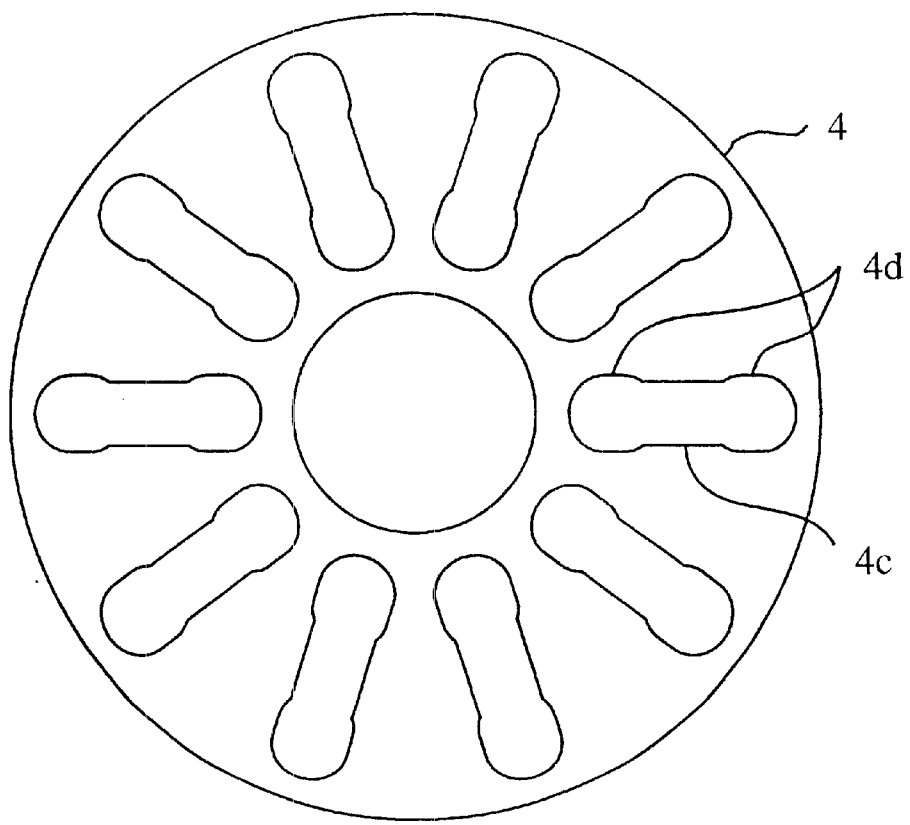
FIG. 17 is a front view showing a ball holder having guide holes each having a partially expanded portion.
Figure 18:
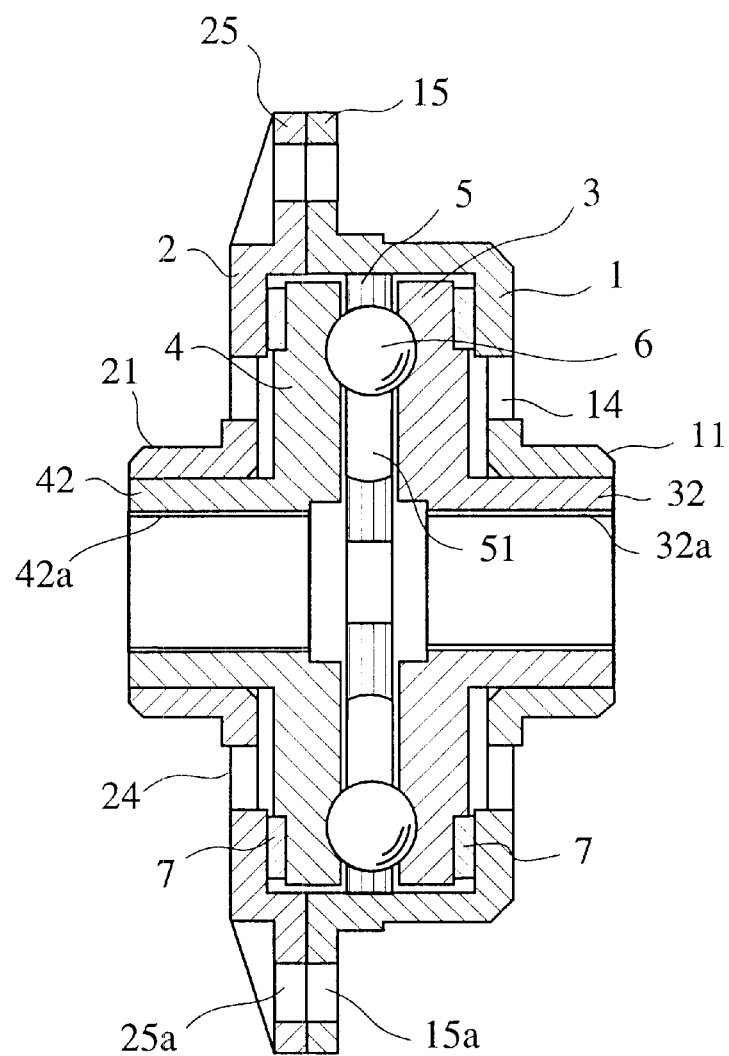
FIG. 18 is a vertical cross-sectional view showing the differential apparatus disclosed by Japanese Patent Laid-Open No. 8-170705.
Figure 19:
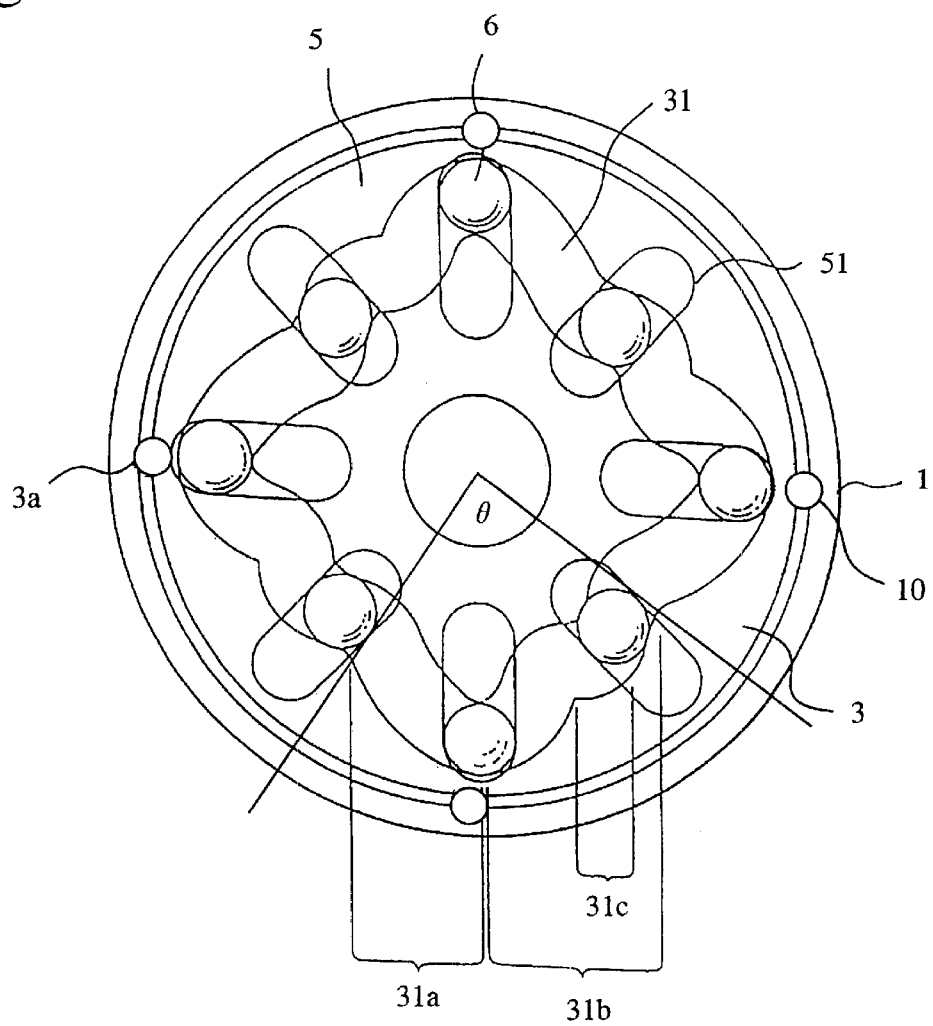
FIG. 19 is a front view showing an assembly of one disc plate, a ball holder and balls in the differential apparatus of FIG. 18.

Not being restricted to the winding continuous groove 31 of the disc plate 3, the guide holes 51 of the ball holder 5 may also be widened to improve its durability and stabilize a differential torque. In the embodiment shown in FIG. 17, widened portions 51a are provided on both ends of each guide hole 51. By combining this with the disc plate 3 having winding continuous groove 31 free from widened regions, there is a sufficient gap between a ball 6 and a guide hole 51 in regions including the regions a, e and h. In this case, because contact stress cannot be reduced in the regions f and g, these regions should be widened and/or deepened. Because there are no regions f and g in the winding continuous groove 31 of Japanese Patent Laid-Open No. 8-170705 (FIG. 4), the entire winding continuous groove 31 may be constant in width and/or depth. In such a case, it is particularly economical to provide widened portions 51a to the elongated guide holes 51 of the ball holder 5.

(B) Plastic Working and Chamfering

Figure 29:
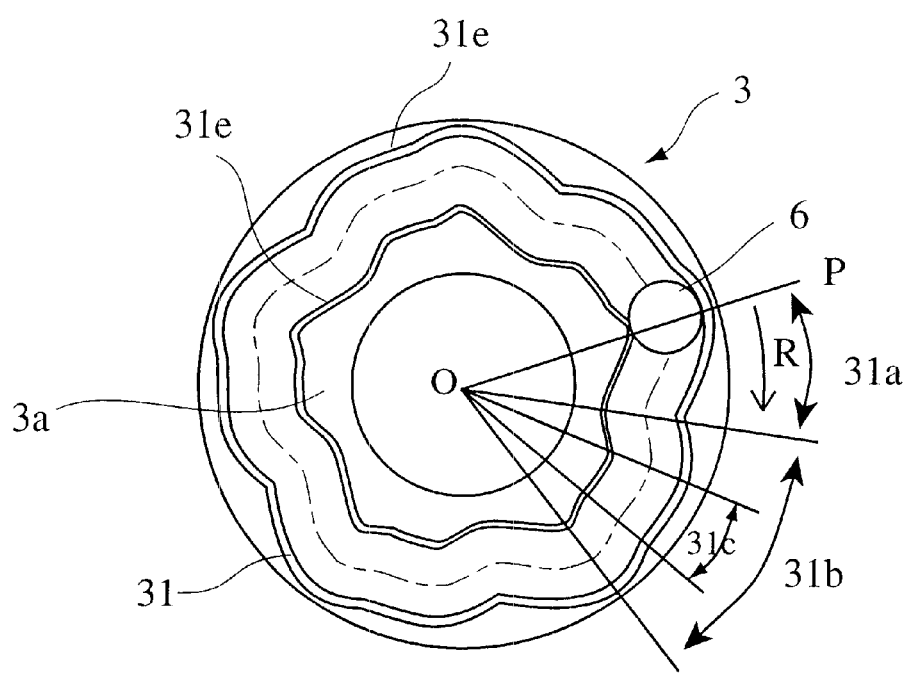
FIG. 29 is a front view showing a disc plate having a winding continuous groove with chamfered edges.

In the preferred embodiment of the present invention, the winding continuous grooves formed on the opposing surfaces of the disc plates 3, 4 have plastically worked surface with chamfered edges portions. FIG. 29 illustrates the opposing surface of the disc plate 3 formed with the winding continuous groove 31. The chamfered portion 31e serves to reduce wear by contact with balls 6 and prevent cracking due to the concentration of stress, thereby improving the durability of the disc plate 3 and stabilizing torque transmission.

Figure 30:
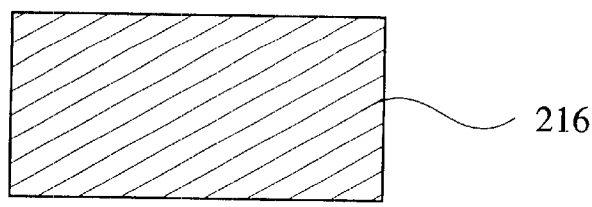
FIG. 30 is a cross-sectional view showing the steps of forming a disc plate by forging.
Figure 30:
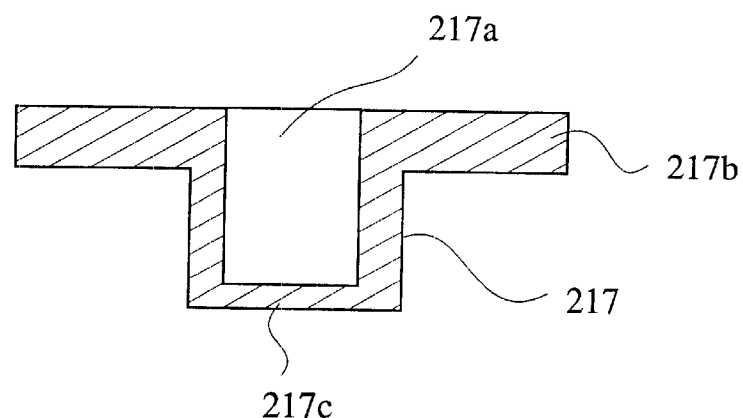
Figure 30:
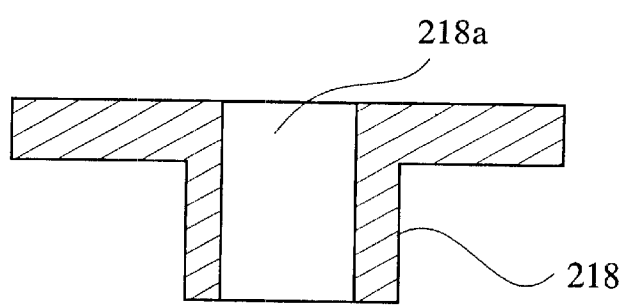
Figure 30:
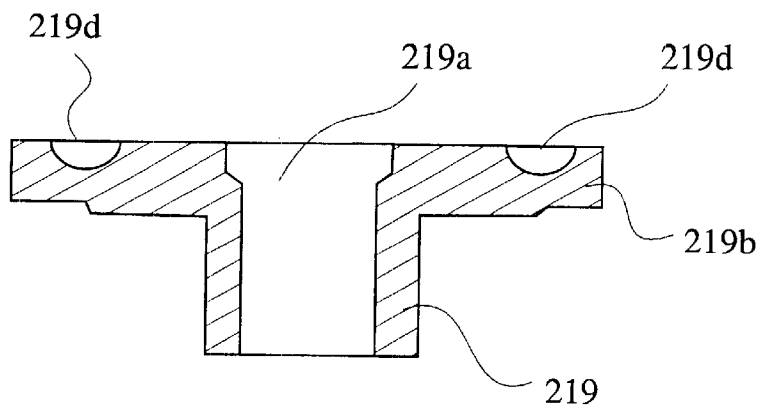
Figure 31:
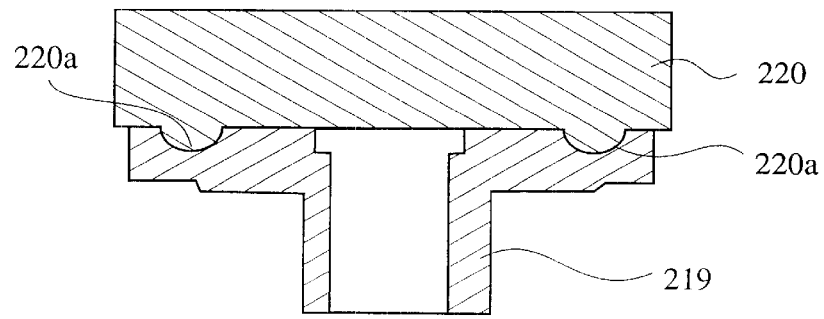
FIG. 31 is a cross-sectional view showing the relation between a disc plate-forming article and a forging die in a third hot forging.

FIG. 30 shows the shape of the disc plates in each forging step, (a) being a starting steel material, (b) being an intermediate member 217 formed with an aperture 217a and a flange 217b by hot forging, (c) being a state in which a bottom surface of the aperture 217a is cut, and (d) being the disc plates formed with a winding continuous groove 219b and an aperture 219a by hot forging. Also, FIG. 31 shows the relation between the disc plate-forming article 219 and a forging die 220 in the third hot forging step.

(1) Forging

A steel material 216 having a shape shown in FIG. 30(a) and made of, for instance, chromium-molybdenum steel such as SCM420, SCM435, etc. is continuously heated at about 100–1200° C. The steel material 216 is subjected to compression and extrusion by the first hot forging to provide a primary intermediate member 217 having an aperture 217a and a flange 217b as shown in FIG. 30(b). The primary intermediate member 217 is subjected to the second hot forging, and cut in a bottom surface 217c of the aperture 217a as shown in FIG. 30(c) to provide a second intermediate member 218 having a through-hole 218a. Further, the second intermediate member 218 is subjected to the third hot forging to provide a disc plate precursor 219 having a winding continuous groove 219d as shown in FIG. 30(d). Incidentally, the hot-forged, winding continuous groove 219d is slightly smaller than the finished size. To form the winding continuous groove 219d in the second intermediate member 218 by the third hot forging, a forging die 220 having a ridge 220a corresponding to the winding continuous groove 219d as shown in FIG. 31 is used.

Though the plastic working by the hot forging method has been explained above, it should be noted that semi-hot forging, warm forging and cold forging can also be used instead of hot forging.

(2) Heat Treatment

To remove a residual stress due to hot forging from the disc plate precursor 219 and to make the internal structure thereof finer, it is preferably subjected to a heat treatment comprising keeping at about 925° C. for about 25 minutes, air-cooling, heating at about 180° C. for about 4 hours and then water-cooling.

(3) Bonderizing Treatment

To prevent galling, etc. in the subsequent plastic working step, the disc plate precursor 219 is preferably subjected to a bonderizing treatment, which forms a zinc phosphate layer (lubricating layer) on the disc plate precursor 219.

(4) Plastic Working

Figure 32:
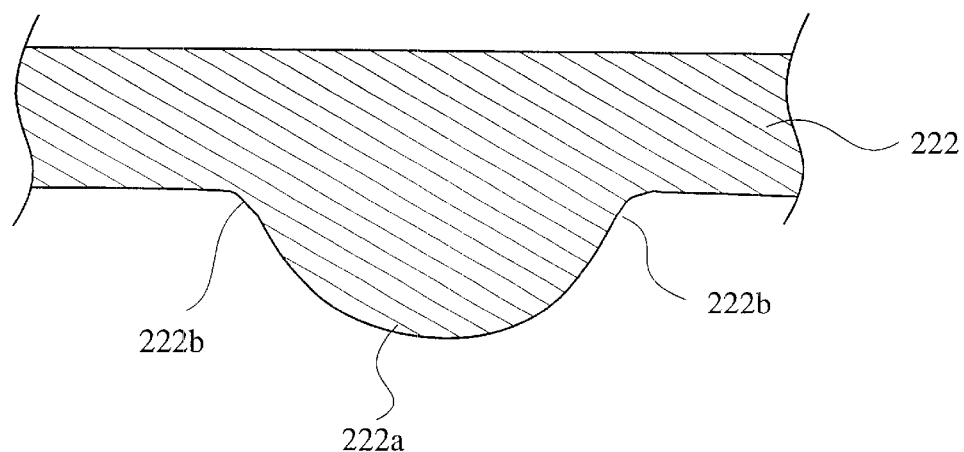
FIG. 32 is a cross-sectional view showing the important part of a finish-forging die used in the cold forging of a disc plate.
Figure 33:
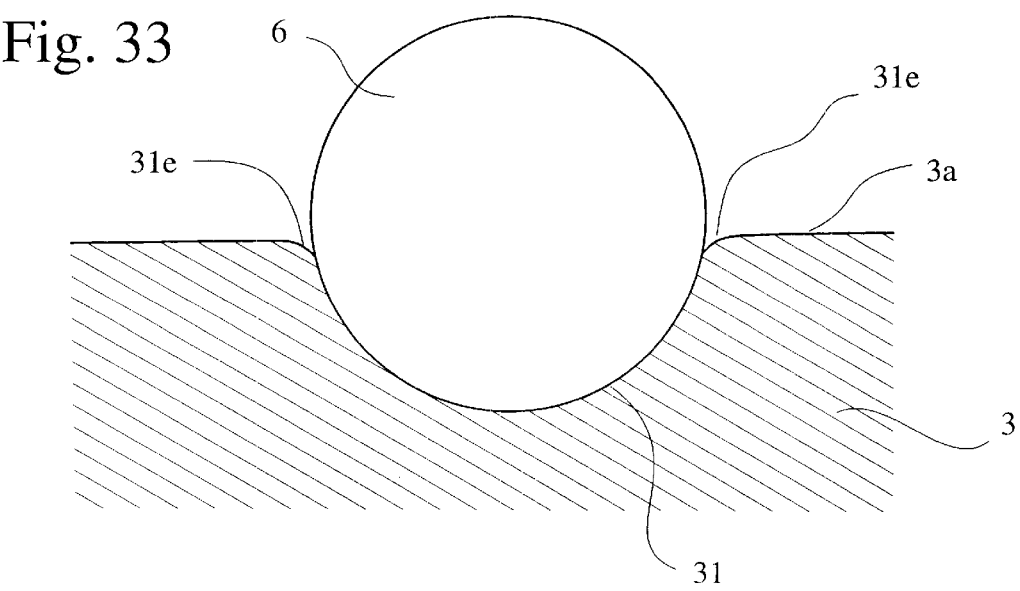
FIG. 33 is a cross-sectional view showing the important part of chamfered portions formed on edges of the winding continuous groove of the disc plate by a finish-forging die.

FIG. 32 is a cross-sectional view showing an important portion of a finish-forging die 222 for plastic working of a disc plate by cold forging, and FIG. 33 is a cross-sectional view showing an important portion of a disc plate formed with chamfered portions 31e on edges of a winding continuous groove 31 by the finish-forging die 222.

The finish-forging die 222 has a ridge 222a having an arcuate cross section for entering into the entire length of the winding continuous groove 219d to plastically work the winding continuous groove 219d of the disc plate precursor 219. The ridge 222a has a small curved (arcuate) portion 222b in its root portion. When cold forging is carried out by using this curved portion 222b as shown in FIG. 33, the winding continuous groove 31 is plastically worked, resulting in the formation of chamfered portions 31e in its edges.

It is preferable to provide both edges of the winding continuous groove 31 with chamfered portions 31e, and their width is preferably about 0.2–3 mm in a case where the ball 6 has a diameter of 16 mm. When the width of the chamfered portions 31e is less than 0.2 mm, sufficient effects of preventing cracking and pitting cannot be obtained. On the other hand, when it exceeds 3 mm, the chamfered portions are too large, causing the ball to largely deviate from a center of the winding continuous groove 31, resulting in larger load per unit area of the winding continuous groove.

The chamfered portions 31e can be formed linearly, though there arises a small angular portion in edges, which may give small, linear scratch to a ball 6 slightly deviating from the winding continuous groove 31. Thus, the chamfered portions 31e are preferably arcuate. Though cold forging has been explained as plastic working, it should be note that warm forging, rolling-forming, cold pressing, etc. may also be used instead of the cold forging.

(5) Carburizing Treatment

With respect to the disc plates 3, 4 plastically worked by cold forging, the opposing surfaces 3a, 4b having the winding continuous grooves 31, 41 of the disc plates 3, 4 are subjected to a carburizing treatment. The carburizing treatment serves to form a hard layer on the opposing surfaces of the disc plates 3, 4, thereby improving the wear resistance of the disc plates 3, 4. Because the winding continuous groove is constituted by plastically worked surface and the chamfered portions 31e are curved, wear due to contact with the balls 6 is small and cracking and pitting can be prevented in the edges of the carburized disc plates 3,4, thereby improving durability and stabilizing torque transmission, though the carbon content becomes higher in the edges than other portions of the disc plates 3, 4 by the carburizing treatment.

According to the method of this embodiment, the winding continuous groove can be formed simultaneously by forging and plastic working, enabling the disc plates to be produced at a low cost.

Figure 34:
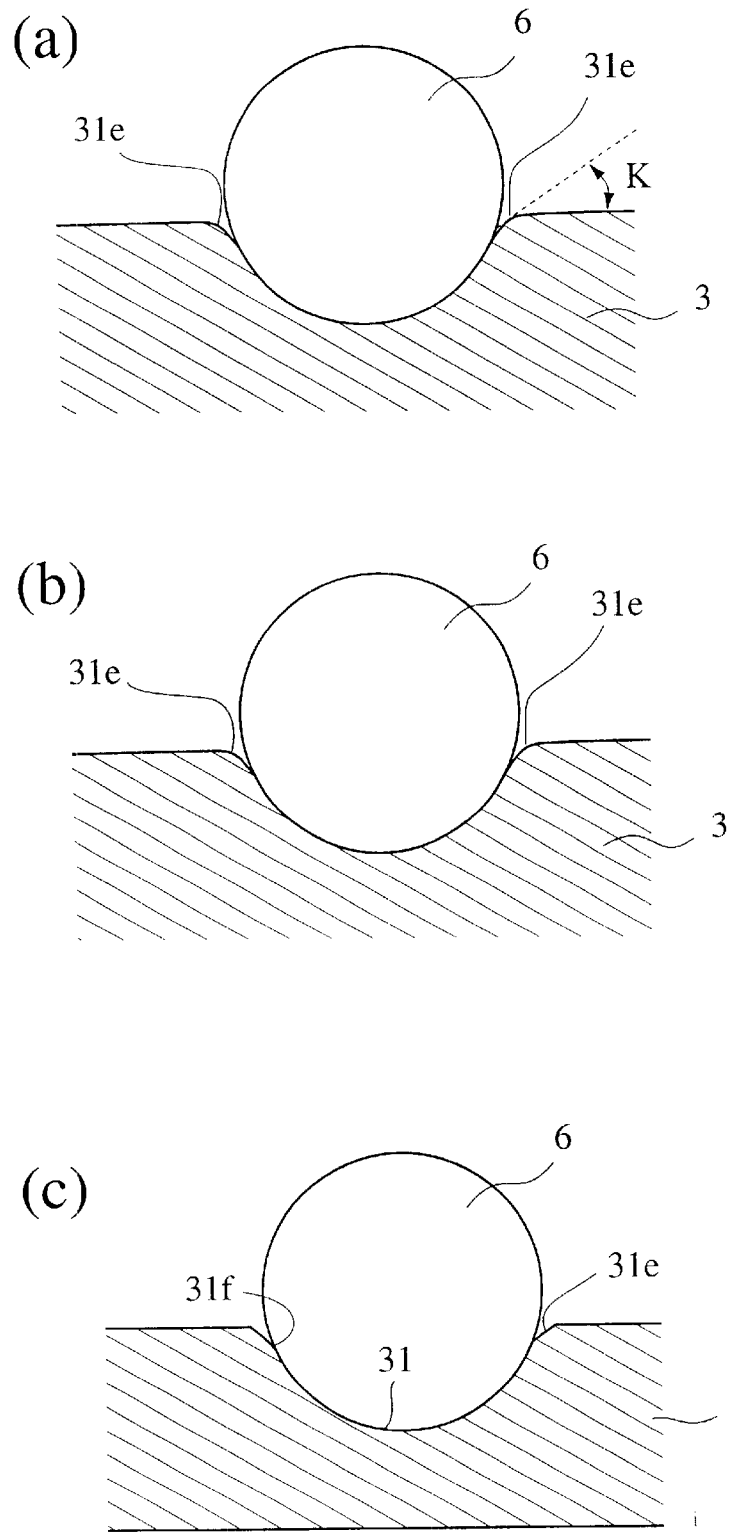
FIG. 34 is a cross-sectional view showing various chamfered portions formed on the winding continuous groove, (a) showing a linear chamfered portion, (b) showing an arcuate chamfered portion, and (c) showing a linear chamfered portion having an arcuate portion in inner edges.
Figure 35:
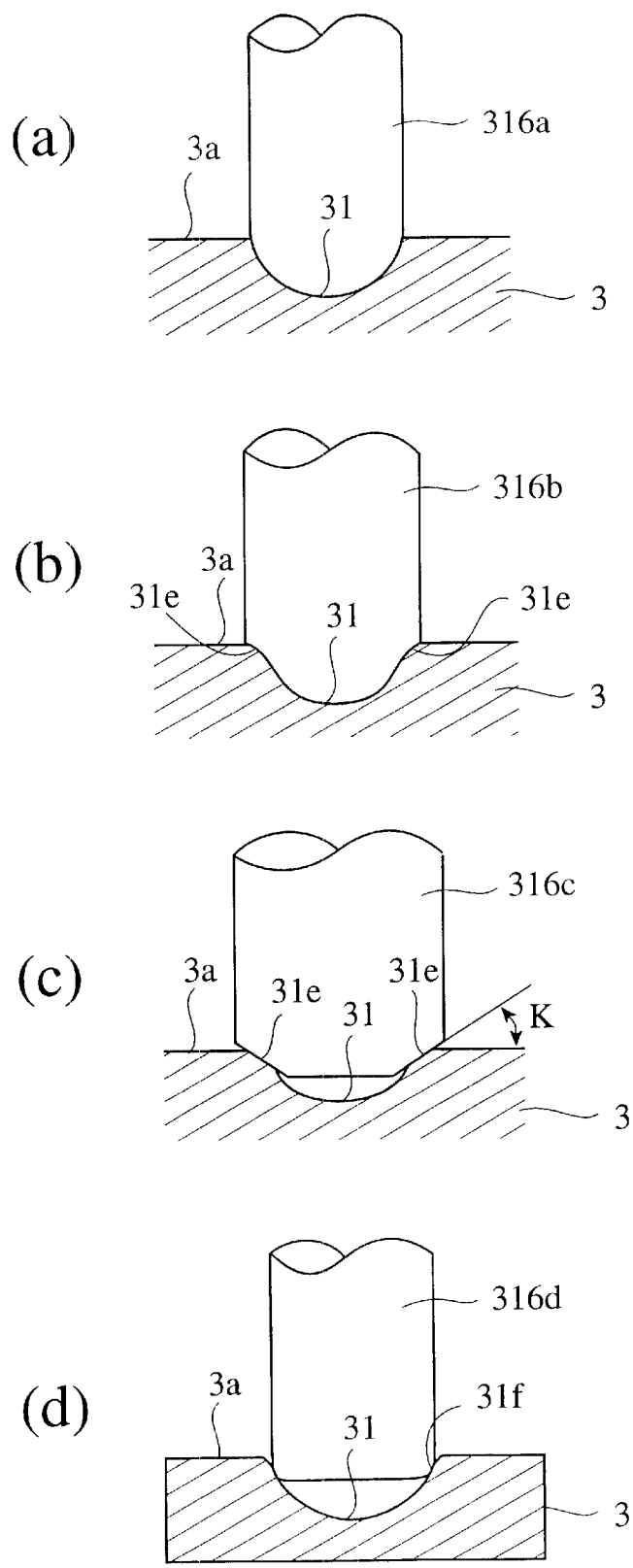
FIG. 35 is a cross-sectional view showing various methods for forming a winding continuous groove by a ball end mill, (a) showing the formation of a winding continuous groove by a ball end mill, (b) showing the formation of a chamfered portion having an arcuate portion by a forging die, (c) showing the formation of a chamfered portion by an end mill having a linear, slanted side surface in a tip end portion, and (d) showing the formation of a chamfered portion by an end mill having an arcuate or rounded side surface in a tip end portion.

FIGS. 34 and 35 show other examples of chamfering the edges of the winding continuous groove.

(i) Formation of Linear Chamfered Portions by End Mill

FIG. 34(a) shows the cross section of a linear chamfered portion 31e formed in the winding continuous groove 31 of the disc plate 3, and FIGS. 35(a) and (c) show the chamfering step by a ball end mill 316a. As shown in FIG. 35(a), the opposing surface of the disc plate 3 is first formed with a winding continuous groove 31 by a ball end mill 316a. Next, both edges of the winding continuous groove 31 are formed with chamfered portions 31e by an end mill 316c having an inclined side surface with a linear tip portion shown in FIG. 35(c). The angle K of the chamfered portions 31e to the opposing surfaces 3a is preferably about 30–70°. At an angle of less than 30°, sufficient effects of preventing cracking and pitting cannot be obtained. Also, when the angle K exceeds 70°, chamfering effects decrease.

(ii) Formation of Curved Chamfered Portions by End Mill

FIG. 34(b) shows a curved chamfered portion 31e in a winding continuous groove 31 of the disc plate 3. Also, FIG. 34(c) shows a flat chamfered portion 31e in the winding continuous groove 31. The flat chamfered portion 31e has a curved inner end portion 31f. The chamfered portion shown in FIG. 34(c) can be formed by an end mill 316d having an arcuate or rounded side surface in a tip end portion.

(C) Small Groove

Figure 36:
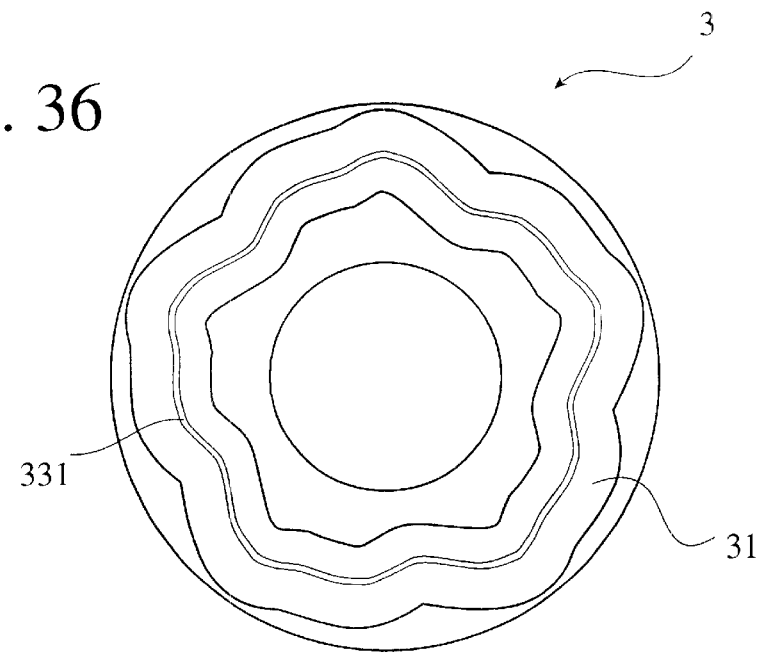
FIG. 36 is a front view showing a pair of disc plates each having a small groove.
Figure 37:
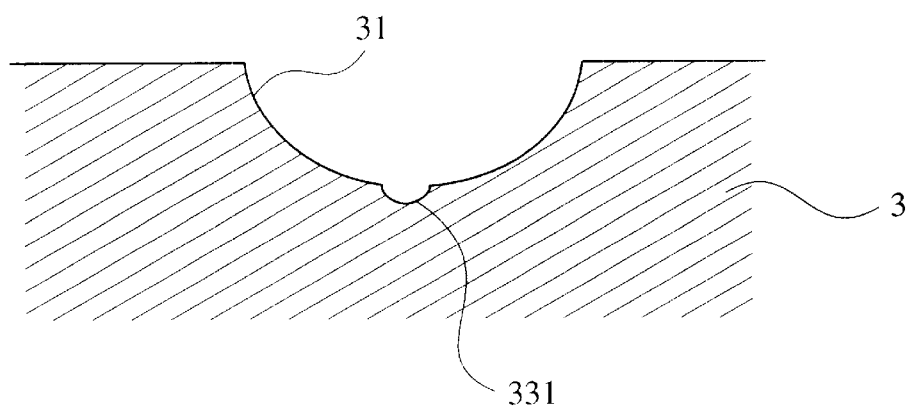
FIG. 37 is a partial, enlarged cross-sectional view showing the details of a winding continuous groove of the disc plate in FIG. 36.

In the preferred embodiment of the present invention, each disc plate has a small groove at a bottom of the winding continuous groove. FIGS. 36 and 37 show the disc plate 3 having a small groove 331. A ratio of the width of the small groove 331 to the diameter of the ball 6 is preferably 0.1–0.5. For instance, in the case of a ball having a diameter of 14 mm, the small groove 331 is preferably 0.14–0.7 mm.

With the small groove 331 formed on the bottom of the winding continuous groove 31, the cutting speed of a ball end mill at a tip end thereof does not become zero in the rough- or finish-working with the ball end mill. Thus, change in a cutting resistance is small, making it possible to be closer to the ideal locus of a winding continuous groove. As a result, differential limitation effects can be obtained for a long period of time by contact of the winding continuous groove 31 with balls 6. The small groove 331 functions as a reservoir of a cutting oil or water, thereby lubricating and cooling the tip end of the ball end mill, contributing to improvement of surface precision of the worked winding continuous groove. Further, the small groove 331 functions as a path for a lubricating oil, thereby improving the durability of the differential apparatus.

The small groove can be formed on the bottom of the winding continuous groove of the disc plate by the following methods:

(1) Formation of Small Groove by End Mill

Figure 38:
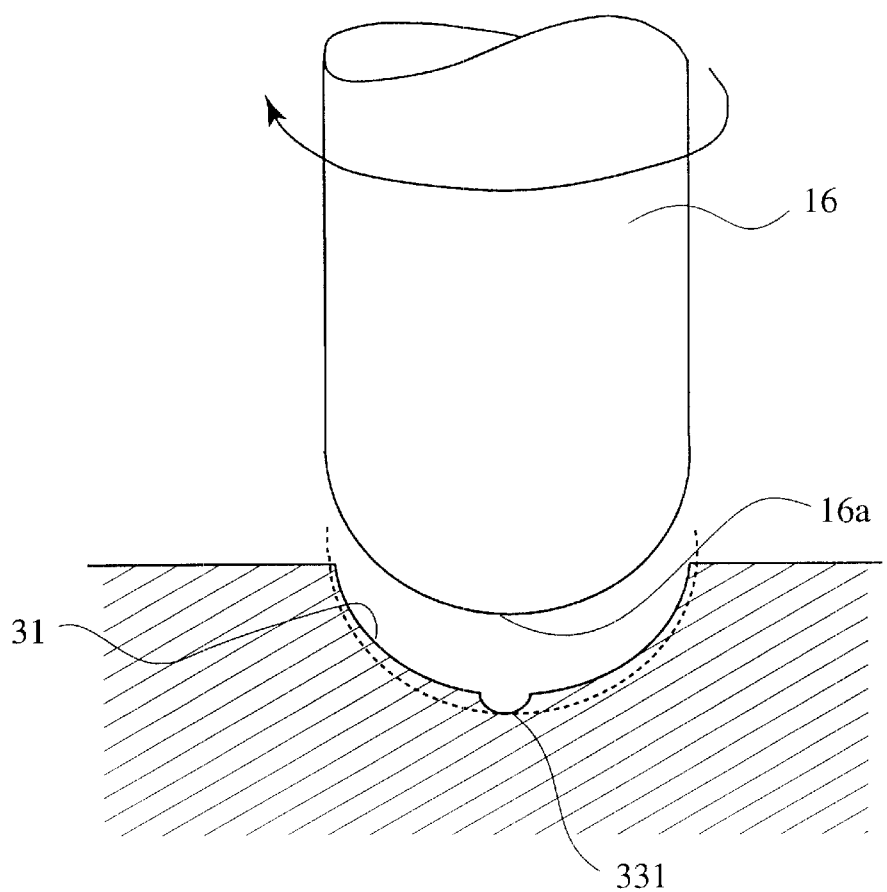
FIG. 38 is a cross-sectional view showing the rough working of a winding continuous groove having a small groove by a ball end mill.
Figure 39:
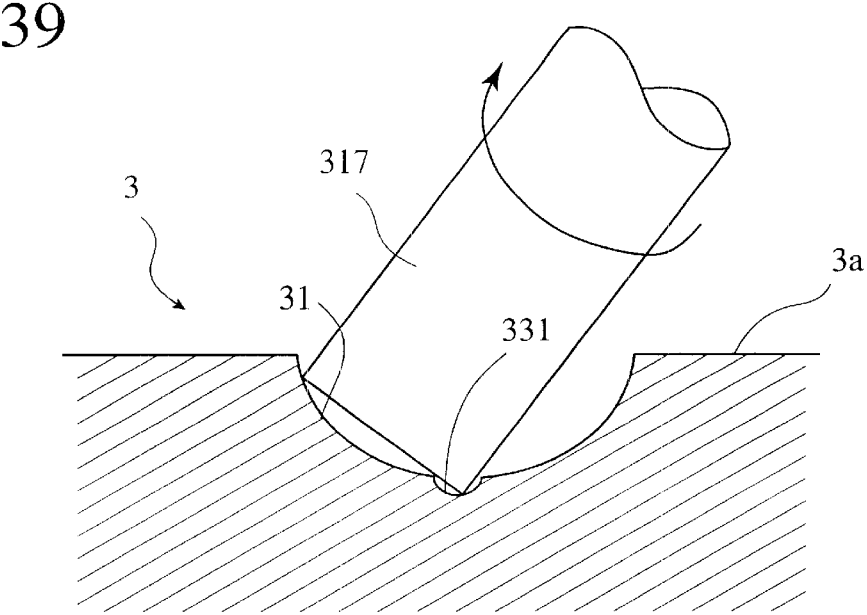
FIG. 39 is a cross-sectional view showing the formation of a small groove by an end mill before finish-working of a winding continuous groove.

FIG. 38 shows the rough working of a winding continuous groove 31 by a ball end mill 16, and FIG. 39 shows the formation of a small groove 331 by an end mill 317 before finish-working the winding continuous groove 31. As shown in FIG. 39, the end mill 317 for cutting a small groove is rotated at a constant cutting depth with inclination relative to the opposing surface 3a of the disc plate 3, and moved along the locus of the winding continuous groove 31 to form a small groove 331.

(2) Formation of Small Groove by Forging

Figure 40:
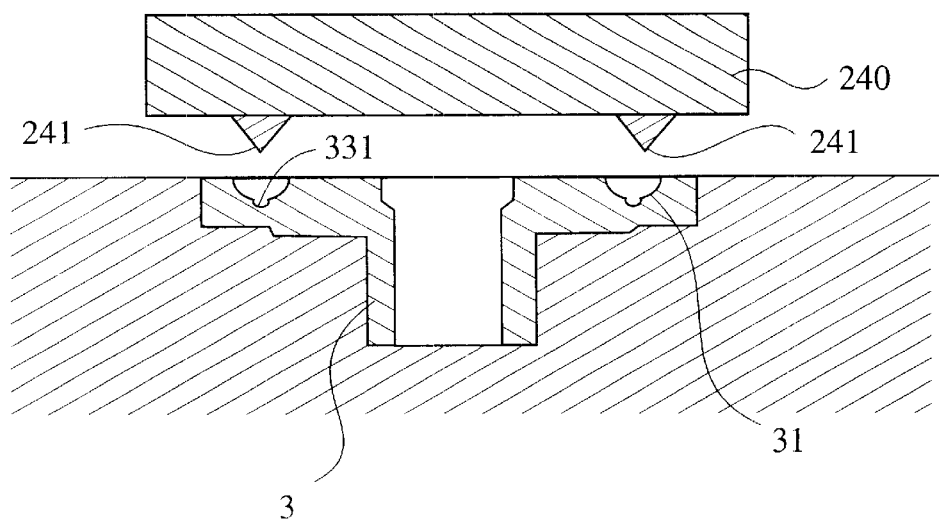
FIG. 40 is a cross-sectional view showing the formation a small groove in a winding continuous groove by forging.

FIG. 40 shows the formation of a small groove by forging. 240 indicates a cold-forging die having a small groove-forming projection 241. The small groove 331 may be formed by forging at the same time as the formation of the winding continuous groove 31. Alternatively, the small groove 331 may be formed by forging after rough working of the winding continuous groove 31 by a ball end mill.

Figure 41:
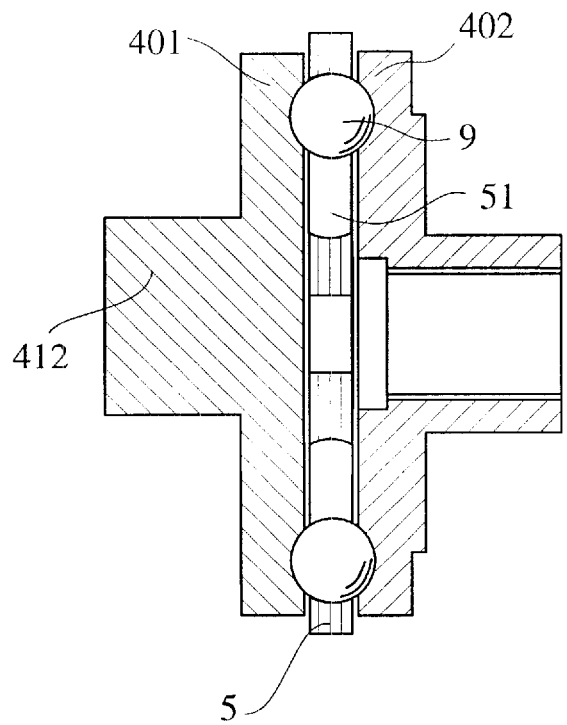
FIG. 41 is a cross-sectional view showing an apparatus for rolling-forming a winding continuous groove in a disc plate.

[3] Rolling-forming (A) Rolling-forming of Disc Plate (1) Rolling-forming Apparatus As shown in FIG. 41, the apparatus for rolling-forming a disc plate comprises a disc plate die 401, a disc plate precursor 402, a ball holder 5, rolling-forming balls 9 held in guide holes 51 of the ball holder, a means (not shown) for fixing the disc plate die 401, a means (not shown) for rotatably supporting the disc plate precursor 402, and a means (not shown) for rotating the ball holder 5. The grooved surface of the disc plate die 401 is provided with a winding continuous groove 411 for determining the movement of balls as shown in FIG. 3(a). The grooved surface of the disc plate precursor 402 is provided with a winding continuous groove 421 formed in advance with a rolling-forming margin left.

With the opposing surfaces of the disc plate die 401 and the disc plate precursor 402 facing each other, the ball holder 5 holding the rolling-forming balls 9 in guide holes 51 on one end side are concentrically sandwiched by both discs 401, 402, such that the rolling-forming balls 9 are held by the winding continuous grooves 411, 421 of the disc plates. The rolling-forming balls 9 are forced to move along the winding continuous grooves 411, 421 by the rotation of the ball holder 5. As a result, a concavely curved surface is rolling-formed on the inner wall of the winding continuous groove 421 of the disc plate precursor 402.

(a) Disc Plate Die

The disc plate die 401 is provided with a winding continuous groove 411 on a grooved surface and projections 412 for fixing a rolling-forming apparatus on the other end. The disc plate die 401 guides the rolling-forming balls 9 to form a precise, winding continuous groove 421 on the disc plate precursor 402. Therefore, the winding continuous groove 411 is substantially the same as the winding continuous groove 31 shown in FIG. 3(a), the concavely curved surface of the winding continuous groove 31 having substantially the same radius as that of the rolling-forming balls 9. Materials for the disc plate die 401, which may be chosen properly, should have hardness equal to or higher than that of the rolling-forming balls 9.

(b) Disc Plate Precursor

Figure 42:
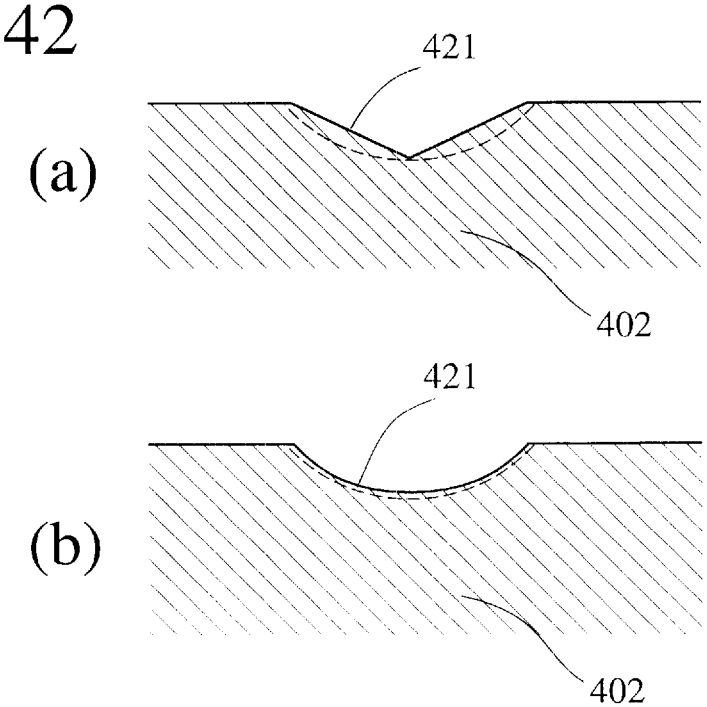
FIG. 42 is a transverse cross-sectional view showing a winding continuous groove formed in a disc plate precursor by a primary working, (a) showing a V-shaped cross section, and (b) showing a U-shaped cross section.

The disc plate precursor 402 is a half-finished disc plates having a winding continuous groove with a rolling-forming margin left on a grooved surface. As shown in FIG. 42, the primarily worked winding continuous groove 421 may have a V-shaped cross section (FIG. 42(a)) or a U-shaped cross section (FIG. 42(b)), and the U-shaped cross section is more preferable from the viewpoint of ease to work. The cross section size of the winding continuous groove 421 is smaller than the finally necessary size (shown by the dotted line in FIG. 42) by a rolling-forming margin, which is preferably 0.02–2 mm. When the rolling-forming margin is less than 0.02 mm, it is difficult to uniformly rolling-form the winding continuous groove 421. On the other hand, when the rolling-forming margin exceeds 2 mm, there is too much resistance at the time of rolling-forming, failing to form a precise groove surface. The more preferred rolling-forming margin is 0.03–0.2 mm.

Figure 43:
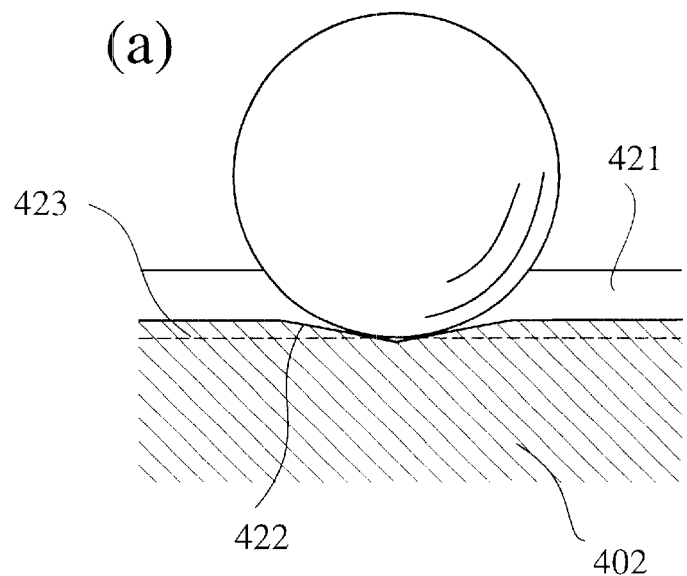
FIG. 43 is a cross-sectional view showing the development in a groove direction of a winding continuous groove formed in a disc plate precursor by a primary working, (a) showing a V-shaped cross section, and (b) showing a U-shaped cross section.
Figure 43:
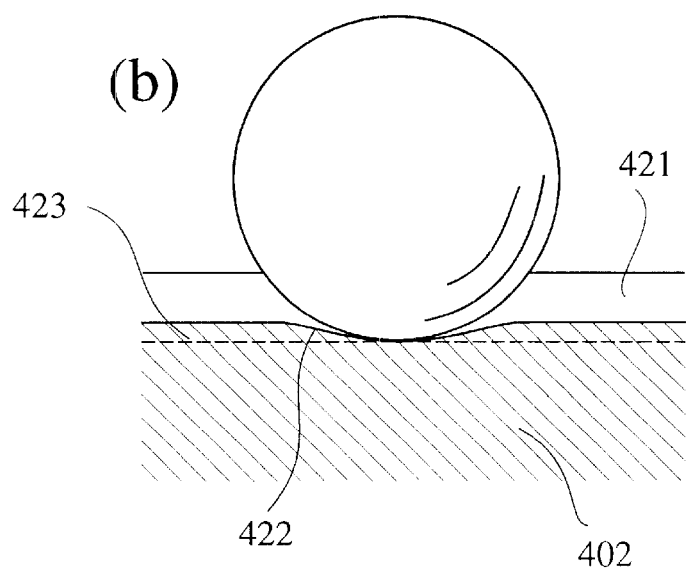

FIG. 43 is a cross-sectional view taken along the progress direction of the winding continuous groove 421. The winding continuous groove 421 is provided with at least one recess 422 for holding rolling-forming balls 9 at a desired depth (shown by the dotted line 423) at the start of rolling-forming. The number of the recesses 422 is equal to or more than that of the rolling-forming balls 9. The recess 422 is not restricted to a particular shape, and may be V-shaped (FIG. 3(a)) or U-shaped (FIG. 3(b)) as long as it can hold a rolling-forming ball 9 at a desired depth (shown by the dotted line 423).

(c) Rolling-forming Balls

The rolling-forming ball 9 has a radius equal to or slightly larger than that of a ball 6 used in the actual differential apparatus. The preferred radius of the rolling-forming ball 9 is R to R+1.0 mm, particularly R to R+0.2 mm, wherein R is a radius of the ball 6. Though the number of rolling-forming balls 9 used in one rolling-forming operation may be one, it is preferable to use a plurality of rolling-forming balls 9 to keep balance.

To rolling-form a winding continuous groove 421 in an arcuate cross section on the disc plate precursor 402, the rolling-forming balls 9 are preferably made of harder materials than those of the disc plate precursor 402. Such materials include bearing steel, heat-resistant steel, high-speed steel, cemented carbide, ceramics, etc.

(d) Ball Holder

The ball holder 5 is provided with a large number of guide holes 51 each having such a width as to receive a rolling-forming ball 9 and being so elongated as to permit a rolling-forming ball 9 to radially move back and forth. The radial length of the guide hole 51 determining a reciprocal range of the rolling-forming ball 9 is equal to or more than the difference between the radially outermost position (farthest position from the center) and the radially innermost position (closest position to the center) of each winding continuous groove 411, 421. The ball holder 5 may have the same shape as that of the actual differential apparatus shown in FIG. 3(*a*), though the guide holes 51 should have substantially the same size as that of the rolling-forming balls 9.

Though the present invention has been explained by the embodiments, it is not restricted thereto, and various modifications can be made. For instance, the ball holder 5 need not have the same number of guide holes 51 as that of the guide holes in the ball holder of the differential apparatus, as long as the number of guide holes 51 is equal to or more than that of the rolling-forming balls 9 used simultaneously.

(2) Rolling-forming Method

As shown in FIG. 41, the ball holder 5 having guide holes 51 in which rolling-forming balls 9 are held is concentrically sandwiched by a disc plate die 401 and a disc plate precursor 402 in such a manner that their grooved surfaces are facing each other. The winding continuous grooves 411, 421 of the disc plates 401, 402 hold rolling-forming balls 9 so that the ball holder 5 is keyed by the rolling-forming balls 9.

Next, an assembly of the disc plate die 401, the ball holder 5 and the disc plate precursor 402 is inserted into a metal case (not shown), and the disc plate die 401 and the disc plate precursor 402 are fixed so that their distance does not change, with the disc plate precursor 402 and the ball holder 5 rotatably held.

Figure 44:
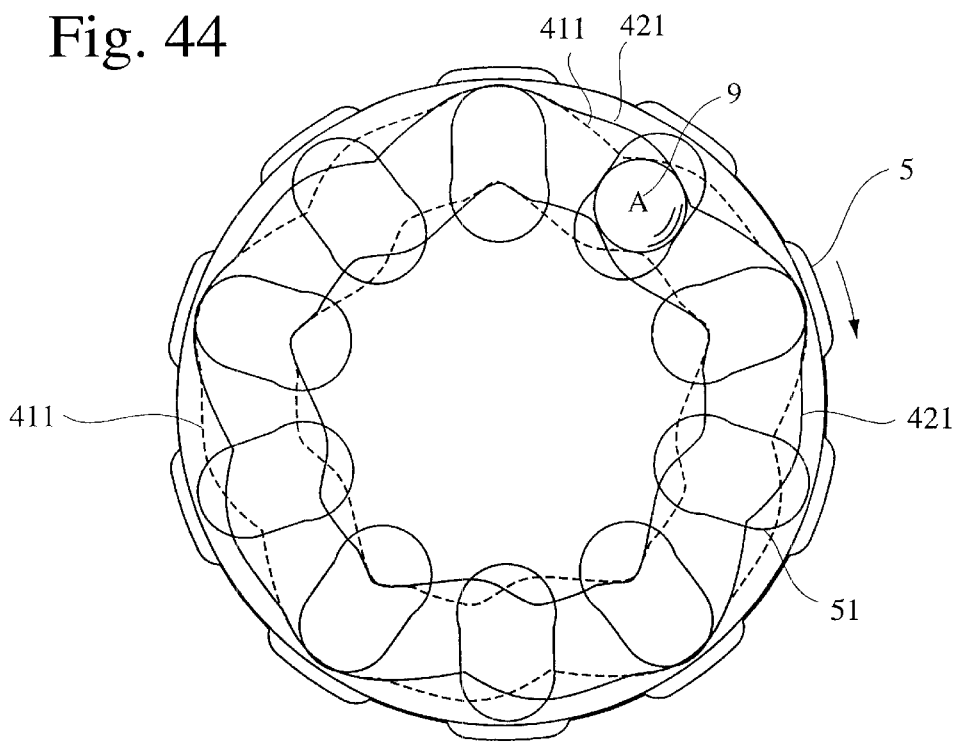
FIG. 44 is a front view showing an assembly of a disc plate die, a ball holder and a disc plate precursor.
Figure 45:
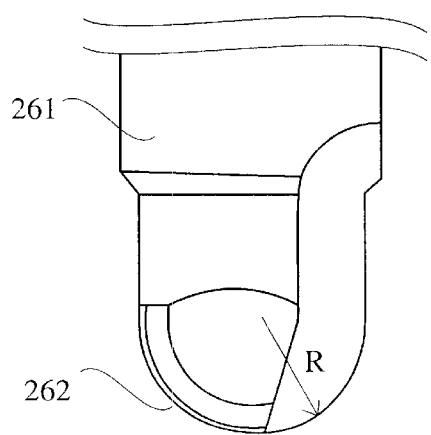
FIG. 45 is a partial, cross-sectional view showing a special end mill for working a winding continuous groove in a disc plate.

While keeping the disc plate die 401 stationary, the ball holder 5 is rotated. As is clear from a pair of winding continuous grooves 411, 421 shown in FIG. 44, when the ball holder 5 rotates clockwise, the rolling-forming ball 9 also moves clockwise. However, because the rolling-forming ball 9 moves along the point A of the winding continuous groove 411 of the stationary disc plate die 401, the rolling-forming ball 9 tends to move circumferentially due to the shape of the winding continuous groove 411 at the point A. On the other hand, when it moves from the point A circumferentially in the winding continuous groove 421 of the disc plate precursor 402, the disc plate precursor 402 rotates clockwise. Because the disc plate die 401 is kept stationary, the rotation angle of the disc plate precursor 402 is double that of the ball holder 5.

In the case of using one rolling-forming ball 9, at least one turn of the ball holder 5 causes the winding continuous groove 421 of the disc plate precursor 402 to entirely pass over the rolling ball 9, thereby carrying out the rolling-forming. Thus, the rotation of the ball holder 6 forces the rolling-forming ball 9 to move along the winding continuous groove 421, thereby rolling-forming a concavely curved surface on the winding continuous groove 421.

The concavely curved surface of the winding continuous groove 421 rolling-formed by the above method has a shape error of 100 μm or less, preferably 80 μm or less, and a surface roughness Rz of 30 μm or less, preferably 10 μm or less. Such a curved surface of the winding continuous groove of the disc plate having good shape error and surface roughness can be formed in a few minutes by utilizing the rolling-forming method of the present invention.

(B) Rolling-forming of Ball Holder (1) Rolling-forming Apparatus

Figure 46:
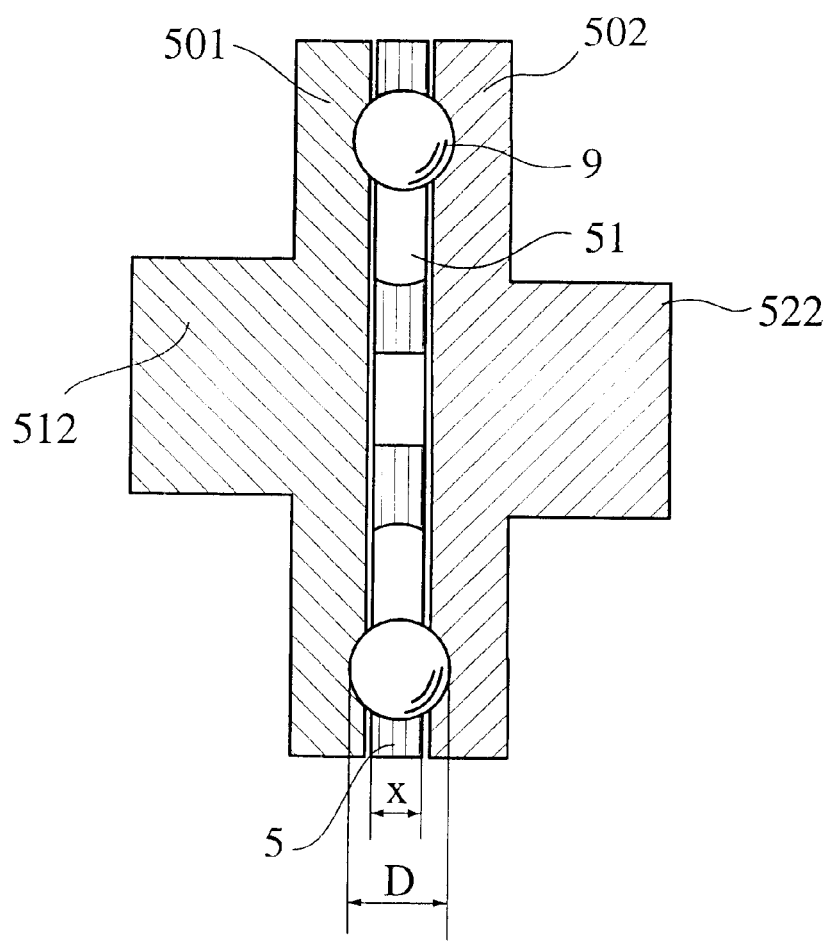
FIG. 46 is a schematic, cross-sectional view showing an apparatus for rolling-forming the inner walls of guide holes in a ball holder for the differential apparatus.

As shown in FIG. 46, the apparatus for rolling-forming a ball holder comprises rolling-forming balls 9 held in guide holes 51 of the ball holder 5, a pair of rolling-forming discs 501, 502, and a means (not shown) for rotatably supporting a pair of rolling-forming discs 501, 502. The opposing surface of each rolling-forming disc 501, 502 is formed with a guide groove 511 shown in FIGS. 47(*a*) and (*b*).

The ball holder 5 having guide holes 51, in which the rolling-forming balls 9 are held, is concentrically sandwiched by both discs 501, 502, in a manner that their guide groove surfaces are facing each other, and that the rolling-forming balls 9 are held in the guide groove 511. In this state, both rolling-forming discs 501, 502 are relatively rotated so that each rolling-forming ball 9 is forced to reciprocate in the guide hole 51. As described below, because the flat portions 52*e*, 52*e* of the inner wall of the guide hole 51 have a slightly smaller width than the diameter of the rolling-forming ball 9, a curved surface portion corresponding to the rolling-forming ball 9 is formed on the inner wall of the guide hole 51 by forced movement of the rolling-forming ball 9.

To rotate a pair of rolling-forming discs relatively, there are two cases: (i) both discs are rotated in opposite directions by the same force, and (ii) one disc is fixed, while the other disc is rotated. In any case, the guide grooves of the same shape are formed on the opposing surfaces of both rolling-forming discs. Thus, the above case (ii) will be explained in detail without intention of restricting the present invention thereto.

(a) Stationary Disc

The stationary rolling-forming disc 501 (hereinafter referred to as stationary disc) has guide grooves 511 for holding and guiding rolling-forming balls 9 on an opposing surface, and is provided with a projection 512 for fixing a rolling-forming apparatus (not shown) on the other end.

Figure 47:
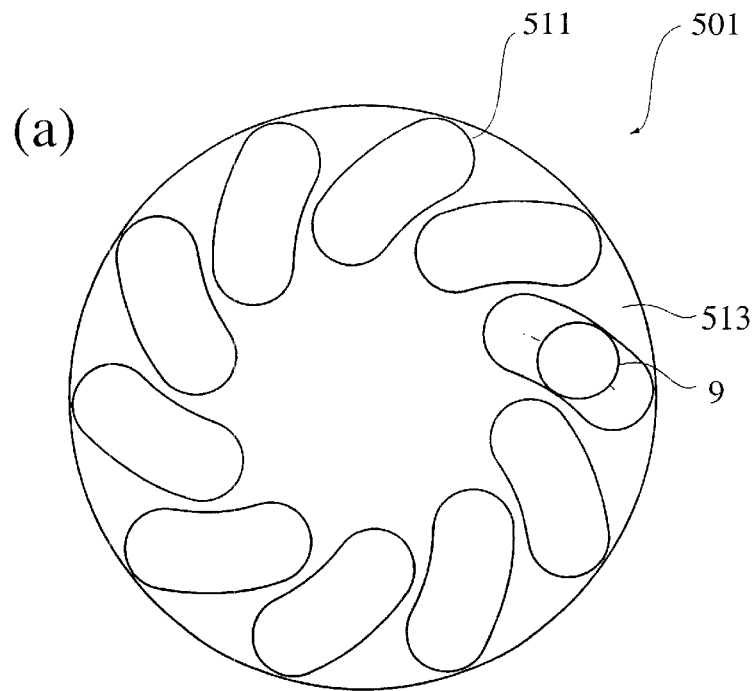
FIG. 47 is a plan view showing a guide groove in a rolling-forming disc, (a) showing an example of a guide groove consisting of a plurality of grooves, and (b) showing a guide groove consisting of one winding continuous groove.
Figure 47:
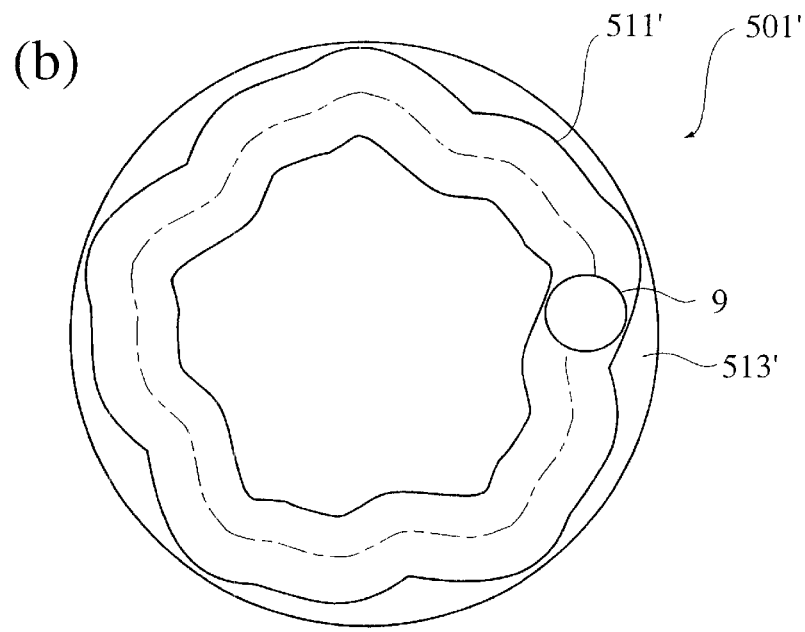

In the example shown in FIG. 47(*a*), a plurality of guide grooves 511 are formed circumferentially at an equal interval in the opposing surface 513, and all guide grooves 511 are inclined rightward or leftward relative to the radial direction (longitudinal direction of guide holes 51). The number of the guide grooves 511 is the same as that of the guide holes 51. The grooves 511 are in a linear or smoothly curved shape. The guide grooves 511 are not restricted to a particular curved shape in the present invention but may be in various shapes of curves such as an involute curve, an arcuate curve, etc. Because of the effective application of pressure to the rolling-forming balls 9, the shape of the guide grooves 511 preferably is an involute curve. Each guide groove 511 is always crossing the corresponding guide hole 51.

In the example shown in FIG. 47(*b*), a guide groove 511' is circumferential, continuous groove winding such that a radial position varies at a constant period, repeatedly comprising a region extending from a radially outer position to a radially inner position and a region extending from a radially inner position to a radially outer position. Each guide groove 511 is always crossing the guide hole 51. The guide groove 511' shown in FIG. 47(b) may be the same as the winding continuous grooves 31, 41 of the disc plates 3, 4 in the differential apparatus.

Figure 48:
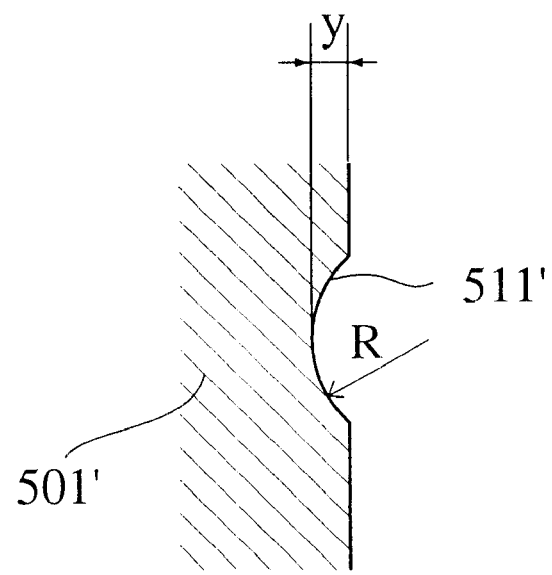
FIG. 48 is a partial, cross-sectional view showing a guide groove of a stationary rolling-forming disc.

FIG. 48 is a cross-sectional view in perpendicular to the tangent direction of the guide groove 511'. The cross-sectional shape of the guide groove 511' is usually arcuate, preferably in the shape of a circle having the same radius as that of the rolling-forming ball 9. Assuming that the ball holder 5 has a thickness x, and that the rolling-forming ball 9 has a diameter D, the groove 511' should have a depth y less than (D−x)/2. When the depth y of the groove 511' is equal to or more than (D−x)/2, an assembly of a pair of rolling-forming discs 501, 502 and a ball holder 5 brings them into contact with each other. The depth of the guide groove 511', which depends on the necessary working tolerance of the ball holder 5, is preferably between (D−x)/2−0.01 mm and (D−x)/2−0.1 mm. In a range in which the rolling-forming balls 9 are used for rolling-forming, the edges of the guide holes 51 are bulged in a thrust direction to a degree proportional to the deformed depth of the guide holes, and the resultant bulged portions may be removed by the subsequent working.

Figure 49:
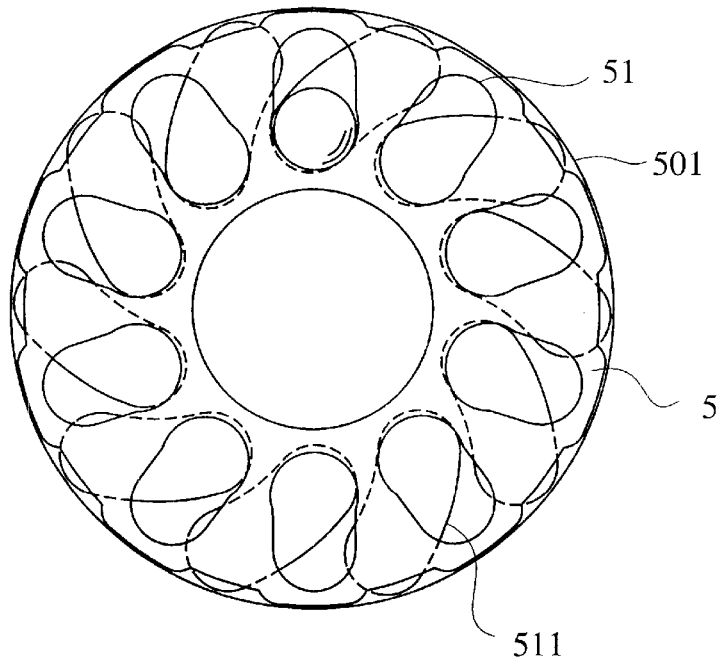
FIG. 49 is a front view showing an assembly of a stationary rolling-forming disc and a ball holder.

FIG. 49 shows a positional relation of the guide grooves 511 and the guide holes 51 in a case where the stationary disc 501 having guide grooves 511 as shown in FIG. 47(a) is concentrically assembled with the ball holder 5. The rolling-forming balls 9 are held in enlarged portions 51a of the guide holes 51 at a radially inner end.

(b) Rotatable Disc

The rotatable rolling-forming disc 502 (hereinafter referred to as rotatable disc) is also provided with guide grooves 521 each having the same cross-sectional shape and size as those of the stationary disc 501 on an opposing surface, and a projection 522 for connecting to a member for rotatably holding the rotatable disc 502 on the other end.

Figure 50:
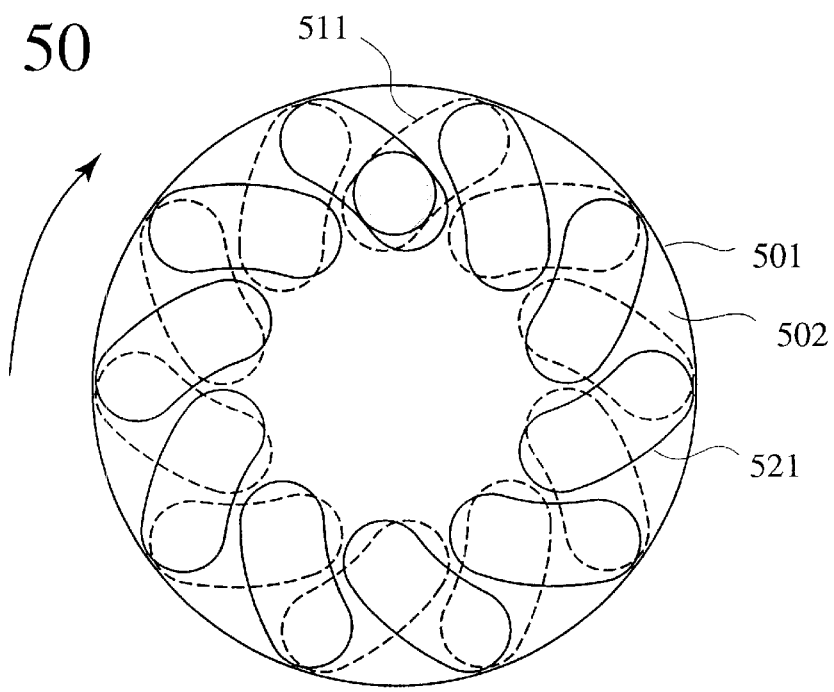
FIG. 50 is a front view showing an assembly of a stationary rolling-forming disc and a rotatable rolling-forming disc.

The shape of the guide grooves 521 may be the same as that of the stationary disc 501 shown in FIGS. 47(a) and (b). FIG. 50 shows the positional relation of guide grooves 511 and 521 in a state where both discs 501, 502 are opposing each other. When both discs 501, 502 are opposing each other, the guide grooves 511 of the stationary disc 501 cross the guide groove 521 of the rotatable disc 2. The rolling-forming balls 9 are located at intersections of both guide grooves 511 and 521. When the rotatable disc 502 is slowly rotated clockwise, the intersections of the guide grooves 511 and 521 gradually move toward the periphery side. Thus, the rolling-forming balls 9 held at the intersections of the guide grooves 511 and 521 are forced to move from the center side to the periphery side, whereby they are moved radially outwardly in the guide holes 51 of the ball holder 5.

(c) Rolling-forming Balls

The diameter of the rolling-forming balls 9 is determined depending on the width of the curved surface portions of the guide holes 51 of the ball holder 5. The diameter of the rolling-forming balls 9 is preferably the width of curved surface portions of the guide holes 51+0–0.2 mm, particularly preferably the width of flat portions+0.02–0.1 mm.

When rolling-forming is carried out by a plurality of steps, plural types of rolling-forming balls having different diameters may be used. In such a case, rolling-forming is first carried out with rolling-forming balls having a smaller diameter and then with those having a larger diameter for finish rolling-forming.

(d) Primarily Worked Ball Holder

Figure 51:
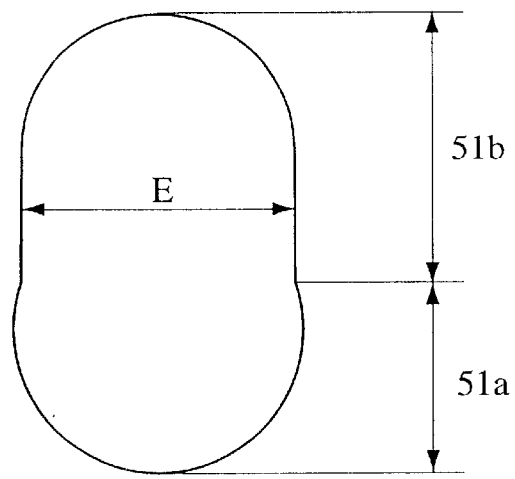
FIG. 51 is a schematic view showing the shape of a guide hole of a ball holder.
Figure 52:
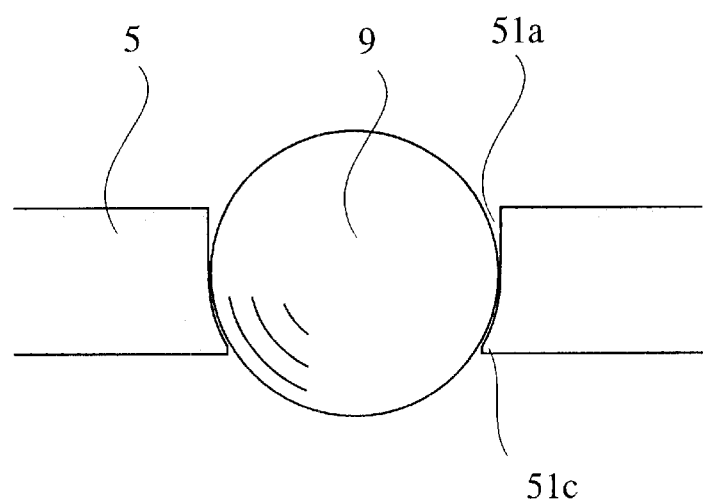
FIG. 52 is a partial, cross-sectional view showing the inner wall of a guide hole of a ball holder.

In the primary working of the ball holder, guide holes 51' having substantially flat and vertical inner walls are formed using a end mill, etc. As is shown in FIG. 51, the primarily worked guide hole 51 is an assembly of an enlarged portion (circular aperture portion) 51a for receiving a rolling-forming ball 9 at a radial end, and an aperture 52b extending linearly in a radial direction. In the example shown in FIG. 51, the circular aperture portion 51a is positioned at a radial inner end of the ball holder 5, though it may be at a radial outer end of the ball holder 5 or at both radial ends. To prevent the rolling-forming ball 9 from dropping from the circular aperture portion 51a of the guide hole 51, the circular aperture portion 51a may be provided with an inward projection 51c on one side.

Because the width E of the radial aperture 51b of the guide hole 51 is the same as the interval of the flat portions 52e, 52e, it is smaller than the diameter of the ball 6 by a plastic deformation margin. The level of the plastic deformation margin is determined by the size of the rolling-forming ball 9, the number of rolling-forming balls used in one operation, the number of rolling-forming steps, a rotation torque at rolling-forming, etc. When the rolling-forming balls 9 are large, plastic deformation margin in one operation is also large. Because too large a plastic deformation margin in one operation would invite too high a load, the rolling-forming may be carried out by two or more steps. For instance, with respect to a ball holder 5 having 10 guide holes 51, five guide holes is rolling-formed by the first rotation, with all guide holes including the remaining five guide holes rolling-formed by the second rotation.

In a specific example of plastic deformation, when the guide groove has a width (after working) of 16.05 mm, and the rolling-forming ball has a diameter of 16.2 mm, the plastic deformation margin on one side is preferably 0.01–0.6 mm. When the plastic deformation margin exceeds 0.6 mm, there is too high resistance at the time of rolling-forming, thereby being likely to deform the guide grooves of the rolling-forming disc and thus failing to form precise curved surface portions on the inner walls of the guide holes. On the other hand, when the plastic deformation margin is too small, the curved surface portion, which is in an elastic range, is not plastically deformed, likelier to return to its original shape after rolling-forming. The preferred plastic deformation margin on one side is 0.02–0.5 mm. Incidentally, when the plastic deformation margin on one side exceeds 0.3 mm, all guide holes cannot be rolling-formed by one step. Thus, the rolling-forming is carried out by a plurality of steps as described above, thereby providing high precision to rolling-forming and thus increasing the life of the rolling-forming disc, the rolling-forming balls, etc.

(2) Rolling-forming Method

As shown in FIG. 46, a rolling-forming ball 9 is entered into an enlarged portion (circular aperture portion) 51a of the primarily worked ball holder 5, and the ball holder 5 is concentrically sandwiched by a pair of relatively rotatable, rolling-forming discs 501, 502. When the rolling-forming balls 9 are held by guide grooves 511, 521 on one rolling-forming disc 501, 502, the ball holder 5 is keyed to the rolling-forming balls 9.

As described above, a pair of rolling-forming discs 501, 502 are relatively rotated by (i) rotating both discs in opposite directions by the same force, or (ii) keeping one disc stationary, and rotating the other rolling-forming disc.

Figure 53:
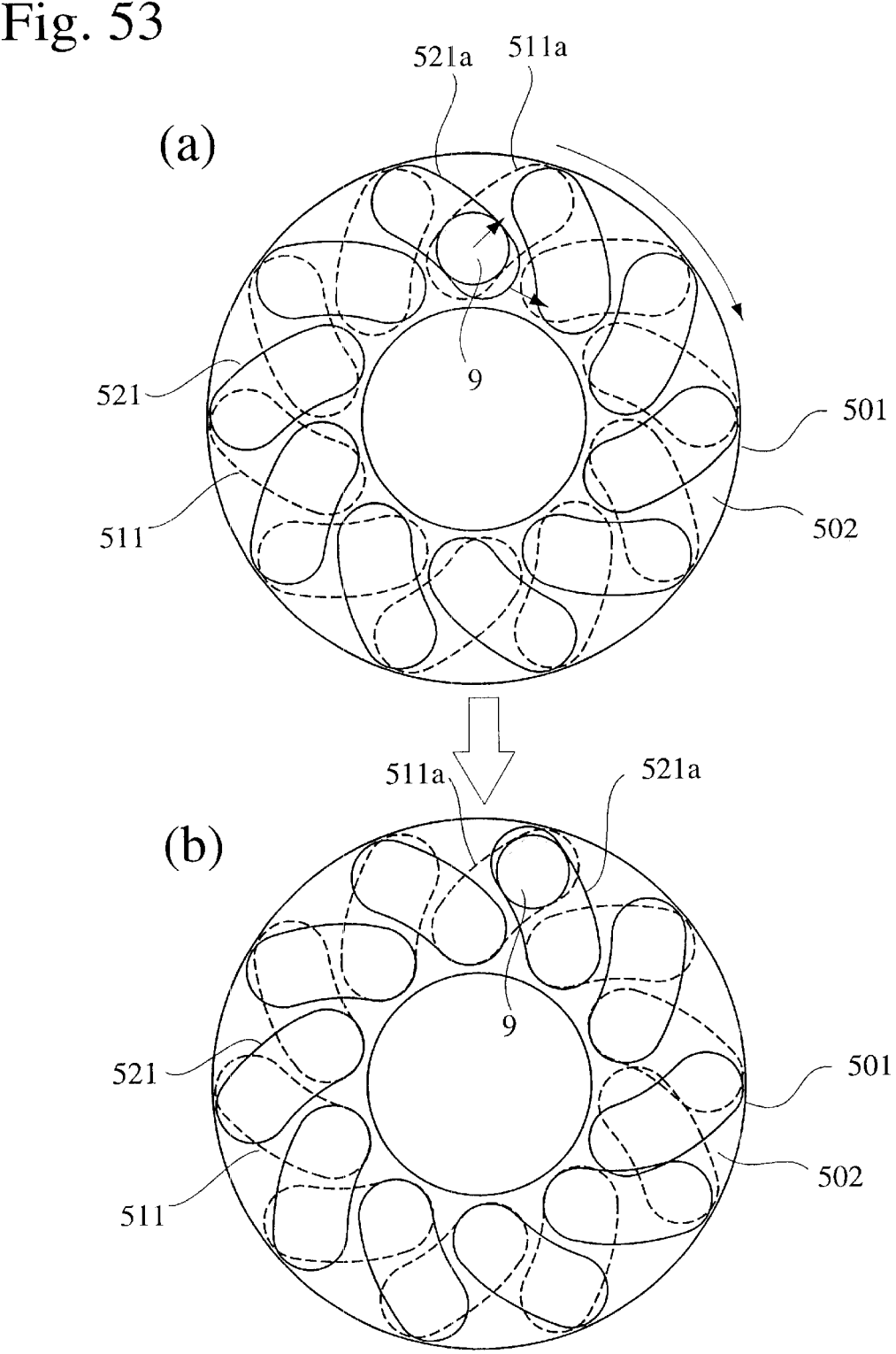
FIG. 53 is a front view showing an assembly of a stationary rolling-forming disc, a rotatable rolling-forming disc and rolling-forming balls, (a) showing the start of rolling-forming, and (b) showing a state when the rolling-forming is completed by the rotation of a rotatable disc.
Figure 54:
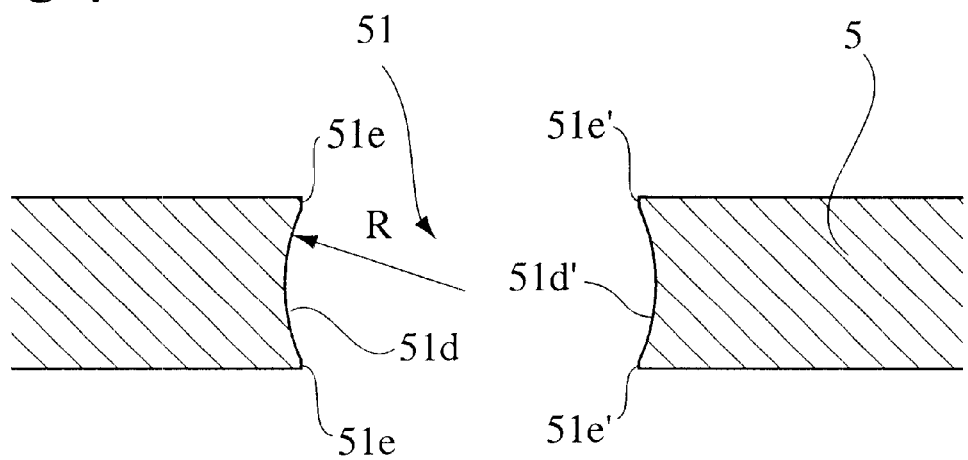
FIG. 54 is a partial, cross-sectional view showing the inner wall of a guide hole of a ball holder.
Figure 55:
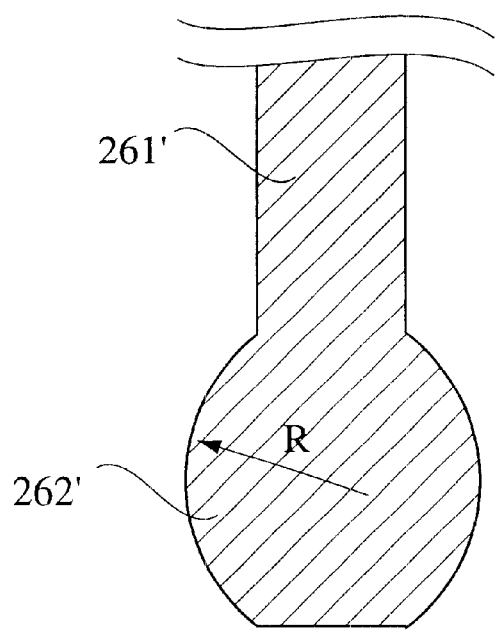
FIG. 55 is a schematic cross-sectional view showing a special end mill for working a guide hole of a ball holder.

In the case of (ii), when the rotatable disc 502 is rotated while keeping the disc 501 stationary, the guide groove 21a rotates clockwise, as is clear from the corresponding guide grooves 511a, 521a (see FIG. 53). As a result, the rolling-forming balls 9 held at the intersections of the guide grooves 511 and 521 are forced to move radially outwardly. When the rolling-forming balls 9 reach the radially outer side of the guide holes 51, the rolling-forming is completed (see FIG. 53(b)). The rotation of the rotatable disc 502 serves to form a more uniform curved surface portion. Thus, the rotation of the rotatable disc 502 forces the rolling-forming balls 9 to move from one end to the other end of the guide holes 51, thereby rolling-forming concavely curved surface on the inner walls of the guide holes 51.

The number of guide holes 51 rolling-formed by one operation may properly be determined depending on the size of plastic deformation margin of the guide holes 51, etc. When all guide holes 51 are rolling-formed by rolling-forming balls 9, the rolling-forming balls 9 push each other in the adjacent guide holes 51, thereby making it possible to form guide holes having closer width to the diameter of the rolling-forming balls 9 and thus easily set the width of the flat portions of the guide holes. However, because too large a plastic deformation margin necessitates a high rotation torque, a rolling-forming ball 9 may be placed, for instance, in alternate guide holes 51 to be rolling-formed to utilize the rigidity of a disc plate portion between the adjacent guide holes, thereby reducing the rotation torque in the process of rolling-forming. Next, the rolling-forming balls 9 are transferred to the remaining guide holes 51 to continue the rolling-forming. Thus, rolling-forming in several operations provides higher finish precision, longer life of jigs and lower production cost.

Thus, a curved surface portion can be formed on the inner walls of the guide holes 51 in the ball holder 5 simply in a short period of time only several rolling-forming operations. Further, the finish surfaces of the rolling-formed curved surface portions are improved in surface roughness than those worked by tools.

For the purposes of improving surface roughness on worked members, and increasing the life of rolling-forming balls and rolling-forming discs, the worked members is preferably subjected to chemical treatment by phosphates, etc. Also, the same chemical treatment can be performed on rolling-formed balls, discs, etc.

[4] Lubricating Treatment

It is preferable that the inside of the differential apparatus is lubricated with a known lubricating oil, and that at least inner surfaces of the guide holes of the ball holder are provided with (a) a chemical treatment coating layer, or (b) a chemical treatment coating layer and a solid lubricating layer in this order from below. Further, the guide grooves 31, 41 of the disc plates 3, 4 and the balls 6 are preferably provided with (a) a chemical treatment coating layer, or (b) a chemical treatment coating layer and a solid lubricating layer in this order from below.

Because a lubricating oil is circulating in a casing consisting of the case 1 and the case cover 2, the surfaces of the disc plates 3, 4 and the balls 6 are wet with the lubricating oil. Accordingly, the inner surfaces of the guide holes 51 of the ball holder 5 and the surfaces of the balls 6, and further the surfaces of the guide grooves 31, 41 of the disc plates 3, 4 are lubricated with both of the chemical treatment coating layer (or the chemical treatment coating layer and the solid lubricating layer) and the lubricating oil. Thus, the inner surfaces of the guide holes 51, the surfaces of the balls 6 and the surfaces of the guide grooves 31, 41 are not only excellent in lubrication and wear resistance, but also resistant to scarring, only suffering from the peeling of the chemical treatment coating layer or the solid lubricating layer at most, under a high load in an initial fitting period. Because there remains a solid lubricating layer in the recesses of the chemical treatment coating layer even after the initial fitting period, lubricating effects can be retained for a long period of time.

(A) Chemical Treatment Coating Layer

The chemical treatment coating layer having excellent lubrication, wear resistance and initial fitting can be formed by immersing the ball holder 5 in a chemical treatment agent or spraying the chemical treatment agent to the ball holder 5. The chemical treatment agents may include phosphate chemical treatment agents such as zinc phosphate, manganese phosphate, etc.

The chemical treatment coating layer may have different thickness depending on portions on which it is formed, though it is preferably 1–100 $\mu$m in general. When the chemical treatment coating layer is as thin as less than 1 $\mu$m, full effects of fittably wearing cannot be obtained. On the other hand, when it exceeds 100 $\mu$m, too much corrosion occurs, resulting in decrease in the hardness of the chemical treatment coating layer.

(B) Solid Lubricating Layer (1) Composition of Solid Lubricating Layer

The solid lubricating layer used in the present invention comprises as main components a resin-based coating composition and a solid lubricant to provide excellent lubrication, wear resistance and initial fitting. With the solid lubricating layer formed on the chemical treatment coating layer, the solid lubricating layer enters into recesses of the chemical treatment coating layer, thereby being less likely to peel off.

Resins usable for coating compositions in the present invention are thermoplastic resins having excellent lubrication, wear resistance, heat resistance, etc. For instance, they include vinyl monofluoride resins, vinylidene difluoride resins, ethylene trifluorochloride resins, tetrafluoroethylene resins, fluoroolefin-hydroxy alkyl ether copolymers, fluoroolefin-hydroxy alkyl acrylate copolymers, fluoroolefin-hydroxy alkyl methacrylate copolymers, fluoroolefin-allyl alcohol copolymers, fluoroolefin-methacryl alcohol copolymers, fluoroolefin-cyclohexyl vinyl ether copolymers, fluoroolefin-glycidyl vinyl ether copolymers, etc. The fluoroolefins include fluoro-resins such as tetrafluoroethylene, chlorotrifluoroethylene, etc., thermosetting epoxy resins, thermosetting polyester resins, thermosetting acrylic resins, etc.

In addition to molybdenum disulfide, graphite, boron nitride, mica, tungsten disulfide, poly-p-hydroxy benzoic acid, etc. may be used for solid lubricants. The percentage of the solid lubricant is preferably 3–40 weight %, more preferably 5–30 weight % based on the entire solid lubricating layer. When the amount of the solid lubricant is less than 3 weight %, sufficient lubrication and wear resistance cannot be obtained, and the friction coefficient cannot fully be stabilized. On the other hand, when the amount of the solid lubricant exceeds 40 weight %, the solid lubricant is not uniformly dispersed in a resin-based coating composition, failing to achieve sufficient lubrication and wear resistance. Also, when coating is carried out by spraying, it tends to clog a nozzle, thereby making it difficult to form a solid lubricant layer.

The solid lubricating layer may further contain binder resins, pigments, dispersion stabilizers, viscosity adjusters, anti-gelling agents, plasticizers, drying agents, hardening agents, anti-skinning agents, anti-sagging agents, and other additives necessary for coating compositions.

(2) Formation of Solid Lubricating Layer

To form the solid lubricating layer, a resin-based coating composition having the above formulation is prepared, coated and dried. The resin-based coating composition may be either in an organic solvent type or an aqueous type. Solvents for providing organic solvent-type coating compositions may be, for instance, aromatic hydrocarbons such as xylene and toluene, alcohols such as n-butanol, esters such as butyl acetate, ketones such as methyl isobutyl ketone, glycol ethers such as ethyl cellosolve, etc., and various commercially available thinners may also be used. Resins and solvents may be mixed by usual mixers for preparing coating compositions such as ball mills, paint shakers, sand mills, three-roll mills, jet mills, kneaders, etc.

The resin-based coating composition is applied to the surface of the differential apparatus, the inner surfaces of the guide holes 51 of the ball holder 5 and the surfaces of balls 6 by a brushing method, an air spray method, a dipping method, etc.

The resultant coating layer is subjected to drying and/or baking treatment, if necessary. The drying is carried out usually at room temperature to 60° C. When a fluoro-resin, for instance, is used as a vehicle resin, baking is preferably carried out at a temperature of 80–300° C. after drying. When it is lower than 80° C., the adhesion of the solid lubricating layer is insufficient. On the other hand, when it exceeds 300° C., cracking undesirably tends to occur. The baking time may be 5–120 minutes, preferably 10–60 minutes.

In general, the thickness of the solid lubricating layer, which may be different depending on portions to which the solid lubricating layer is applied, is preferably 1–50 $\mu$m.

[5] Fixing of Ball Holder

Figure 56:
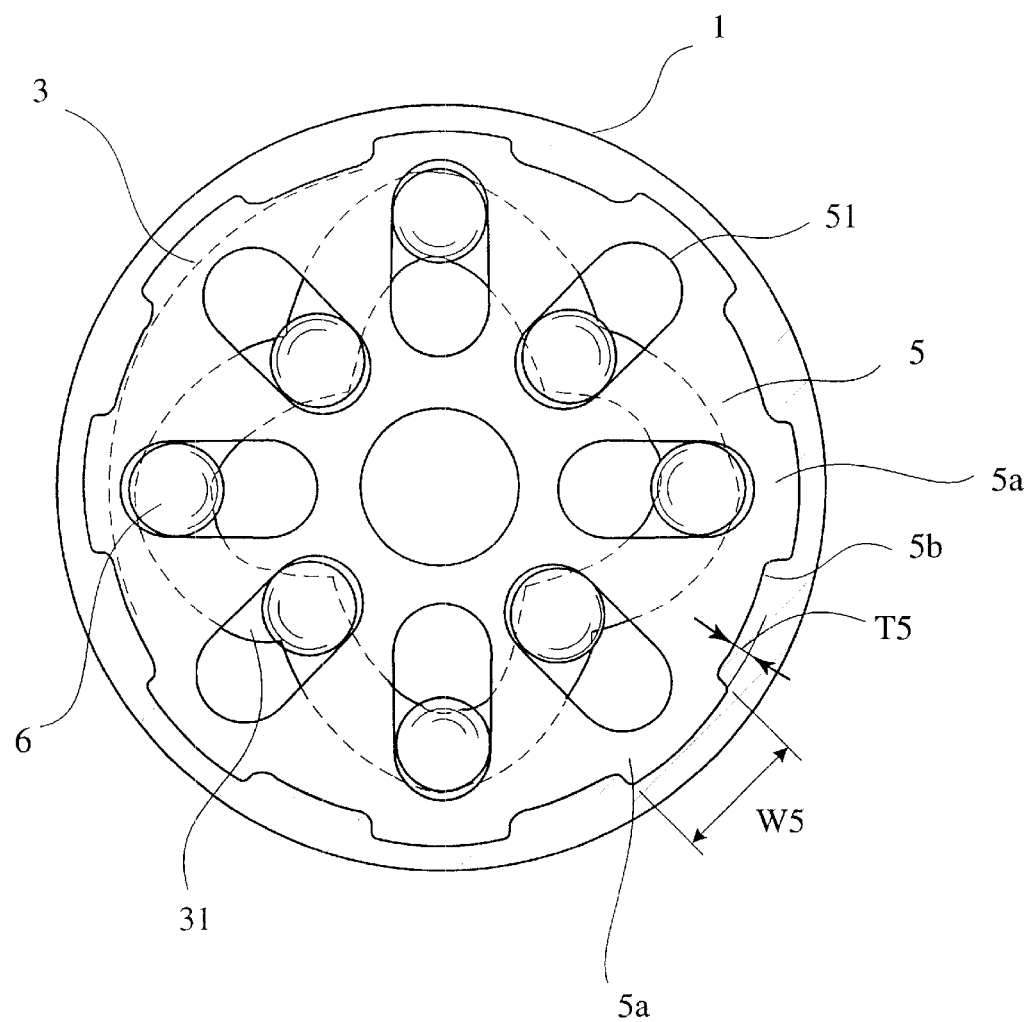
FIG. 56 is a schematic view showing one example of the engagement of a ball holder with a casing.

FIG. 56 shows one example of the engagement of the casing with the ball holder. In this embodiment, the ball holder 5 has large-radius portions on a periphery outside the guide holes, and at least part of the periphery between the adjacent guide holes is constituted by small-radius portions. The large-radius portions and the small-radius portions of the ball holder engage the recesses of the inner wall of the differential case. Portions of the differential case engaging the ball holder 5 are preferably subjected to a heat treatment comprising high-frequency hardening and tempering to have hardness Hv of 400 or more from surface to a depth of up 1 mm.

In the preferred embodiment, the ball holder 5 is made of SUP10 (JIS), having a thickness of 6 mm. It also has large-radius portions 5a around the guide groove 51. Each large-radius portion 5a has an outer diameter of 110 mm and a width $W_5$ of 16 mm. Also, each small-radius portion 5b between the adjacent large-radius portions 5a preferably has a diameter of 105 mm and a radial height T of 2.5 mm. Each guide groove 51 has a width of 16 mm.

The differential case 1 is preferably produced from spheroidal graphite cast iron corresponding to (JIS) FCD600, having an outer diameter of 120 mm and an inner diameter of 106 mm. Also, the engaging portions 1j of the differential case 1 are subjected to a heat treatment comprising high-frequency hardening and tempering so that they have hardness Hv of 400 or more from surface to a depth of up 1 mm. The case cover 2 is in the shape of a dish having a thickness of 20 mm. Each disc plate 3, 4 has an outer diameter of 105 mm and is flat in an opposing surface, and the flat portion preferably has a thickness of 14 mm.

Figure 58:
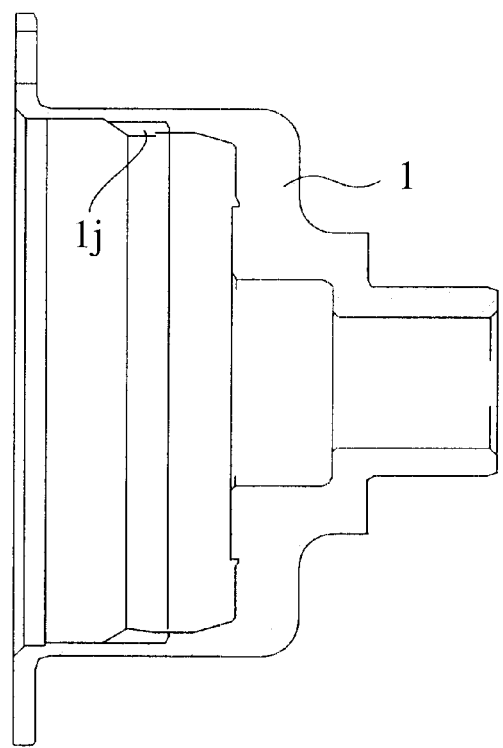
FIG. 58 is a cross-sectional view for showing a differential case.

After machining the differential case 1, its engaging portions 1j are preferably subjected to a heat treatment comprising high-frequency hardening and tempering. To carry out the high-frequency hardening and the tempering on the engaging portions 1j of the differential case 1 shown in FIG. 58, a jig is mounted to the differential case 1, and a high-frequency coil is positioned near the engaging portions of the differential case 1. After the high-frequency hardening, the tempering is carried out, for instance, at 160–250° C. for 1 hour to remove stress. The high-frequency hardening and the tempering provide the engaging portions 1j with a martensitic structure and thus wear resistance, while the outer portions of the differential case 1 retain a parlite structure.

With the above structure, the differential case 1 and the case cover 2 are rotated by a driving force from an engine (not shown), such that a torque is transmitted from the engaging portions 1j of the differential case 1 to the engaging portions (large-radius portions) of the ball holder 5, thereby rotating the ball holder 5. The rotation force of the ball holder 5 is transmitted to the winding continuous groove 31 of each disc plate 3 via each ball 6 in each guide groove 51, and then to laterally disposed drive shaft (not shown) connected to each disc plate 3.

Figure 57:
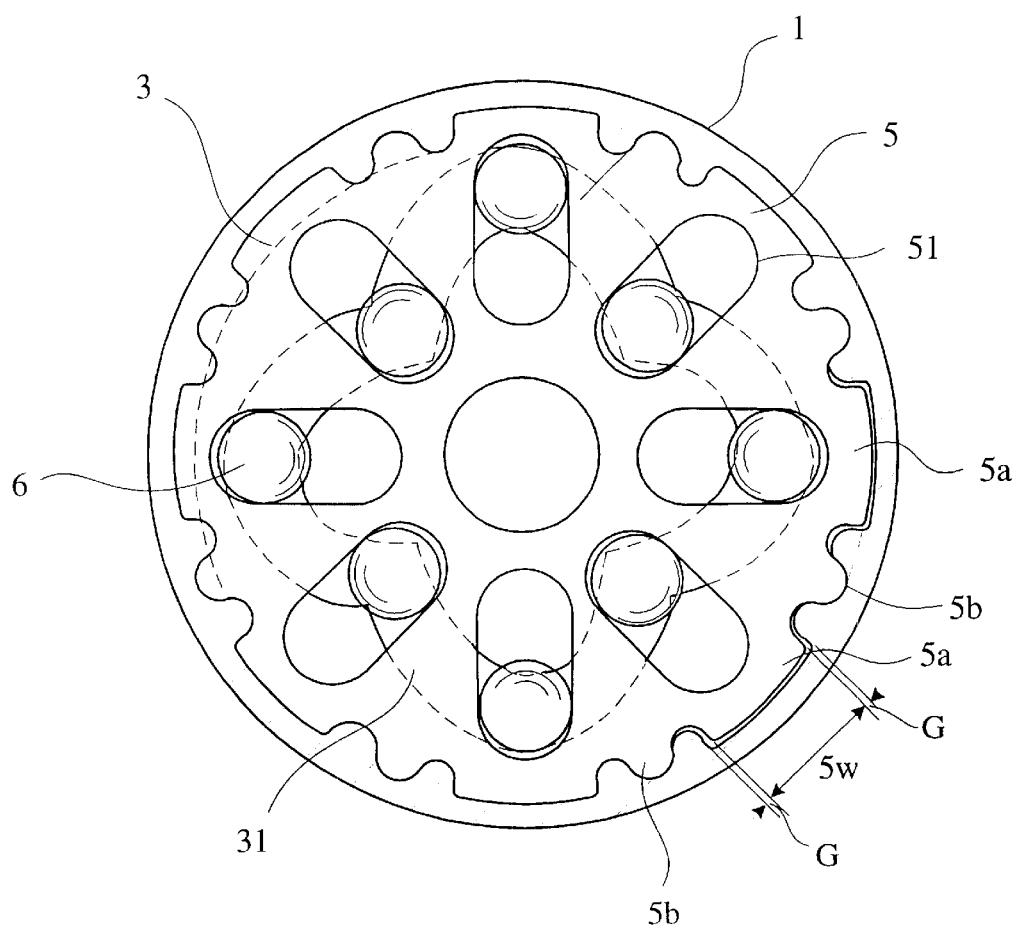
FIG. 57 is a schematic view showing another example of the engagement of a ball holder with a casing.

FIG. 57 shows another example of the engagement of the casing with the ball holder. In this embodiment, the ball holder 5 has large-radius portions 5a outside the guide holes 51, and narrow projections 5b having substantially the same height as that of the large-radius portions 5a on both sides of the large-radius portions 5a. The engaging portions 1j of the differential case 1 have a complementary shape to those of the large-radius portions 5a and the projections 5b of the ball holder 5, with a slight gap therebetween. Therefore, there is no need to extremely increase the working precision of the differential case 1 and the ball holder 5, contributing to the reduction of production cost.

By the fixing method of the ball holder in this embodiment, each part of the differential apparatus shows enough durability even in an evaluation test at an input torque of 91 N·m, a difference in differential rotation of 40 rpm and the number of differential rotation of 240,000. Large torque transmission can be achieved even though there is limitation in the size of the differential case 1, and this fixing method is applicable to many types of differential apparatuses having different torque transmission for various vehicles.

Figure 59:
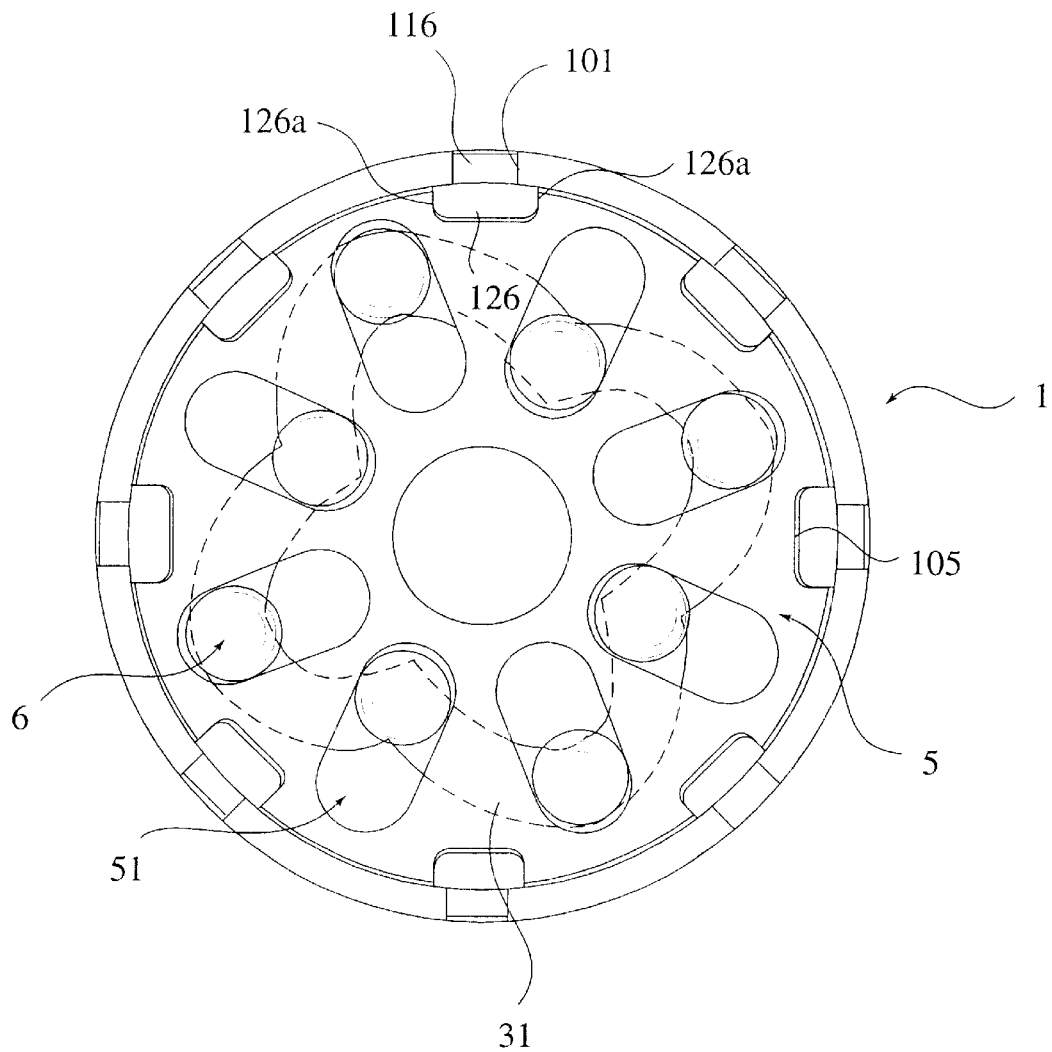
FIG. 59 is a schematic view showing one embodiment in which a ball holder engages a casing by pins.

In the differential case 1 according to the preferred embodiment shown in FIG. 59, through-holes 101 are formed at a constant interval at eight axial positions to which the ball holder 5 is assembled. Implanted to through-holes 101 from inside are a plurality of (8 in the illustrated embodiment) mushroom-shaped pins 106 as engaging members.

The mushroom-shaped pin 106 is constituted by a small-diameter stem portion 116 and a large-diameter head portion 126 having a substantially rectangular transverse cross section with both flat side surfaces 126a in an axial direction. The mushroom-shaped pin 106 is made of structural carbon steel, and formed by a cold forging method with a grinding margin left on both side surfaces 126a. After the mushroom-shaped pin 106 is entirely hardened and tempered, cutting is performed on the stem portion 116 and the flat side surfaces 126a, if necessary.

The ball holder 5 is provided with a plurality of recesses 105 on a periphery at positions corresponding to the through-holes 101. The recesses 105 can be formed by cutting eight portions by a cutter grinding machine at a circumferentially identical interval.

Figure 60:
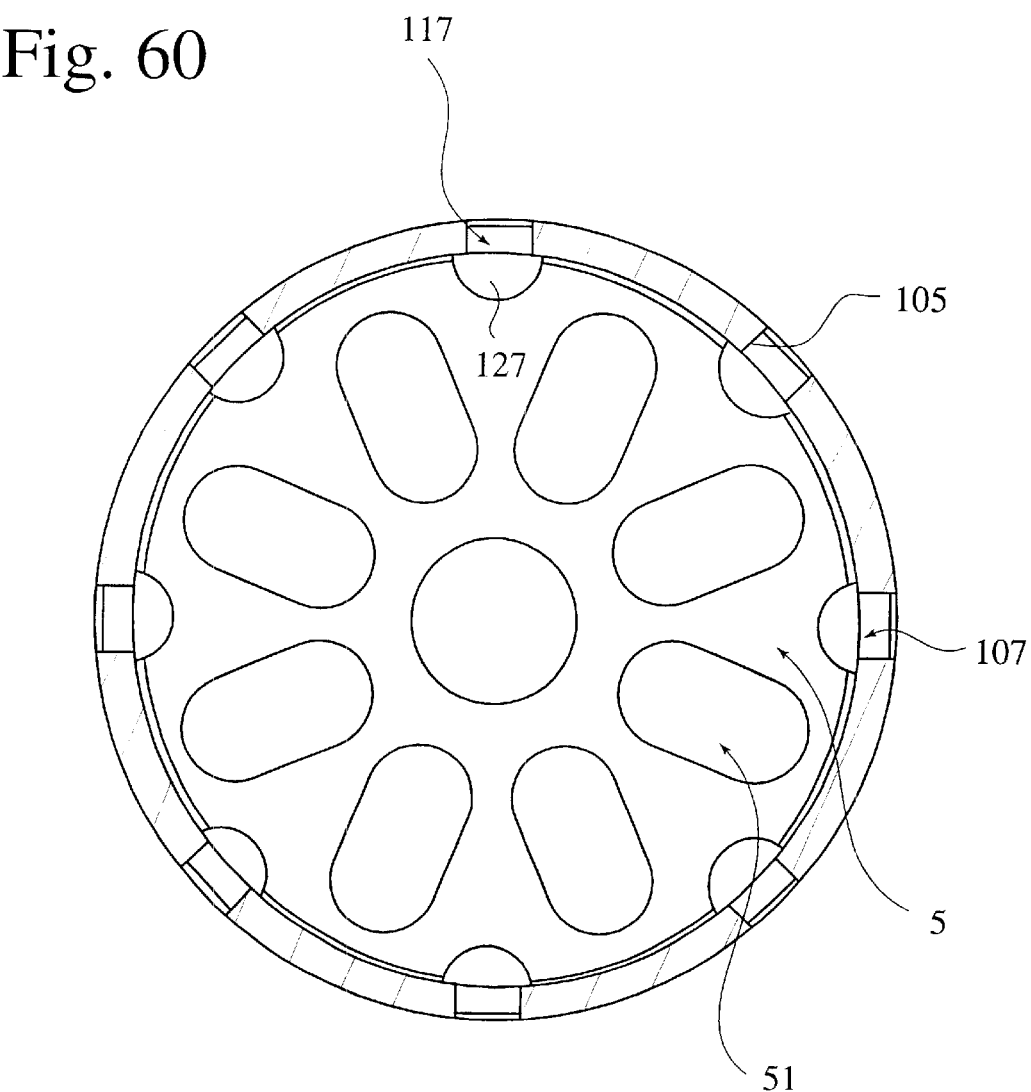
FIG. 60 is a schematic view showing another embodiment in which a ball holder engages a casing by pins.
Figure 61:
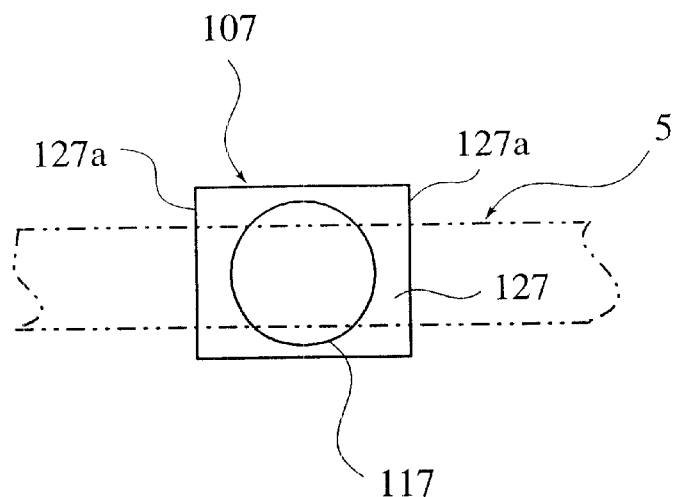
FIG. 61 shows a mushroom-shaped pin of FIG. 60, (a) being a plan view, and (b) being a side view.
Figure 61:
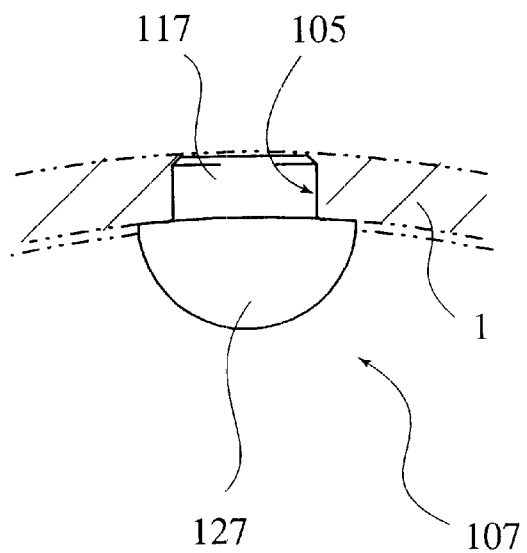

FIG. 60 shows a mushroom-shaped pin 107 according to another embodiment, and FIGS. 61(a) and (b) show the details of the shape of the mushroom-shaped pin. The mushroom-shaped pin 107 is constituted by a small-diameter stem portion 117 and a large-diameter curved-surface head 127 having a rectangular bottom surface. Therefore, both side surfaces 127a of the curved-surface head 127 are flat. The mushroom-shaped pin 107 is made of structural carbon steel, and formed by a cold forging method with a grinding margin left on both side surfaces 127a. After the mushroom-shaped pin 106 is entirely hardened and tempered, cutting is performed on the stem portion 117 and the flat side surfaces 127a, if necessary.

In any case, the mushroom-shaped pins 106, 107 are implanted to the differential case 1 from inside, thereby preventing the mushroom-shaped pins 106, 107 from being detached and avoiding the differential apparatus from being large. Also, because the flat side surfaces 126a, 127a and the recesses 105 of the ball holder 5 are cut so that their gap is minimum, the differential apparatus is prevented form pulsation and thus has improved calmness and durability when the ball holder 5 is fixed to the inner wall of the differential case 1 with the mushroom-shaped pins 106, 107.

Figure 62:
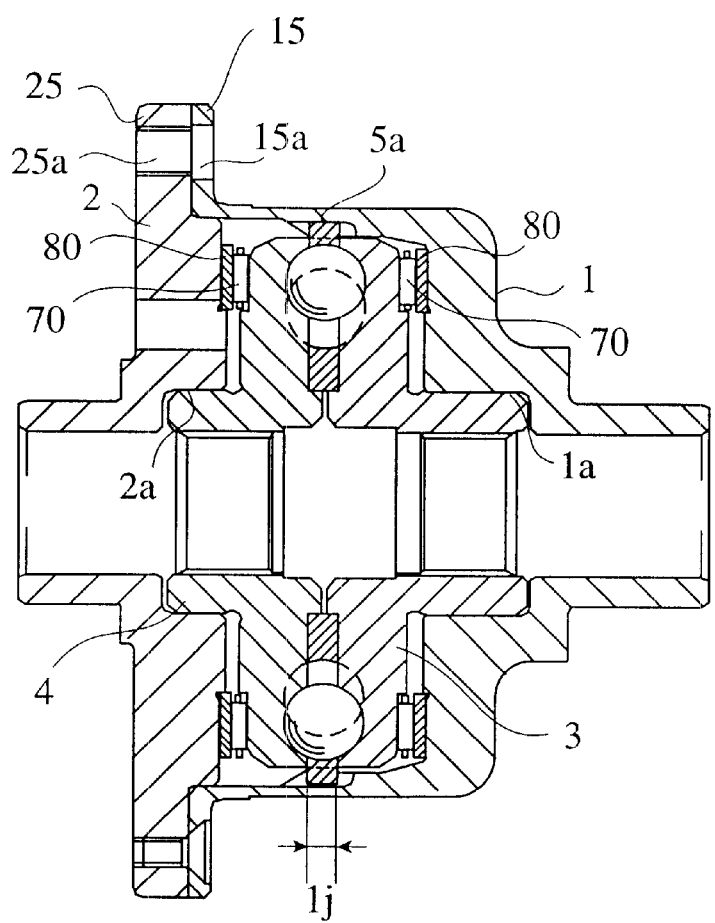
FIG. 62 is a cross-sectional view showing a differential apparatus having a differential-limiting means according to one embodiment of the present invention.

In the preferred embodiment shown in FIG. 62, the differential case 1 is in a cylindrical shape having one open end and an inner diameter of 110 mm, and provided at a center with a bearing 1a having an inner diameter of 45 mm for supporting one disc plate 3. The open end of the differential case 1 has a flange 15 having an outer diameter of 160 mm, and the flange 15 is provided with 10 apertures 15a for receiving bolts. The inner surface of the differential case 1 is provided with engaging portions 1j having a width of 10 mm for engaging the large-radius portions 5a of the ball holder 5 so that the ball holder is fixed in a rotational direction. The case cover 2 is in the shape of a dish provided with a bearing 2a having an inner diameter of 45 mm for supporting the disc plate 4 at a center. The periphery of the case cover 2 is provided with a flange 25 having an outer diameter of 160 mm, which is provided with a large number of threaded apertures 25a for receiving bolts. Thus, the case cover 2 is fixed to the differential case 1 by bolts of M10 (not shown) for clamping the flanges 15, 25.

Figure 63:
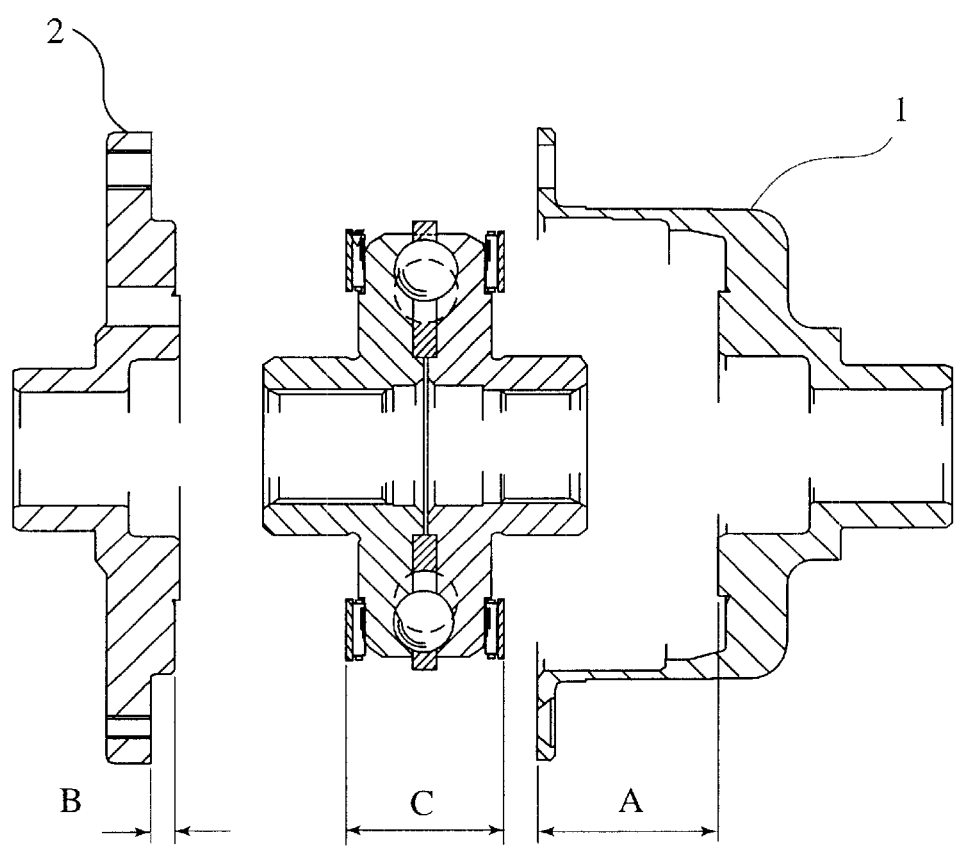
FIG. 63 is an exploded, cross-sectional view showing the differential apparatus of FIG. 62.

With each disc plate 3, 4, a ball holder 5, each ball 6, each plain washer 80, and each needle bearing 700 disposed inside the differential case 1 and the case cover 2 having a size shown in FIG. 63, namely with the size in an axial direction set to [(A–B)–C], an initial differential-limiting force was examined. Table 1 shows the relation between [(A–B)–C] and the initial differential-limiting force.

TABLE 1

| No. | [(A – B) – C] (mm) | Initial Differential-Limiting Force (kg · m) |
|---|---|---|
| 1 | –0.01 | 1.1 |
| 2 | –0.015 | 1.7 |
| 3 | –0.02 | 2.1 |
| 4 | –0.05 | 5.3 |
| 5 | –0.07 | 7.2 |
| 6 | –0.15 | 15.0 |

As shown in Table 1, a proper initial differential-limiting force can be obtained when the dimension [(A–B)–C] is set minus. This is because the entire differential apparatus including the differential case and the case cover functions as an elastic body like a spring washer, whereby biasing pressure is applied to the inside of the disc plates in an axial direction to give an initial differential-limiting force.

When the differential case 1 and the case cover 2 are rotated, a torque is transmitted to the ball holder 5 engaging the engaging portions 1j of the differential case 1, and the resultant rotation force is transmitted to the groove 31 of each disc plate 3 via each ball 6 and then to a laterally disposed drive shaft (not shown) connected to each disc plate 3. Each plain washer 80 disposed on the outside surface of each disc plate 3 reduces the wear of inner and outer angular corners, thereby obtaining stable biasing pressure to the inside in an axial direction. Also, with each needle bearing 70, wear is prevented on the differential case 1, the case cover 2 each disc plate 3, thereby improving the durability of the differential apparatus.

The differential-limiting means 90 according to the embodiment shown in FIGS. 64(a) and (b) comprises an annular roller case 91, a large number of rollers 92 disposed circumferentially in the annular roller case 91, and sliding members 93 disposed between a large number of rollers 92 at a constant interval. Each roller 92 is in a cylindrical shape having a diameter $d_1$, and sliding members 93 are in a rectangular shape having a friction coefficient of 0.05–0.3 and a thickness $t_1$ within $d_1 \pm 50$ μm. This differential-limiting means 90 has characteristics near the line $L_1$ in FIG. 66.

The differential-limiting means 90 having such a structure is brought into contact with the opposing surfaces of the differential case 1 and the disc plates 3, 4 depending on a rotation force. In the case of a low rotation force with difference in rotation in the disc plates 3, 4, the rollers 92 are mostly brought into contact with the opposing surface of the differential case 1 and the disc plates 3, 4. However, in the case of a high rotation force at the time of rapid start, etc., constituent parts of the differential-limiting means 90 are elastically deformed depending on a rotation force, whereby the sliding members 93 are brought into strong contact with the differential case 1 and the disc plates 3, 4, resulting in increase in a friction force. Thus, stable differential-limiting force can be obtained in a wide range from a low rotation force to a high rotation force.

When the thickness $t_1$ of the sliding members 93 is properly selected from a range from –50 μm to +50 μm relative to the roller diameter $d_1$, a proper differential-limiting force depending on the purposes can be obtained with the friction coefficient to the opposing surface of the casing and the disc plates changeable.

Figure 65:
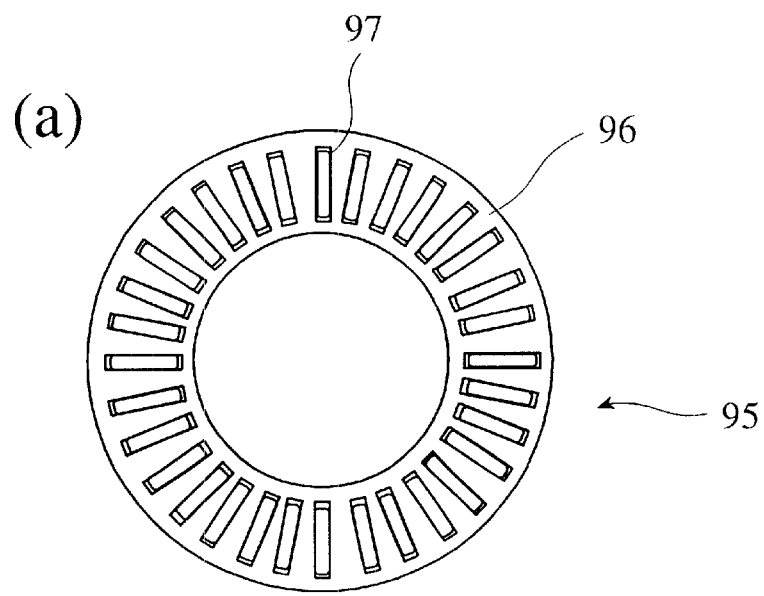
FIG. 65 shows a differential-limiting means comprising rollers and a roller-holding member, (a) being a plan view, and (b) being a partial, cross-sectional view.
Figure 65:
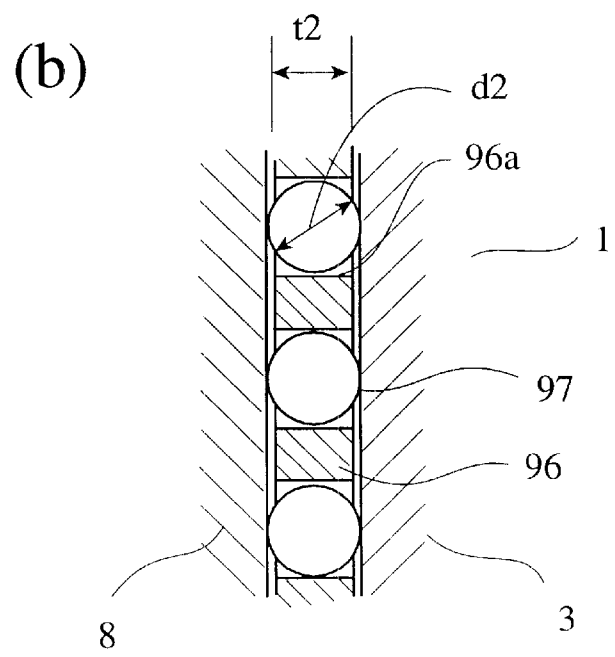
Figure 66:
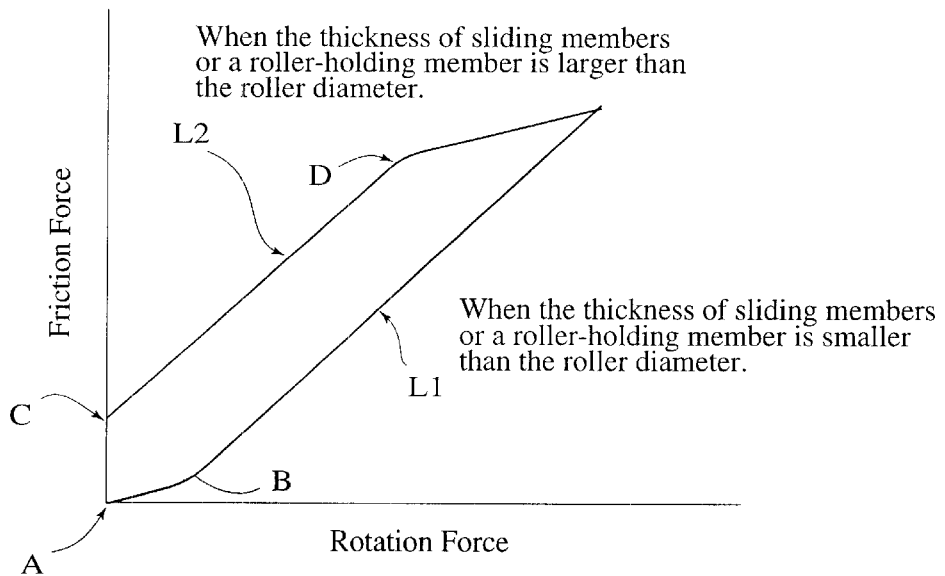
FIG. 66 is a graph showing the relation between a rotation force and a friction force, when the thickness of a sliding members or a roller-holding member is different from the diameter of a roll.

The differential-limiting means 95 according to another embodiment shown in FIGS. 65(a) and (b) comprises an annular roller-holding member 96 and rollers 97 held in a groove 96a at a constant interval in a circumferential direction of the roller-holding member 96, with initial differential limitation characteristics near the line $L_2$ in FIG. 66. The roller-holding member 96 has a friction coefficient of 0.05–0.3 and a thickness $t_2$ within a range of roller diameter $d_2 \pm 50$ μm. When the thickness $t_2$ of the roller-holding member 96 is properly selected from a range from –50 μm to +50 μm relative to the roller diameter $d_2$, a proper differential-limiting force depending on the purposes can be obtained with the friction force to the opposing surface of the casing and the disc plates changeable.

The roller-holding member 96 is originally in contact with the opposing surfaces of each disc plate 3, 4 and the thrust washer 8. As a friction force increases with the increase in a rotation force, the roller-holding member 96 is elastically deformed, whereby the rollers 97 are brought into contact with the opposing surfaces of each disc plate 3, 4 and the thrust washer 8. Thus, the increase gradient of a friction force relative to the rotation force is small. Therefore, characteristics near the line $L_2$ in FIG. 66 can be achieved, making it possible to use as a differential-limiting means with a high friction force at a relatively high rotation force.

The differential-limiting means 90, 95 having such structures are brought into contact with the opposing surface of the differential case 1 and the disc plates 3, 4 depending on a rotation force. In the case of a low rotation force with difference in rotation in the disc plates 3, 4, the rollers 92, 97 are brought into contact with the opposing surface of the differential case 1 and the disc plates 3, 4. However, in the case of a high rotation force at the time of rapid start, etc., constituent parts of the differential-limiting means 90, 95 are elastically deformed depending on a rotation force, whereby the sliding members 93 and the roller-holding member 96 are brought into strong contact with the differential case 1 and the disc plates 3, 4, resulting in increase in a friction force. Thus, stable differential-limiting force can be obtained in a wide range from a low rotation force to a high rotation force.

FIG. 66 shows the change of a friction force depending on a rotation force at different thickness of the sliding members 93 and the roller-holding member 96 and at different diameter of the roller. In FIG. 66, the line $L_1$ encircling the lower left side of a hatched area indicates a case where the thickness of the sliding members 93 or the roller-holding member 96 is smaller than the diameter of the roller, and the line $L_2$ on the upper left side indicates a case where the thickness of the sliding members 93 or the roller-holding member 96 is larger than the diameter of the roller.

In the case of the line $L_1$, the rollers 93, 97 are in contact with the opposing surface of the differential case 1 and the disc plates 3, 4 when the rotation force is zero. As the rotation force increases, the friction force increases from a point A. When the rotation force further increases, constituent parts of the rollers and the differential-limiting means are elastically deformed at a point B, whereby the sliding members 93 or the roller-holding member 96 is brought into contact with each opposing surface of the casing and the disc plates. Thus, the increase gradient of a friction force relative to the rotation force increases from a point B. The differential-limiting means having characteristics of the line $L_1$ can be utilized as a differential-limiting means for relatively low rotation force at a low friction force.

When there is no rotation force despite of the differential friction force given (point C), the sliding members 93 or the roller-holding member 6 is in contact with the opposing surfaces of the casing and the disc plates. On the line $L_2$, the friction force increases as the rotation force increases from a point C. Further increase in the rotation force causes the elastic deformation of the sliding members 93 or the roller-holding member 96 at point D, whereby the rollers are brought into contact with the opposing surfaces of the casing and the disc plates. The increase gradient of the friction force relative to the rotation force becomes small from the point D, thereby preventing galling. Thus, the differential-limiting means having characteristics near the line $L_2$ can be used as a differential-limiting means for a high a friction force at a relatively high rotation force. By changing the difference between the thickness of the sliding members 93 or the roller-holding member 96 and the diameter of the roller, the rotation force and the friction coefficient can be properly set in a range from the line $L_1$ to the line $L_2$.

Figure 67:
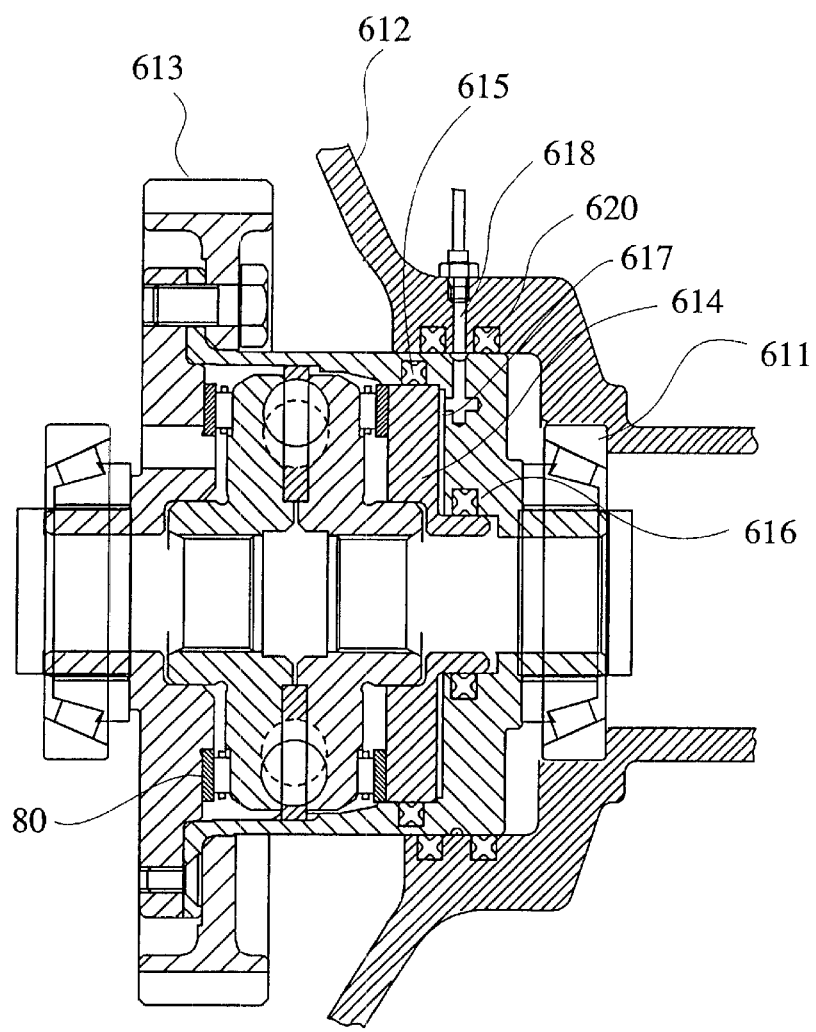
FIG. 67 is a cross-sectional view showing a differential apparatus having a differential-limiting means according to one embodiment of the present invention.

In the differential apparatus in the embodiment shown in FIG. 67, the differential case 1 and the case cover 2 are supported by a trans-axle case 612 via bearings 611, 611. A ring gear 613 fixed to the differential case 1 is meshing with an output gear (not shown) of an automatic transmission (not shown). Therefore, the differential case 1 is rotated by a driving force from the engine. A piston 614 is disposed between a plain washer 80 and the differential case 1, and ring seals 615, 616 each having an X-shaped cross section disposed between the piston 614 and the differential case 1 form a pressure chamber 617. The pressure chamber 617 is connected to a controlling hydraulic system (not shown) via an oil path 618 penetrating the differential case 1 and the trans-axle case 612. Disposed between the differential case 1 and the trans-axle case 612 are ring seals 620, 620 each having an X-shaped cross section.

A hydraulic oil having a pressure changeable depending on the driving conditions of a vehicle is supplied from the controlling hydraulic system to the pressure chamber 617. The oil is pressurized by an oil pump driven by an electric motor or a solenoid, and the oil pressure is controlled by an electronic control unit. The piston 616 moves leftward in FIG. 67 under the oil pressure, whereby the disc plates 3, 4, the balls 6, the needle bearings 70, 70 and the plain washers 80, 80 are pressed to each other between the differential case 1 and the case cover 2. As a result, the overall differential-limiting means functions as an elastic body, resulting in increase in an initial differential-limiting torque. The gap between the casing and the disc plates in an assembled state may be zero or minus by clamping.

In the differential apparatus having such a differential-limiting means, the differential rotation of the drive shaft is restricted by the mechanism described below, when only one drive shaft falls under the conditions that it easily runs idle, such as a case where one of the driving wheels loses a friction force with a road surface. When only one disc plate 3 is driven to rotate from the drive shaft side, namely when only one winding continuous groove 31 is worked to roll balls 6, a reaction force is generated on the winding continuous grooves 31, 41 by contact with the balls 6. The axial component of the reaction force is a thrust force pressing the needle bearings 70, 70 to the plain washers 80, 80, and the thrust force makes it difficult for one disc plate 4 to follow the rotation of the other disc plate 3, thereby limiting the differential rotation of the drive shaft.

Thus, by supplying an oil having a pressure variable depending on the driving conditions of a vehicle to the pressure chamber 617, the controlled differential limitation effects can be obtained. By carrying out control by an electronic control unit depending on a vehicle speed and a difference in differential rotation (difference in the number of rotation between right and left wheels, or difference in the number of rotation between front and rear drive shafts in the case of a center differential), the following differential limitation effects can be obtained.

(1) At the time of rapid, straight acceleration, the oil pressure of the pressure chamber 617 is kept zero until the vehicle speed reaches a certain constant speed, thereby preventing an initial differential-limiting torque from generating. In this case, the distribution of a driving torque is set, for instance, 60–50% for front wheels and 40–50% for rear wheels, to make the slipping of the vehicle less likely, thereby obtaining the maximum acceleration performance.

(2) At the time of high-speed cruising when the vehicle speed has reached a certain constant speed, the oil pressure is gradually increased to obtain a straight stability with the distribution of a driving torque of about 50% for front wheels and about 50% for rear wheels.

(3) When the difference in differential rotation exceeds a predetermined level during the rapid turn or rapid acceleration on a dry road, an oil is supplied to the pressure chamber 617 to increase the oil pressure to a predetermined level, thereby achieving driving along a predetermined course without spinning, drifting, etc. In this case, the distribution of a driving torque is, for instance, 30% for front wheels and 70% for rear wheels at the time of rapid turn or rapid acceleration on a dry road, and 40% for front wheels and 60% for rear wheels at the time of rapid turn or rapid acceleration on a snow-covered road.

(4) When the difference in differential rotation exceeds a predetermined level during the low-speed driving with a large radius of turn on a dry road, an oil is supplied to the pressure chamber 617 to increase the oil pressure to such a predetermined level that the distribution of a driving torque is, for instance, 0% for front wheels and 100% for rear heels, thereby preventing decrease in tight braking. Also, by increasing the initial differential-limiting torque, a torque ratio of right and left wheels or front and rear wheels can be increased.

(5) At the time of declutching for braking, the oil pressure is decreased to zero in response to a signal from a brake pressure sensor, thereby reducing the initial differential-limiting torque to zero to achieve matching with an anti-lock braking system (ABS).

Though the limit of the vehicle speed providing an initial differential-limiting torque and the limit of the initial differential-limiting torque may vary depending on the types of vehicles, it is possible to generate the initial differential-limiting torque, for instance, from a vehicle speed of 20 km/h, and to set the limit of the initial differential-limiting torque to about 5 kg·m.

Figure 68:
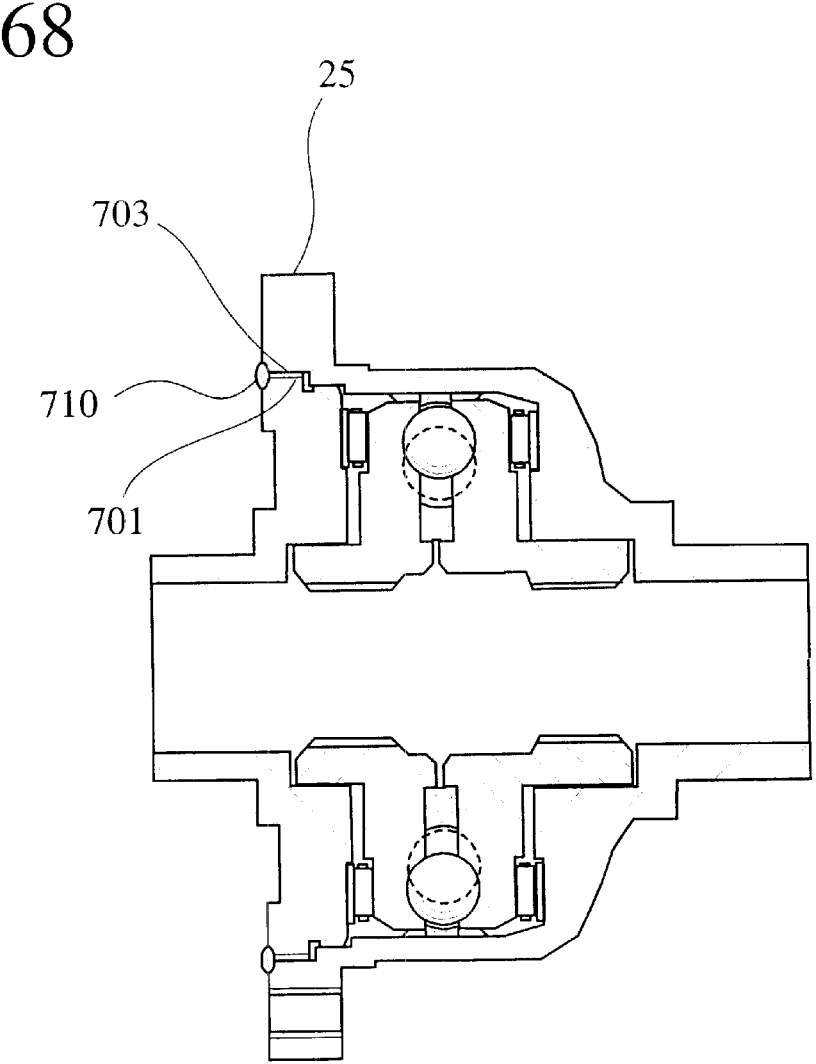
FIG. 68 is a cross-sectional view showing a differential apparatus in which a screwing engagement portion of a differential case and a case cover is welded.

In the embodiment shown in FIG. 68, the differential case 1 has a female screw portion 701 on an open end, and the case cover 2 has a male screw portion 703 screwed to the female screw portion 701. With respect to the other structures, the differential case 1 and the case cover 2 are the same as those shown in FIG. 1. A screwing engagement portion 710 of the female screw portion 701 and the male screw portion 703 is welded at several points or in the entire length, to prevent the differential case 1 and the case cover 2 from loosening during the operation. With a thick flange of the differential case 1, and with the differential case 1 screwed to the case cover 2, both of the differential case 1 and the case cover 2 are provided with improved rigidity. Also, while screwing the female screw portion 701 of the differential case 1 to the male screw portion 703 of the case cover 2, the disc plates 3, 4 can be pressed to each other under a redetermined clamping torque to exert an initial differential-limiting torque.

Figure 69:
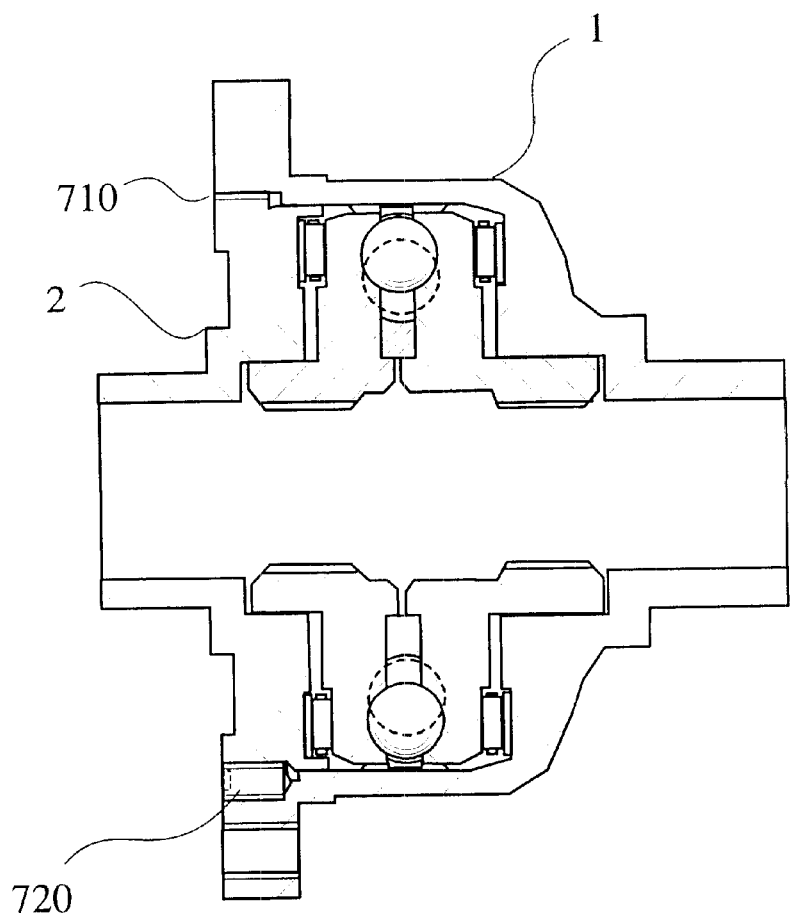
FIG. 69 is a cross-sectional view showing a differential apparatus in which a screwing engagement portion of a differential case and a case cover is fixed by small screws.

In the embodiment shown in FIG. 69, the screwing engagement portion 710 of the differential case 1 and the case cover 2 are fixed by several small screws 720 to prevent the differential case 1 and the case cover 2 from loosening during the operation.

In any case, the clamping torque under screwed condition is in a linear relation with the initial differential-limiting torque in a state where the differential case 1 and the case cover 2 have improved rigidity. Also, even when screwed or clamped after disassembling, the clamping torque is in a linear relation with the initial differential-limiting torque.

Figure 71:
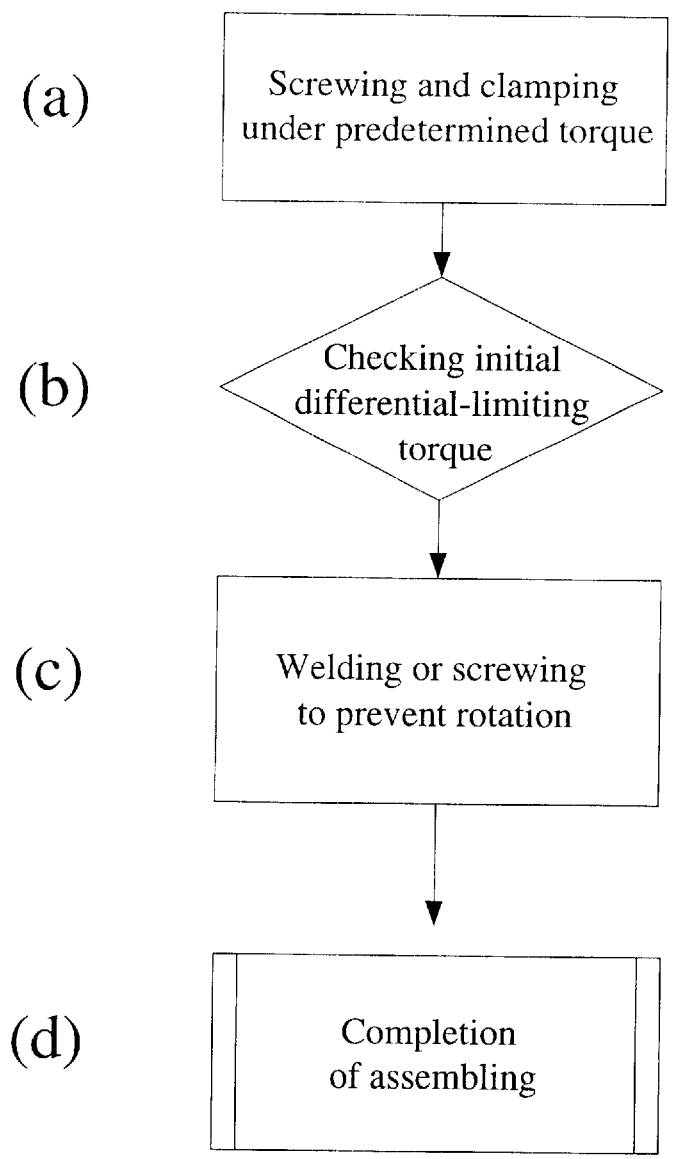
FIGS. 71*a–d* is a flowchart showing steps from the screwing engagement of a female screw portion of a differential case and a male screw portion of a case cover at a predetermined torque to the completion of assembling.
Figure 72:
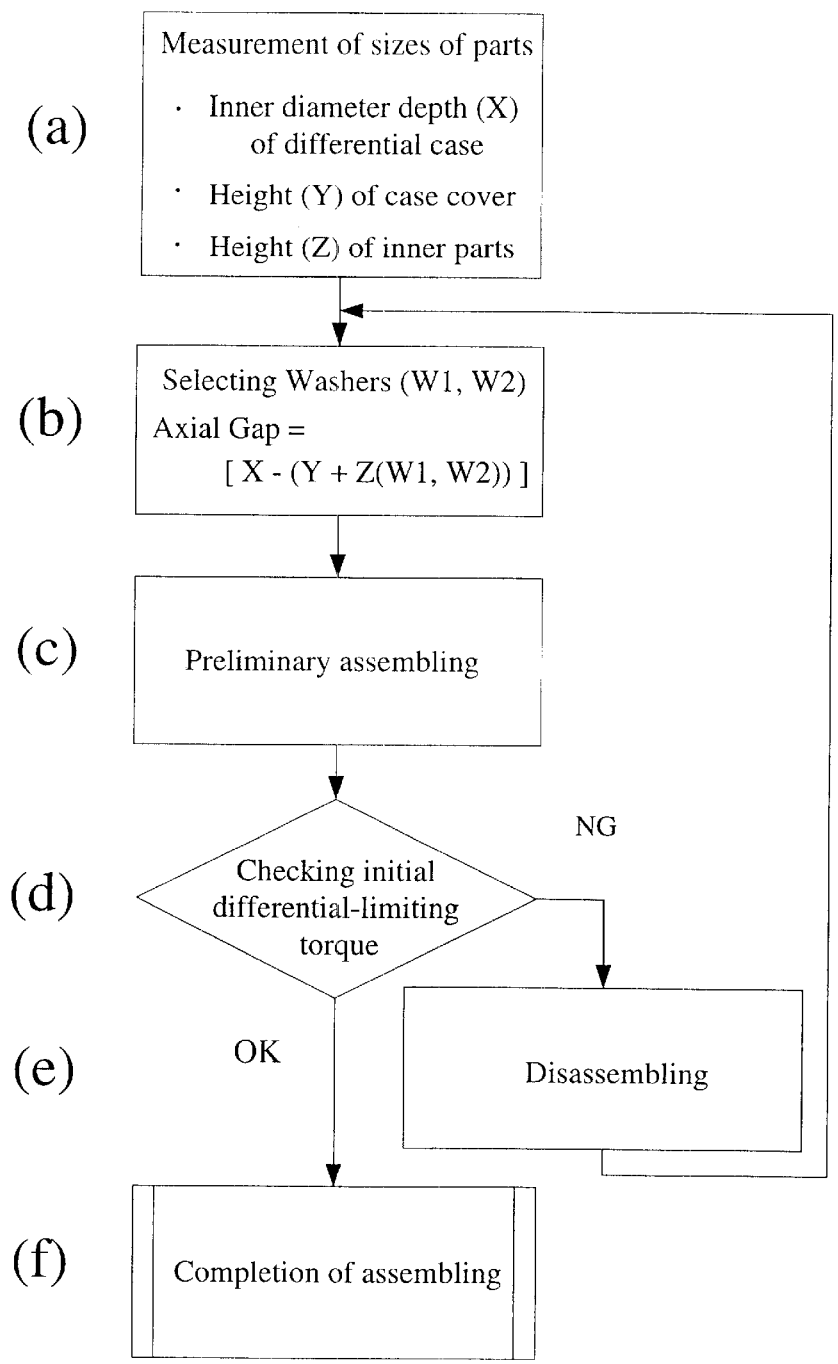
FIGS. 72*a–f* is a flowchart showing the steps of setting an initial differential-limiting torque in the conventional differential apparatus.

In any case, the assembling of the differential case 1 and the case cover 2 is completed by the steps of (a) screwing and clamping under a predetermined torque, (b) checking an initial differential-limiting torque, and (c) welding to prevent rotation, as shown in FIG. 71. Thus, the adjusting of the initial differential-limiting torque is simplified.

As an example, a differential case 1 of 120 mm in outer diameter and 110 mm in inner diameter having a flange of 160 mm in outer diameter and 20 m in thickness was produced from spheroidal graphite cast iron corresponding to FCD 600 (JIS), and provided with 10 threaded holes of M10. It had a female screw portion 701 of 10 mm in depth. The inner wall of the differential case 1 was provided with engaging portions with the large-radius portions of the ball holder 5, and the engaging portions were subjected to a heat treatment comprising high-frequency hardening and tempering.

The case cover 2 was a product of spheroidal graphite cast iron corresponding to FCD 600 (JIS), having an outer diameter of 110 h7 (size tolerance +0/−0.035) mm with a male screw portion 703 of 10 mm in depth and 20 mm in thickness t. The differential case 1 was screwed to the case cover 2 with the female screw portion 701 and the male screw portion 703.

Each diameter 1a, 2a of the differential case 1 and the case cover 2 was 45 mm, and each inner diameter of the disc plates 3 was 45 mm. A ball holder 5 having a thickness of 8 mm was disposed between a pair of disc plates 3, 4 to rotatably hold balls 6 each having a diameter of 16 mm.

Disposed between the disc plates 3, 4 and the case cover 2 were thrust washers 7, 7 each having an outer diameter of 100 mm, an inner diameter of 75 mm and a thickness of 2 mm, and needle bearings 8, 8 each having an outer diameter of 100 mm, an inner diameter of 75 mm and a thickness of 4 mm.

After assembling the disc plates 3, 4, the ball holder 5, the balls 6, a pair of thrust washers 7, 7, and a pair of needle bearings 8, 8 into the differential case 1 and the case cover 2, the male screw portion 703 were screwed to the female screw portion 701 to assemble a differential apparatus under various levels of clamping torque of 50, 100, 150 and 200 N·m by a torque wrench. The initial differential-limiting torque of the thus assembled differential apparatus was measured by a torque detector. After the differential apparatus was disassembled, the male screw portion 703 were screwed to the female screw portion 701 to reassemble the differential apparatus under various levels of clamping torque of 50, 100, 150 and 200 N·m by a torque wrench. The initial differential-limiting torque of the thus assembled differential apparatus was measured again.

Figure 70:
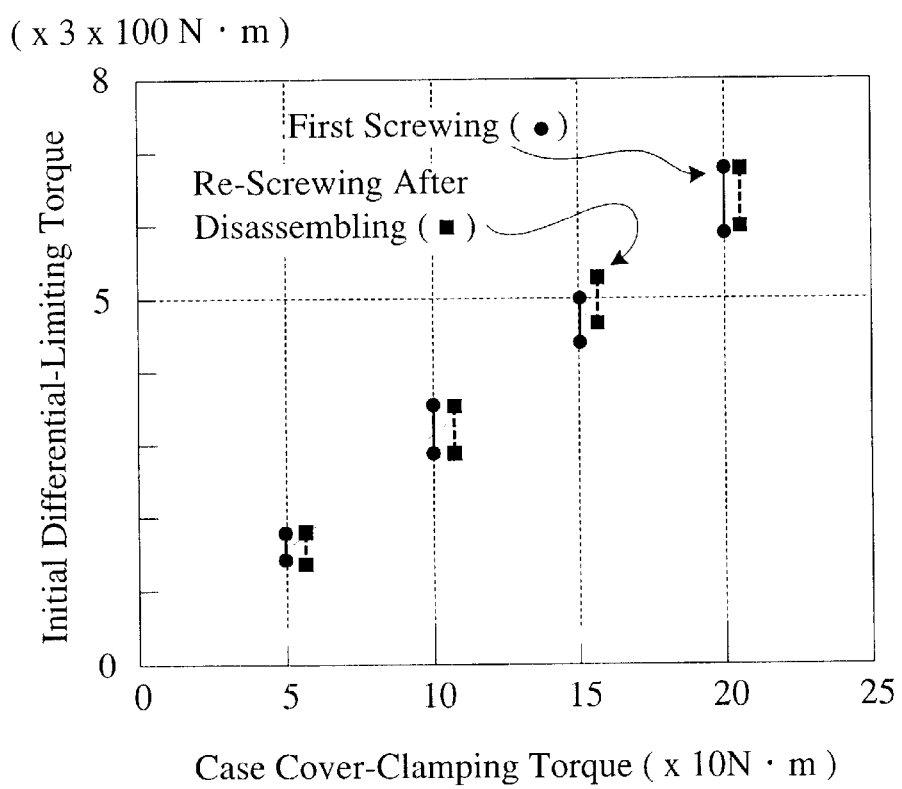
FIG. 70 is a graph showing the relation between a case cover-clamping torque and an initial differential-limiting torque.

FIG. 70 shows the relation between a case cover-clamping torque and an initial differential-limiting torque at the time of the first screwing and re-screwing, respectively. The measurement of the differential apparatus was carried out in both cases. It is clear from FIG. 70 that the case cover-clamping torque is in a linear relation with the initial differential-limiting torque, and that the clamping torque at the time of screwing can surely achieve the desired initial differential-limiting torque. It is also clear that the relation between the clamping torque and the initial differential-limiting torque is constant in both cases of the first screwing and the re-screwing.

The present invention will be described in further detail referring to the following Examples without intention of limiting the present invention thereto.

EXAMPLE 1

Comparative Example 1

With the differential apparatus shown in FIGS. 1–3, a lubrication durability test was carried out. Each steel ball made of JIS SUJ2 had a diameter of 16.00 mm, and a steel-made ball holder 5 having 10 guide holes 51 was 90 mm in diameter and 6 mm in thickness. Each guide hole 51 had a width of 16.0 mm. The disc plates 3, 4, the ball holder 5 and the balls 6 were subjected to a chemical treatment by immersion in a chemical treatment bath containing a phosphate chemical treatment agent (tradename: Ferrycoat 7, available from Japan Parkerizing, Co., Ltd.) at 80° C. for 10 minutes. The chemical treatment coating layer formed on each part had an average thickness of 5 μm.

Each part formed with the chemical treatment coating layer was assembled to a differential apparatus of EXAMPLE 1, and the same differential apparatus as in EXAMPLE 1 except for forming no chemical treatment coating layer was identified as COMPARATIVE EXAMPLE 1. Operation tests were conducted under the following conditions:

Lubricating oil: SAE 75W90 GL-4,

Input rotation torque: 30 kg-m,

Rotation speed of ball holder 5: 500 rpm,

Difference in rotation speed between disc plates 3, 4: 800 rpm, and

Test time: 2 hours.

After the completion of the operation test, both differential apparatuses were disassembled to observe the existence of mar. As a result, there was no mar at all on the inner surfaces of the ball holder 5 and the guide holes 51 in EXAMPLE 1. On the other hand, galling was observed on the inner surfaces of the guide holes 51 in COMPARATIVE EXAMPLE 1.

EXAMPLE 2

The inner surfaces of the guide holes 51 of the ball holder 5, the surfaces of the balls 6, and the surfaces of the guide grooves 31, 41 of the disc plates 3, 4, which were formed with a chemical treatment coating layer as in EXAMPLE 1. were sprayed with a solid lubricant treatment solution of a molybdenum disulfide-containing, resin-based coating composition (tradename: HMB-2, available from Japan Parkerizing, Co., Ltd.) diluted with an organic solvent, dried at room temperature, and then baked at 200° C. for 60 minutes to form a solid lubricating layer. The solid lubricating layer formed on the chemical treatment coating layer of the guide holes 51 had an average thickness of 10 μm, and the solid lubricating layer formed on the chemical treatment coating layer of the ball 6 had an average thickness of 5 μm. Also, the solid lubricating layer formed on the chemical treatment coating layer on the guide grooves 31, 41 of the disc plates 3, 4 had an average thickness of 10 μm.

Each part formed with the solid lubricating layer was assembled to a differential apparatus to carry out an operation test under the same conditions as in EXAMPLE 1. After the completion of the operation test, the differential apparatus was disassembled to observe the existence of mar. As a result, there was no mar at all, though slight peeling took place in the solid lubricating layer on the inner surfaces of the guide holes 51 of the ball holder 5.

EXAMPLES 3, 4

With the rolling-forming apparatus shown in FIG. 41, a winding continuous groove of a disc plate for a differential apparatus was worked. A disc plate die 401 used was made of alloyed tool steel (JIS SKS3) having a hardness of HRC 60. Rolling-forming balls 9 each having a diameter of 16.00 mm were made of high-carbon chromium bearing steel (JIS SUJ3) having a hardness of HRC 62 or more. The ball holder 5 having a diameter of 44 mm and a thickness of 5.5 mm was made of chromium-vanadium steel (JIS SUP10) having a hardness of HRB 400.

First, the disc plate precursor 402 was cut to form a winding continuous groove 421 having a U-shaped cross section, such that a rolling-forming margin was about 0.1 mm (EXAMPLE 3), and 0.2 mm (EXAMPLE 4), respectively. Incidentally, portions not contributing to the transmission of force may be provided with recesses or notches. The primarily worked disc plate precursor 402 was assembled as shown in FIG. 41, disposed in a metal case and then set in a rolling-forming apparatus. Incidentally, two rolling-forming balls 9 were used. Next, the ball holder was rotated by one turn by a torque wrench to perform rolling-forming. The conditions of the rolling-forming are shown in Table 2. The worked disc plate precursor 402 was measured with respect to the following items. The measurement results are also shown in Table 2.

(1) Error in Width of Winding Continuous Groove 421

The maximum width of the winding continuous groove was measured by a cylinder gauge to determine the maximum error from the designed value.

(2) Error in Three-dimensional Position of Winding Continuous Groove 421

The three-dimensional position of the winding continuous groove 421 was measured by a three-dimensional size measurement apparatus to determine the maximum error from the designed value.

(3) Error in Cross Section R of Winding Continuous Groove 421

The radius R of an arcuate cross section of the winding continuous groove 421 was measured by a three-dimensional size measurement apparatus to determine an error from the designed value of 16.00 mm.

(4) Surface Roughness Rz

The surface roughness Rz of a force-transmitting, concaved wall of the winding continuous groove 421 was measured by a roughness measurement apparatus.

TABLE 2

| Measurement Items | EXAMPLE 3 | EXAMPLE 4 |
|---|---|---|
| Rolling-Forming Margin (mm) | 0.1 | 0.2 |
| Initial Torque of First Rolling-Forming (kg-m) | 80 | 90 |
| Torque of First Rolling-Forming (kg-m) | 70 | 75 |
| Initial Torque of Second Rolling-Forming (kg-m) | 65 | 70 |
| Torque During Second Rolling-Forming (kg-m) | 60 | 60 |
| Maximum Error of Winding Continuous Groove Width (mm) | 0.05 | 0.06 |
| Position Error of Winding Continuous Groove (mm) | 0.05 | 0.06 |
| Error in Cross Section R of Winding Continuous Groove (mm) | 0.02 | 0.03 |
| Surface Roughness Rz (μm) | 5 | 7 |

As shown in Table 2, the force-transmitting portions of the winding continuous groove in EXAMPLES 3 and 4 had rolling-formed surfaces having a shape error of 100 μm or less and a surface roughness Rz of 30 μm or less. By assembling these disc plates to a differential apparatus, it is possible to achieve stable torque transmission.

EXAMPLES 5, 6

The disc plate precursor 402 was worked in the same manner as in EXAMPLE 3 except for using rolling-forming balls 9 each having a diameter of 16.10 mm. The worked disc plate precursor 402 was measured with respect to errors in width and position of the winding continuous groove 421, and error in cross section R and surface roughness of the concaved wall of the winding continuous groove 421 in the same manner as in EXAMPLE 3. The results are shown in Table 3.

TABLE 3

| Measurement Items | EXAMPLE 5 | EXAMPLE 6 |
|---|---|---|
| Rolling-Forming Margin (mm) | 0.1 | 0.2 |
| Initial Torque of First Rolling-Forming (kg-m) | 85 | 95 |
| Torque During First Rolling-Forming (kg-m) | 75 | 80 |
| Initial Torque of Second Rolling-Forming (kg-m) | 70 | 75 |
| Torque During Second Rolling-forming (kg-m) | 65 | 70 |
| Winding Continuous Groove | | |
| Maximum Error of Width (mm) | 0.04 | 0.05 |
| Position Error (mm) | 0.05 | 0.05 |
| Error in Cross Section R (mm) | 0.015 | 0.02 |
| Surface Roughness Rz ($\mu$m) | 6 | 6 |

As shown in Table 3, the force-transmitting portions of the winding continuous grooves in EXAMPLES 5 and 6 had rolling-formed surfaces having a shape error of 100 $\mu$m or less and a surface roughness Rz of 30 $\mu$m or less. By assembling these disc plates to a differential apparatus, it is possible to achieve stable torque transmission.

EXAMPLES 7, 8

With respect to a ball holder 5 (diameter: 44 mm, thickness: 5.5 mm, made of JIS SUP10, hardness HRB: 89.4) having 10 guide holes (width: 16.0 mm), curved surface portions were formed on the inner walls of the guide holes 51 by a rolling-forming method using rolling-forming discs 501, 502 (made of JIS SUJ2, hardness HRC: 60) and rolling-fortning balls 9 (diameter: 16.00 mm, made of JIS SUJ2, hardness HRC: 63–67) shown in FIGS. 46 and 47.

First, the ball holder 5 was cut to form guide holes 51 such that one plastic deformation margin was 0.1 mm (width of guide holes: 15.8 mm, EXAMPLE 7) and 0.2 mm (width of guide holes: 15.6 mm, EXAMPLE 8), respectively. Five rolling-forming balls 9 (diameter: 16.00 mm, made of JIS SUJ2, hardness HRC: 63–67) were charged into circular aperture portions 51a of the guide holes 51 of the primarily worked ball holder 5, and set in a rolling-forming apparatus. By reciprocally rotating the rotatable disc 2 by a torque wrench, the first rolling-forming operation was conducted. Next, additional five rolling-forming balls 9 were charged into the remaining guide holes 51 such that 10 rolling-forming balls 9 were used in total, and the rotatable disc 2 was reciprocally rotated to carry out the second rolling-forming operation. Torque in each reciprocal rotation was recorded and shown in Table 4. With respect to the rolling-formed ball holder 5, the following measurements were carried out. The measurement results are shown in Table 4.

(1) Error in Width of Guide Holes 51

The maximum width of the guide holes 51 was measured by a cylinder gauge to determine the maximum error from the designed value of 16.00 mm.

(2) Error in Three-dimensional Position of Guide Holes 51

The three-dimensional position of the concaved wall of the guide holes 51 was measured by a three-dimensional size measurement apparatus to determine the maximum error from the designed value.

(3) Error in Cross Section R of Guide Holes 51

The radius R of an arcuate cross section of the guide holes 51 was measured by a three-dimensional size measurement apparatus to determine an error from the radius of the rolling-forming ball 9.

(4) Surface Roughness

The surface roughness of the concaved walls of the guide holes 51 was measured by a surface roughness measurement apparatus.

TABLE 4

| Measurement Items | EXAMPLE 7 | EXAMPLE 8 |
|---|---|---|
| Plastic Deformation Margin (mm) | 0.1 | 0.2 |
| Torque During First Rolling-Forming (kg-m) | | |
| Forward (5 balls) | 15 | 25 |
| Backward (5 balls) | 5 | 5 |
| Torque During Second Rolling-Forming (kg-m) | | |
| Forward (10 balls) | 20 | 30 |
| Backward (10 balls) | 5 | 7–10 |
| Dimension of Guide Holes | | |
| Error in Width (mm) | 0.01 | 0.03 |
| Error in Position (mm) | $\phi$0.01 | $\phi$0.03 |
| Error in Cross Section R (mm) | $\leq$0.005 | 0.01–0.015 |
| Surface Roughness Ry ($\mu$m) | 0.29–0.76 | 0.25–0.38 |

EXAMPLES 9, 10

The rolling-forming of the ball holder 5 was carried out in the same manner as in EXAMPLE 7, using rolling-forming balls 9 (diameter: 16.10 mm, hardness HRC: 63–67, made of JIS SUJ2) and rolling-forming discs 501, 502 shown in FIGS. 46 and 47. The plastic deformation margin of the guide holes 51 on one side was 0.2 mm (width of guide holes 51: 15.6 mm, EXAMPLE 9) and 0.3 mm (width of guide holes 51: 15.4 mm, EXAMPLE 10), respectively. Ten rolling-forming balls 9 were charged into circular aperture portions 51a of the guide holes 51 of the ball holder 5, and set in a rolling-forming apparatus. By reciprocally rotating the rotatable disc 2 by a torque wrench, the rolling-forming operation was conducted to record the torque in reciprocal rotation. With respect to the rolling-formed ball holder, errors in width of guide holes 51, errors in three-dimensional position of concaved walls of the guide holes 51, and errors in cross section R and surface roughness of the guide holes 51 were measured in the same manner as in EXAMPLE 1. The results are shown in Table 5.

TABLE 5

| Measurement Items | EXAMPLE 9 | EXAMPLE 10 |
|---|---|---|
| Plastic Deformation Margin (mm) | 0.2 | 0.3 |
| Torque During Second Rolling-Forming (kg-m) | | |
| Forward (10 balls) | 94 | 249 |
| Backward (10 balls) | 12–18 | 15–20 |
| Dimension of Guide Holes | | |
| Error in Width (mm) | 0.01 | 0.01 |
| Error in Position (mm) | $\phi$0.025 | $\phi$0.03 |
| Error in Cross Section R (mm) | 0.05–0.1 | 0.05–0.1 |
| Surface Roughness Ry ($\mu$m) | 2.0 | 0.6 |

EXAMPLES 11

A ball holder 5 was rolling-formed in the same manner as in EXAMPLE 7 using rolling-forming balls 9 having a diameter of 16.00 mm and 16.10 mm, respectively, and a rolling-forming disc shown in FIGS. 46 and 47. The plastic deformation margin of the guide holes 51 on one side was 0.4 mm (width of guide holes: 15.2 mm). Five rolling-forming balls 9 were charged into the circular aperture portion 51a of the guide holes 51 of the primarily worked ball holder 5, and set in a rolling-forming apparatus. By reciprocally rotating the rotatable disc 2 by a torque wrench, the first rolling-forming operation was conducted. Next, five rolling-forming balls 9 were transferred to the remaining guide holes 51, and the rotatable disc 2 was reciprocally rotated to carry out the second rolling-forming operation. Further, ten rolling-forming balls 9 of 16.00 mm in diameter were charged into all the guide holes 51 to carry out the third rolling-forming operation. Finally, ten rolling-forming balls 9 of 16.10 mm in diameter were charged into all the guide holes 51 to carry out the fourth rolling-forming operation. The plastic deformation margin in each reciprocal rotation was 0.4 mm in any rolling-forming operation. Torque in each reciprocal rotation was recorded. With respect to the rolling-formed ball holder 5, errors in width of guide holes, errors in three-dimensional position of the concaved walls of the guide holes, and error in cross section R and surface roughness of the guide holes 51 were measured in the same manner as in EXAMPLE 7. The results are shown in Table 6.

TABLE 6

| Measurement Items | EXAMPLE 11 |
| --- | --- |
| Torque in Forward Rotation | |
| Torque During First Rolling-Forming (kg-m) | 30 |
| Torque During Second Rolling-Forming (kg-m) | 30 |
| Torque During Third Rolling-Forming (kg-m) | 40 |
| Torque During Fourth Rolling-Forming (kg-m) | 55 |
| Dimension of Guide Holes | |
| Error in Width (mm) | 0.02 |
| Error in Position (mm) | φ0.02 |
| Error in Cross Section R (mm) | 0.05–0.1 |
| Surface Roughness Ry ($\mu$m) | 0.3 |

EXAMPLES 12

Figure 64:
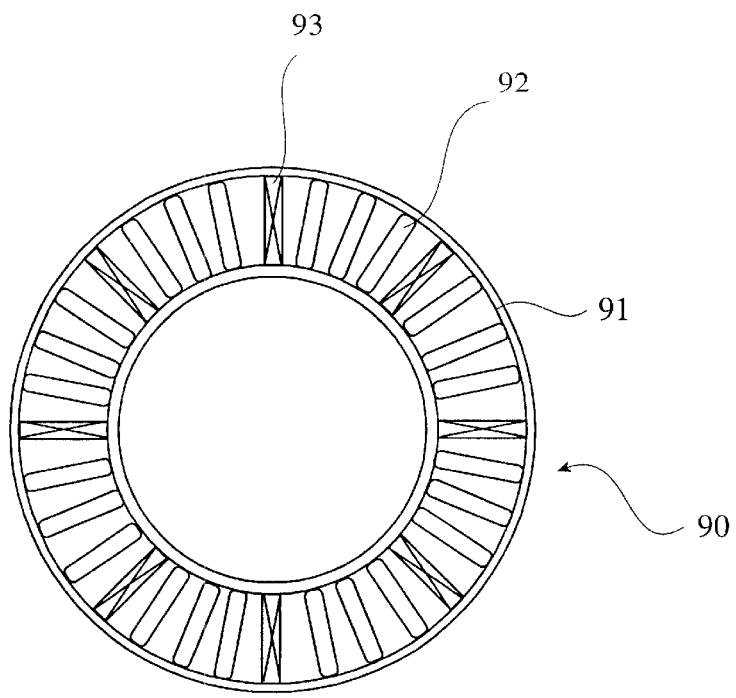
FIG. 64 shows a differential-limiting means comprising rollers and sliding members, (a) being a plan view, and (b) being a partial, cross-sectional view.
Figure 64:
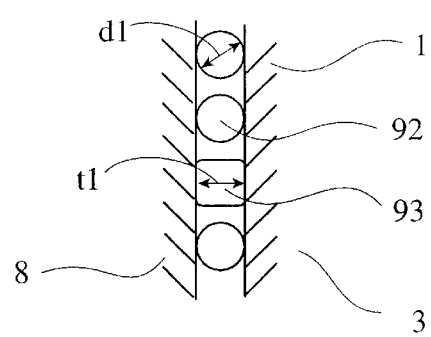

The differential case 1 and the case cover 2 shown in FIGS. 62 and 64 were made of spheroidal graphite cast iron of (JIS) FCD 400. The disc plate 3 had an outer diameter of 80 mm, and the effective diameter of the winding continuous groove 31 was 70 mm in the largest diameter and 50 mm in the smallest diameter. The ball had a diameter of 14 mm. A differential-limiting means comprising rollers 92 (diameter: 3.2 mm, length: 8 mm) and sliding members 93 (width: 3.190 mm, length: 8 mm) was disposed between the differential case 1 and the case cover 2 and the opposing surface of the disc plate 3. The total number of the rollers 92 and the sliding members 93 was 52. With various numbers of the sliding members 93, a friction coefficient synthesized from the rollers 92 and the sliding members 93 was measured. The results are shown in Table 7.

TABLE 7

| No. | Number of Rollers | Number of Sliding Members | Friction Coefficient ($\mu$) |
| --- | --- | --- | --- |
| 1 | 52 | 0 | 0.01 |
| 2 | 46 | 6 | 0.02 |
| 3 | 40 | 12 | 0.04 |
| 4 | 28 | 24 | 0.07 |

It is clear from Table 7 that the friction coefficient synthesized from the rollers 92 and the sliding members 93 disposed therebetween can be changed by the number of the sliding members 93 to select a proper one for a differential-limiting means. With the sliding members 93 adjusted to have a thickness equal to or near the roller diameter −50 $\mu$m to 0 $\mu$m, mostly the rollers 92 are brought into contact with the opposing surface of the casing and the disc plates at a low rotation force, when the disc plates generate difference in rotation. Also, the rollers 92 and other constituent parts of the differential-limiting means are elastically deformed depending on the rotation force at a high rotation force at the time of rapid start, etc., whereby the sliding members 93 are largely brought into contact with the casing and the disc plates. As a result, a friction force increases, resulting in a large differential-limiting force at a high rotation force.

Applicability in Industry

The differential apparatus of the present invention having the above structure has the following advantages.

(1) A high contact stress partially generated between the winding continuous groove of the disc plate and power-transmitting members is reduced, thereby providing the differential apparatus with extremely improved durability and stabilizing a differential-limiting torque generated, for instance, when a pair of driving wheels are running idle.

(2) Because the winding continuous groove of the disc plate is provided with a plastically worked surface with chamfered edges, it suffers from less wear by contact with balls and is prevented from cracking due to the concentration of stress, thereby having improved durability and improved stability of torque transmission. Also, by forming the disc plates by forging and plastic working, the winding continuous groove can be formed on the disc plates at a low cost.

(3) By forming curved chamfered portions on the edges of the winding continuous groove of the disc plate, the winding continuous groove is provided with reduced wear by contact with balls and prevented from cracking and pitting at edges thereof, thereby improving the durability and stability of torque transmission.

(4) By providing a bottom of the winding continuous groove of the disc plate with a small groove, a cutting speed of a ball end mill at a tip end thereof does not become zero during rough- or finish-working. Cutting resistance undergoes less change, thereby being close to an ideal locus of the winding continuous groove, bringing the balls into contact with the winding continuous groove. As a result, differential limitation effects can be obtained for a long period of time. Further, the small groove functions as a path for a lubricating oil while the balls are in contact with the winding continuous groove, thereby improving the durability of the differential apparatus.

(5) Because the winding continuous groove formed by a rolling-forming method is excellent in shape precision and surface roughness, torque can be stably transmitted. Also, the winding continuous groove can be produced by the rolling-forming method at a low cost.

(6) The apparatus for producing a ball holder for the differential apparatus of the present invention has a structure comprising rolling-forming balls, and a pair of rolling-forming discs each having a guide groove for limiting the movement of the rolling-forming balls, the relatively rotation of the rolling-forming disc forcing the rolling-forming balls disposed in the guide holes of the ball holder to move along the inner walls of the guide holes by the function of the guide groove, thereby rolling-forming the curved surface portions on the inner walls. Therefore, the apparatus having a simple structure can perform the rolling-forming of the guide holes of the ball holder, reducing the production cost of the differential apparatus while improving the surface roughness of the curved surface portions.

(7) Because a chemical treatment coating layer or a combination of a chemical treatment coating layer and a solid lubricating layer is formed on the surfaces of members subjected to large wear, and because operation is performed while being wetted by a lubricating oil, the differential apparatus is excellent in lubrication, wear resistance, galling resistance and initial fitting, thereby extremely reducing the damage during the running-off period. As a result, the differential apparatus has extremely improved durability.

(8) The ball holder is provided with large-radius portions outside the guide holes, the periphery portions of the ball holder between the large-radius portions being at least partially constituted by small-radius portions integral with the large-radius portions. Because the integral rotation of the casing and the ball holder is achieved by causing the large-radius portions of the ball holder to engage the recesses of the casing, a large torque transmission is obtained even though there is limitation in the size of the casing. This is applicable to various differential apparatuses for different types of vehicles with different torque transmission.

By providing projections having substantially the same diameter as that of the large-radius portions on both sides of the large-radius portions of the ball holder, and by causing the large-radius portions and the projections to engage the casing, portions of the ball holder between the torque transmission portions and the guide holes can be made thick, thereby ensuring the rolling of balls while preventing deformation even if there is a large torque transmission. Also, when the differential apparatus has such a structure that the large-radius portions of the ball holder are loosely inserted into the recesses of the casing, the ball holder and the casing need not have extremely high precision. Further, by providing the engaging portions of the casing with a hardness Hv of 400 or more from surface to a depth up to 1 mm, the casing is provided with improved wear resistance and strength. By subjecting the engaging portions to a heat treatment comprising high-frequency hardening and tempering, the casing is prevented from being deformed, thereby adequately receiving the disc plates, the ball holder and the balls.

(9) By carrying out assembly with a negative gap in an axial direction between the casing and the disc plates disposed inside the casing, an initial differential-limiting force can be surely set. Also, by disposing washers and roll bearings on the outer surfaces of the disc plates, constituent parts are prevented from being worn, thereby stably keeping the differential-limiting force.

(10) By selecting the size in an axial direction of the sliding members or the roller-holding member relative to the roller diameter, a wide range of friction coefficient can be generated, thereby achieving the objected differential limitation. Also, a sliding friction is suppressed on rollers generating high Hertz stress, thereby improving the durability of the differential-limiting means. When the differential-limiting means is constituted by rollers and sliding members, a friction force can be changed depending on a rotation force with varied difference in size in an axial direction between the rollers and the sliding members, thereby properly limiting the differential rotation. Also, when the differential-limiting means is constituted by rollers and a roller-holding member, the same effects can be obtained by changing the difference in size in an axial direction between the rollers and the roller-holding member.

(11) Stable differential limitation can be set under any driving conditions of vehicles, such as linear rapid acceleration, high-speed cruising, rapid turning or rapid acceleration on a dry road, rapid turning or rapid acceleration on a snow-covered road, low-speed turning at a large radius of rotation on a dry road, clutching under braking, etc. Further, the differential apparatus can be made extremely small.

(12) Calmness is ensured with small pulsation, thereby improving the durability. The engaging portions of the differential case and the ball holder are formed easily at a high precision, contributing to miniaturization of the differential apparatus.

(13) The differential case and the case cover have further improved rigidity as a casing, ensuring stable differential limitation. Also, the differential apparatus is provided with improved durability, and an initial differential-limiting torque can be obtained surely and easily by a clamping torque at the time of fixing the case cover to the differential case by screws. Thus, the differential apparatus can be assembled by simple steps.

What is claimed is:

1. A differential apparatus comprising (a) a casing rotated by a driving force from outside; (b) a pair of opposing disc plates coaxially disposed in said casing, an opposing surface of each disc plate being formed with a circumferentially continuous groove winding such that a radial position changes at a constant period; (c) a plurality of balls rolling in opposing winding continuous grooves of both disc plates; and (d) a ball holder rotating integrally with said casing and having a plurality of radially extending guide holes, each guide hole movably receiving each ball, wherein said winding continuous groove of each disc plate circumferentially continuously has first guide regions each extending from a radially outer position to a radially inner position of each disc plate and second guide regions each extending from a radially inner position to a radially outer position, inflected regions each connecting said first guide region and said second guide region being larger in width and/or depth than said first guide regions and said second guide regions, whereby a contact stress between said balls and said winding continuous groove is decreased in said inflected regions.

2. The differential apparatus according to claim 1, wherein said winding continuous groove has third guide regions for keeping said balls in a predetermined range of said guide holes of said ball holder, inflected regions each connecting each first guide region, each second guide region and each third guide region being larger in width and/or depth than said first guide regions, said second guide regions and said third guide regions, whereby a contact stress between said balls and said winding continuous groove is decreased in said inflected regions.

3. The differential apparatus according to claim 1, wherein said winding continuous groove is constituted by a plurality of circumferentially continuous unit regions, each unit region being constituted by a first guide region extending to cause balls to move from a radially outer position to a radially inner position of the disc plate, a second guide region extending to cause balls to move from a radially inner position to a radially outer position of the disc plate, and a third guide region keeping balls at a constant radial position of said disc plate, and said inflected region being a curved boundary region existing between said first guide region and said second guide region, between said second guide region and said third guide region, between said third guide region and said second guide region, and between said second guide region and said first guide region.

4. The differential apparatus according to claim 3, wherein any of said first guide regions, said second guide regions and said third guide regions is linear or in the shape of an involute or arcuate curve having a large radius of curvature except for said boundary regions at ends.

5. The differential apparatus according to claim 1, wherein said ball holder disposed between a pair of said disc plates engages said casing and has radially elongated guide holes for holding balls circumferentially at an equal interval, the radial length of each guide hole corresponding to the radial movement range of said ball.

6. The differential apparatus according to claim 1, wherein said inflected region is larger than the other regions by 0.1–1% in width and/or depth.

7. The differential apparatus according to claim 1, wherein a differential-limiting means is disposed between the outside surface of each disc plate and the inner wall of said casing, and wherein when a torque applied to one disc plate decreases, a friction force is generated between the outside surface of said disc plate and said torque-transmitting means by a thrust force generated by contact of said balls with said winding continuous groove, thereby generating a differential-limiting torque.

8. The differential apparatus according to claim 7, wherein said differential-limiting means is a thrust washer or a needle bearing.

9. The differential apparatus according to claim 1, wherein the edges of said winding continuous groove are chamfered.

10. The differential apparatus according to claim 9, wherein said chamfered portion has a curved surface.

11. The differential apparatus according to claim 1, wherein at least inner walls of said guide holes of said ball holder are formed with (a) a chemical treatment coating layer, or (b) said chemical treatment coating layer and a solid lubricating layer based on molybdenum disulfide in this order from below, wherein said chemical treatment coating layer is formed by treatment with a phosphate chemical treatment agent.

12. The method for producing a differential apparatus according to claim 11, wherein said solid lubricating layer is formed by applying a coating composition based on molybdenum disulfide, followed by a drying or baking treatment under the conditions of room temperature to 300° C. for 5–60 minutes.

13. The differential apparatus according to claim 11, wherein the surfaces of said balls and the groove surfaces of said disc plates are formed with (a) a chemical treatment coating layer, or (b) said chemical treatment coating layer and a solid lubricating layer based on molybdenum disulfide in this order from below.

14. The differential apparatus according to claim 11, wherein said chemical treatment coating layer is as thick as 1–100 μm, and said solid lubricating layer is as thick as 1–50 μm.

15. The differential apparatus according to claim 1, wherein said ball holder is an integral member having large-radius portions outside said guide holes and small-radius portions at least partially existing between said large-radius portions, the engagement of said large-radius portions of said ball holder with the recesses of said casing causing said casing and said ball holder to rotate together.

16. The differential apparatus according to claim 15, wherein said large-radius portions of said ball holder are freely inserted into said recesses of said casing.

17. The differential apparatus according to claim 15, wherein portions of said casing engaging said ball holder have hardness Hv of 400 or more from surface to a depth of up to 1 mm.

18. The differential apparatus according to claim 17, wherein the engaging portions of said casing are subjected to a heat treatment comprising high-frequency hardening and tempering.

19. The differential apparatus according to claim 15, wherein said casing is made of spheroidal graphite cast iron, and the portions of said casing engaging said ball holder have hardness Hv of 500 or more from surface to a depth of up to 1 mm.

20. The differential apparatus according to claim 1, wherein said ball holder is fixed to said casing such that said ball holder is rotated integrally with said casing, by causing engaging members implanted in radial through-holes of said casing to engage recesses formed on an outer periphery of said ball holder.

21. The differential apparatus according to claim 20, wherein said engaging members are implanted in said casing from inside.

22. The differential apparatus according to claim 20, wherein side surfaces of said engaging members have flat surfaces extending in an axial direction of said casing, said flat surfaces being engageable with the recesses of said ball holder.

23. The differential apparatus according to claim 20, wherein side surfaces of said engaging members have curved surfaces extending in an axial direction of said casing, said curved surfaces being engageable with the recesses of said ball holder.

24. The differential apparatus according to claim 1, wherein said casing and said disc plates are assembled in a manner that they are pressed to each other in an axial direction, thereby providing an initial differential-limiting force.

25. The differential apparatus according to claim 24, wherein a differential-limiting means comprising a plain washer and/or a bearing is disposed between said casing and said disc plate.

26. The differential apparatus according to claim 25, wherein said bearing is a roller bearing.

27. The differential apparatus according to claim 1, wherein said differential case has a female screw portion having a larger inner diameter in a flange root portion than the outer diameter of said disc plates, and said male screw portion of said case cover has a size corresponding to said female screw portion of said differential case, said female screw portion of said differential case being fixed to said male screw portion of said case cover by screwing.

28. The differential apparatus according to claim 27, wherein said female screw portion of said differential case is fixed to said male screw portion of said case cover by screwing to provide an initial differential-limiting torque.

29. The differential apparatus according to claim 28, wherein said initial differential-limiting torque is in a linear relation with a clamping torque by screwing.

30. The differential apparatus according to claim 27, wherein said screwing engagement portion is welded and/or implanted with small screws or pins.

31. A differential apparatus comprising (a) a casing having an opening on each side wall; (b) a pair of disc plates rotatably received in said casing and having connecting portions each connectable to a shaft rotatably supported by each opening of said casing, an opposing surface of each disc plate being formed with a circumferentially continuous groove winding such that a radial position changes at a constant period; (c) a plurality of balls rolling in winding continuous grooves of a pair of disc plates; and (d) a ball holder disposed between a pair of disc plates and engaging said casing, said ball holder having radially elongated guide holes each holding one ball circumferentially at an equal interval, wherein said winding continuous groove has first guide regions each extending from a radially outer position to a radially inner position and second guide regions each extending from a radially inner position to a radially outer position, inflected regions each connecting said first guide region and said second guide region being larger in width and/or depth than said first guide regions and said second guide regions, whereby a contact stress between said balls and said winding continuous groove is decreased in said inflected regions.

32. The differential apparatus according to claim 31, wherein said winding continuous groove has third guide regions for keeping said balls in a predetermined range of said guide holes of said ball holder, inflected regions each connecting each first guide region, each second guide region and each third guide region being larger in width and/or depth than said first guide regions, said second guide regions and said third guide regions, whereby a contact stress between said balls and said winding continuous groove is decreased in said inflected regions.

33. The differential apparatus according to claim 31, wherein a differential-limiting means is disposed between the outside surface of each disc plate and the inner wall of said casing, and wherein when a torque applied to one disc plate decreases, a friction force is generated between the outside surfaces of said disc plates and said differential-limiting means by a thrust force generated by contact of said balls with said winding continuous groove, thereby generating a differential-limiting torque.

34. The differential apparatus according to claim 33, wherein said differential-limiting means is a thrust washer.

35. A differential apparatus comprising (a) a casing rotated by a driving force from outside; (b) a pair of opposing disc plates coaxially disposed in said casing, an opposing surface of each disc plate being formed with a circumferentially continuous groove winding such that a radial position changes at a constant period; (c) a plurality of balls rolling in opposing winding continuous grooves of both disc plates; and (d) a ball holder rotating integrally with said casing and having a plurality of radially extending guide holes, each guide hole movably receiving each ball, wherein said winding continuous groove has a plastically worked surface.

36. The differential apparatus according to claim 35, wherein said winding continuous groove formed on the opposing surface of the disc plate is formed by plastic working.

37. The differential apparatus according to claim 36, wherein said winding continuous groove is formed on the opposing surface of said disc plate by forging and plastic working.

38. The differential apparatus according to claim 36, wherein said winding continuous groove is formed on the opposing surface of said disc plate by forging, heat treatment and plastic working.

39. The differential apparatus according to claim 36, wherein said plastic working is carried out by rolling-forming.

40. A differential apparatus comprising (a) a casing rotated by a driving force from outside; (b) a pair of opposing disc plates coaxially disposed in said casing, an opposing surface of each disc plate being formed with a circumferentially continuous groove winding such that a radial position changes at a constant period; (c) a plurality of balls rolling in opposing winding continuous grooves of both disc plates; and (d) a ball holder rotating integrally with said casing and having a plurality of radially extending guide holes, each guide hole movably receiving each ball, wherein said winding continuous groove has a small groove extending along a bottom thereof.

41. The differential apparatus according to claim 40, wherein said small groove has a width that is 0.1–0.5 as a ratio to the diameter of said ball.

42. A differential apparatus comprising (a) a casing rotated by a driving force from outside; (b) a pair of opposing disc plates coaxially disposed in said casing, an opposing surface of each disc plate being formed with a circumferentially continuous groove winding such that a radial position changes at a constant period; (c) a plurality of balls rolling in opposing winding continuous grooves of both disc plates; and (d) a ball holder rotating integrally with said casing and having a plurality of radially extending guide holes, each guide hole movably receiving each ball, wherein said winding continuous groove has a rolling-formed surface having a shape error of 100 $\mu$m or less and a surface roughness Rz of 30 $\mu$m or less.

43. The differential apparatus according to claim 42, wherein said winding continuous groove is formed by moving rolling-forming balls while pressing them to said winding continuous groove.

44. The differential apparatus according to claim 43, wherein said winding continuous groove is rolling-formed by preparing a disc plate precursor formed with a groove with a rolling-forming margin left in advance, rolling-forming balls, a ball holder having radial guide holes for holding said rolling-forming balls, a disc plate die having a guide groove for said rolling-forming balls and coaxially opposing said disc plate precursor, and a means for pressing said rolling-forming balls to said disc plate precursor; and relatively rotating said disc plate die and said disc plate precursor.

45. The differential apparatus according to claim 43, wherein said rolling-forming margin is 0.02–2 mm.

46. The method for producing a differential apparatus according to claim 43, wherein said rolling-forming balls have a radius equal to the radius of balls used in said differential apparatus +0 to 2 mm.

47. A differential apparatus comprising (a) a casing rotated by a driving force from outside; (b) a pair of opposing disc plates coaxially disposed in said casing, an opposing surface of each disc plate being formed with a circumferentially continuous groove winding such that a radial position changes at a constant period; (c) a plurality of balls rolling in opposing winding continuous grooves of both disc plates; and (d) a ball holder rotating integrally with said casing and having a plurality of radially extending guide holes, each guide hole movably receiving each ball, wherein said winding continuous groove has a rolling-formed surface having a shape error of 100 $\mu$m or less and a surface roughness Rz of 30 $\mu$m or less, and is formed by moving rolling-forming balls while pressing them to said winding continuous groove, wherein said winding continuous groove is rolling-formed by preparing a disc plate precursor formed with a groove with a rolling-forming margin left in advance, rolling-forming balls, a ball holder having radial guide holes for holding said rolling-forming balls, a disc plate die having a guide groove for said rolling-forming balls and coaxially opposing said disc plate precursor, and a means for pressing said rolling-forming balls to said disc plate precursor; and relatively rotating said disc plate die and said disc plate precursor, and wherein rolling-forming is carried out by rotating only said ball holder while keeping said disc plate die and said disc plate precursor stationary.

48. A differential apparatus comprising (a) a casing rotated by a driving force from outside; (b) a pair of opposing disc plates coaxially disposed in said casing, an opposing surface of each disc plate being formed with a circumferentially continuous groove winding such that a radial position changes at a constant period; (c) a plurality of balls rolling in opposing winding continuous grooves of both disc plates; and (d) a ball holder rotating integrally with said casing and having a plurality of radially extending guide holes, each guide hole movably receiving each ball, wherein said winding continuous groove has a rolling-formed surface having a shape error of 100 μm or less and a surface roughness Rz of 30 μm or less, and is formed by moving rolling-forming balls while pressing them to said winding continuous groove, wherein said winding continuous groove is rolling-formed by preparing a disc plate precursor formed with a groove with a rolling-forming margin left in advance, rolling-forming balls, a ball holder having radial guide holes for holding said rolling-forming balls, a disc plate die having a guide groove for said rolling-forming balls and coaxially opposing said disc plate precursor, and a means for pressing said rolling-forming balls to said disc plate precursor; and relatively rotating said disc plate die and said disc plate precursor, and wherein rolling-forming is carried out by rotating both of said disc plate die and said disc plate precursor in opposite directions with said ball holder freely rotatable.

49. An apparatus for producing a ball holder for a differential apparatus, said ball holder having a pair of radial guide holes for holding balls circumferentially at an equal interval, said apparatus comprising (1) rolling-forming balls received in guide holes formed in advance in said ball holder with a plastic deformation margin left; (2) a pair of rolling-forming discs each having on an opposing surface a guide groove for rotatably holding and guiding said rolling-forming balls; (3) a means for relatively rotating a pair of rolling-forming discs in a state that they are disposed on both sides of said ball holder holding said rolling-forming balls in said guide holes, said rolling-forming balls being forced to move along the inner walls of said guide holes by the relative rotation of a pair of rolling-forming discs, thereby rolling-forming curved surface portions corresponding to said rolling-forming balls on said inner walls of said guide holes.

50. The apparatus for producing a ball holder for a differential apparatus according to claim 49, wherein one of said rolling-forming discs is stationary while the other rolling-forming disc is freely rotatable, said other rolling-forming disc being rotated to carry out rolling-forming.

51. The apparatus for producing a ball holder for a differential apparatus according to claim 49, wherein both rolling-forming discs are rotated in opposite directions with both of said rolling-forming disc freely rotatable, thereby carrying out rolling-forming.

52. The apparatus for producing a ball holder for a differential apparatus according to claim 49, wherein said guide groove is constituted by a plurality of linear or curved grooves, each groove being slanted rightward or leftward relative to its radial direction.

53. The apparatus for producing a ball holder for a differential apparatus according to claim 49, wherein said guide groove is constituted by a winding continuous groove alternately having first guide regions each extending from a radially outer position to a radially inner position and second guide regions each extending from a radially inner position to a radially outer position in a circumferential direction on said grooved surface, said guide groove being disposed such that it is always crossing said guide holes of said ball holder when said rolling-forming discs are assembled with said ball holder.

54. The apparatus for producing a ball holder for a differential apparatus according to claim 49, wherein the plastic deformation margin of said guide holes is 0.01–0.6 mm on each side.

55. The apparatus for producing a ball holder for a differential apparatus according to claim 49, wherein said guide groove has an enlarged portion at one radial end, and wherein a pair of rolling-forming discs are disposed on both sides of said ball holder with each rolling-forming ball held in each enlarged portion.

56. The apparatus for producing a ball holder for a differential apparatus according to claim 49, wherein the inner wall of each guide hole of said ball holder is constituted by a curved surface portion and a flat portion on both sides of said curved surface portion, a diameter of said rolling-forming ball being equal to the width of said curved surface portion +0.0 to 0.2 mm.

57. A method for producing a ball holder for a differential apparatus, said ball holder having a pair of radial guide holes for holding balls circumferentially at an equal interval, said method comprising the steps of (a) forming guide holes in said ball holder with a plastic deformation margin left in advance; (b) sandwiching said ball holder coaxial with a pair of rolling-forming discs having a guide groove for rotatably holding and guiding said rolling-forming balls on opposing surfaces with said rolling-forming balls held in the guide groove of said ball holder; (c) relatively rotating a pair of rolling-forming discs to force said rolling-forming balls to move along the inner walls of said guide holes, thereby rolling-forming curved surface portions corresponding to said rolling-forming balls on the inner walls of said guide holes.

58. The method for producing a differential apparatus according to claim 57, wherein one of said rolling-forming discs is stationary while the other rolling-forming disc is freely rotatable, and wherein said other rolling-forming disc is rotated to carry out rolling-forming.

59. The method for producing a differential apparatus according to claim 57, wherein both of said rolling-forming discs are freely rotatable, and wherein rolling-forming is carried out by rotating both of said rolling-forming discs in opposite directions.

60. A differential apparatus comprising (a) a casing rotated by a driving force from outside; (b) a pair of opposing disc plates coaxially disposed in said casing, an opposing surface of each disc plate being formed with a circumferentially continuous groove winding such that a radial position changes at a constant period; (c) a plurality of balls rolling in opposing winding continuous grooves of both disc plates; (d) a ball holder rotating integrally with said casing and having a plurality of radially extending guide holes, each guide hole movably receiving each ball; and (e) a differential-limiting means disposed between said casing and said ball holder, wherein said differential-limiting means is constituted by a plurality of rollers and sliding members disposed between said rollers, a contact resistance of said sliding members to said casing and said disc plates being changeable depending on a rotation force.

61. The differential apparatus according to claim 60, wherein said sliding members have a friction coefficient of 0.05–0.3.

62. The differential apparatus according to claim 60, wherein said sliding members have a thickness equal to the roller diameter $-50\ \mu m$ to $+50\ \mu m$.

63. The differential apparatus according to claim 60, wherein said differential-limiting means is constituted by a plurality of rollers rotating in contact with said casing and said disc plates when difference in rotation is generated in a pair of said disc plates, and a roller-holding member for rotatably holding each roller circumferentially at a predetermined interval, a contact resistance of said roller-holding member to said casing and said disc plates being changeable depending on a rotation force.

64. The differential apparatus according to claim 63, wherein said roller-holding member has a friction coefficient of 0.05–0.3.

65. The differential apparatus according to claim 63, wherein said roller-holding member has a thickness equal to the roller diameter $-50\ \mu m$ to $+50\ \mu m$.

66. A differential apparatus comprising (a) a casing rotated by a driving force from outside; (b) a pair of opposing disc plates coaxially disposed in said casing, an opposing surface of each disc plate being formed with a circumferentially continuous groove winding such that a radial position changes at a constant period; (c) a plurality of balls rolling in opposing winding continuous grooves of both disc plates; and (d) a ball holder rotating integrally with said casing and having a plurality of radially extending guide holes, each guide hole movably receiving each ball, wherein said casing has a pressure chamber connected to a controlling operating fluid supply system, to supply the operating fluid to the pressure chamber with pressure variable depending on the driving conditions of a vehicle, whereby said disc plate is pressed to said casing to control a differential-limiting force.

\* \* \* \* \*